United States Patent
Choe et al.

(10) Patent No.: US 11,216,833 B2
(45) Date of Patent: Jan. 4, 2022

(54) SYSTEMS AND METHODS FOR ONTOLOGY RANKING DISPLAY

(71) Applicant: Nudgit, Inc., San Mateo, CA (US)

(72) Inventors: Timothy Choe, San Francisco, CA (US); Alain Rappaport, Woodside, CA (US); Likuo Lin, Sunnyvale, CA (US); Justin Lin, Coppell, TX (US); Joshua Brown, San Francisco, CA (US)

(73) Assignee: NUDGIT, INC., San Rafael, CA (US)

( * ) Notice: Subject to any disclaimer, the term of this patent is extended or adjusted under 35 U.S.C. 154(b) by 0 days.

(21) Appl. No.: 16/839,731

(22) Filed: Apr. 3, 2020

(65) Prior Publication Data

US 2020/0301934 A1 Sep. 24, 2020

Related U.S. Application Data

(63) Continuation of application No. 14/920,569, filed on Oct. 22, 2015, now abandoned, which is a
(Continued)

(51) Int. Cl.
*G06Q 30/02* (2012.01)
*G06F 16/2457* (2019.01)
(Continued)

(52) U.S. Cl.
CPC ....... *G06Q 30/0202* (2013.01); *G06F 3/0482* (2013.01); *G06F 16/24575* (2019.01);
(Continued)

(58) Field of Classification Search
CPC .. G06F 16/24578; G06F 40/253; G06F 40/30; G06F 16/24575; G06F 3/0482; G06F 40/205; G06N 5/003
See application file for complete search history.

(56) References Cited

U.S. PATENT DOCUMENTS 7,783,658 B1 * 8/2010 Bayliss .................. G06F 16/35
707/765
8,674,993 B1 * 3/2014 Fleming ................. G06Q 40/06
345/440

(Continued)

FOREIGN PATENT DOCUMENTS

KR 10/2009/0033150 4/2009
KR 2014/0059183 5/2014

OTHER PUBLICATIONS

Search Report and Written Opinion for PCT/US2012/040432, dated Dec. 27, 2012.
English Translation of Office Action in Korean Application No. 10/2014/7000179 dated Mar. 26, 2019.
(Continued)

*Primary Examiner* — Pierre M Vital
*Assistant Examiner* — Zuheir A Mheir
(74) *Attorney, Agent, or Firm* — Knobbe, Martens, Olson & Bear, LLP

(57) ABSTRACT

Systems and methods for presenting ranked search results on an interactive graphical user interface based on a semantic matching platform that is configured to apply an ontology are disclosed. In one aspect, a computer system comprising one or more computer readable storage devices configured to store a plurality of computer-executable instructions, a semantic matching platform, one or more network communication systems, and one or more hardware computer processors in communication with the one or more computer readable storage devices to execute the plurality of computer-executable instructions to cause the system to receiving search criteria from a user device, parse the search criteria, determine and rank matched search results, and generating instructions for presentation of a portion of the ranked search results on an interactive graphical user interface configured to be displayed on the user device.

20 Claims, 64 Drawing Sheets

Related U.S. Application Data continuation-in-part of application No. 14/051,337, filed on Oct. 10, 2013, now abandoned, and a continuation-in-part of application No. 13/486,751, filed on Jun. 1, 2012, now abandoned.

(60) Provisional application No. 62/153,464, filed on Apr. 27, 2015, provisional application No. 61/713,357, filed on Oct. 12, 2012, provisional application No. 61/636,478, filed on Apr. 20, 2012, provisional application No. 61/493,410, filed on Jun. 3, 2011.

(51) Int. Cl.
*G06F 40/253* (2020.01)
*G06F 40/205* (2020.01)
*G06F 40/30* (2020.01)
*G06F 3/0482* (2013.01)
*G06N 5/00* (2006.01)

(52) U.S. Cl.
CPC ...... *G06F 16/24578* (2019.01); *G06F 40/205* (2020.01); *G06F 40/253* (2020.01); *G06F 40/30* (2020.01); *G06N 5/003* (2013.01); *G06Q 30/0244* (2013.01)

(56) References Cited

U.S. PATENT DOCUMENTS

| | | | |
|---|---|---|---|
| 9,542,450 B1* | 1/2017 | Jacobsson | G06F 16/24578 |
| 2001/0039528 A1 | 11/2001 | Atkinson et al. | |
| 2003/0212619 A1 | 11/2003 | Jain et al. | |
| 2005/0160414 A1 | 7/2005 | Parnanen et al. | |
| 2008/0015942 A1 | 1/2008 | Harper et al. | |
| 2009/0327034 A1 | 12/2009 | Petersen | |
| 2010/0100553 A1 | 4/2010 | Koudas et al. | |
| 2010/0153209 A1 | 6/2010 | De Rubertis et al. | |
| 2010/0185618 A1 | 7/2010 | Peterson | |
| 2011/0320304 A1 | 12/2011 | Lee et al. | |
| 2012/0330772 A1 | 12/2012 | Choe et al. | |
| 2013/0085884 A1 | 4/2013 | O'Sullivan et al. | |
| 2014/0040275 A1* | 2/2014 | Dang | G06F 16/2228 707/741 |
| 2015/0186381 A1* | 7/2015 | Yan | G06F 16/16 707/728 |
| 2016/0148227 A1 | 5/2016 | Choe et al. | |
| 2016/0188719 A1* | 6/2016 | Glover | G06F 16/285 707/706 |

OTHER PUBLICATIONS

International Search Report and Written Opinion for International Patent Application No. PCT/US2012/040432 dated Dec. 27, 2012.

* cited by examiner

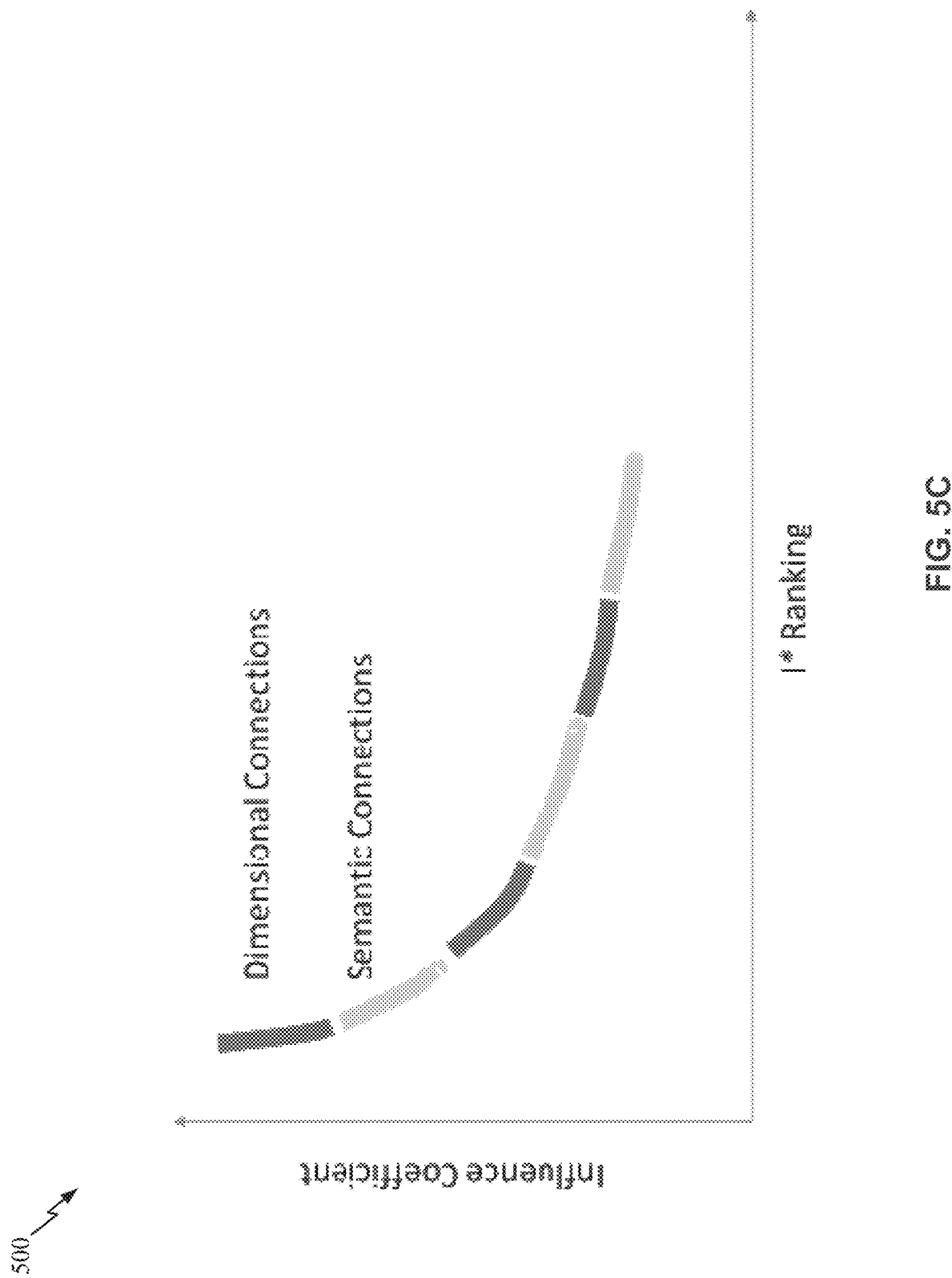

SYSTEMS AND METHODS FOR ONTOLOGY RANKING DISPLAY

BACKGROUND

Electronic, network-based markets for goods and services, like most markets, are often driven by supply.

Businesses generally specialize in one or an array of products, which may be known to consumers via word of mouth, advertisements, or the like. Businesses hope that their goods and services either match present consumer interest or are interesting enough to generate new interest and commitment. Often, businesses create supply and compete with each other hoping that consumer needs and impulse spending lead to a transaction.

However, competition among suppliers can be largely unsupported by actual consumer demand. Instead, actual consumer demand can take a passive role in establishing a market, and the ability to conduct a transaction can become based on a certain luck of the match between hypothetical demand and actual supply. This potentially significant mismatch can greatly discount the ability of people to address things that actually matter to them.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims.

The systems and methods described herein allow for the expression of a demand and the offer for a good or service to be generated automatically without input or intervention from a consumer or supplier. Rather, the systems and methods described herein identify consumer patterns to generate the demand and/or receive an initial set of information from the supplier. Thus, by having these functions performed without human interaction, consumers can have demands expressed on their behalf even when they have forgotten or do not have the time to generate the demands on their own. In addition, consumers then receive offers for goods or services more quickly. In fact, because the offers are automatically generated, the offers may be optimized such that the consumers are more likely to purchase the offers and/or suppliers are more likely to generate additional revenue.

One aspect of the disclosure provides a computer-implemented method for generating offers to expressions of interest. The method comprises, as implemented by one or more computer systems comprising computer hardware and memory, the one or more computer systems configured with specific executable instructions, receiving, from a user device operated by a user, an expression of interest. The expression of interest may comprise one or more expression characteristics. The method further comprises analyzing the expression of interest to extract the one or more expression characteristics. The method further comprises retrieving, from the memory, consumer data associated with the user, external data associated with the expression of interest, and internal data associated with one or more past offers previously generated by the one or more computer systems. The method further comprises generating a suggested offer based on the one or more expression characteristics and the retrieved consumer data, external data, and internal data. The suggested offer may provide a proposal for a good or service in response to the expression of interest. The method further comprises transmitting, to the user device, the suggested offer.

Another aspect of the disclosure provides a computing system configured to generate offers for expressed demands. The computer system comprises a network interface that is coupled to a data network for receiving and transmitting one or more packet flows. The computer system further comprises computer memory. The computer system further comprises a computer processor. The computer system further comprises a computer readable storage medium storing program instructions configured for execution by the computer processor in order to cause the computing system to receive, from a user device operated by a user via the network interface, an expressed demand for an item. The expressed demand may comprise one or more characteristics associated with the item. The one or more stored program instructions may further cause the processor to analyze the expressed demand to extract the one or more characteristics. The one or more stored program instructions may further cause the processor to retrieve, from the computer memory, consumer data associated with the user, external data associated with the expressed demand, and internal data associated with one or more past offers previously generated by the computer system. The one or more stored program instructions may further cause the processor to generate a suggested offer based on the one or more characteristics and the retrieved consumer data, external data, and internal data. The suggested offer may provide a proposal for the item in response to the expressed demand. The one or more stored program instructions may further cause the processor to transmit, to the user device via the network interface, the suggested offer.

Another aspect of the disclosure provides a non-transitory computer-readable medium comprising one or more program instructions recorded thereon, the instructions configured for execution by a computing system comprising memory and one or more processors in order to cause the computing system to receive, from a user device operated by a user, an expressed demand for an item. The expressed demand may comprise one or more characteristics associated with the item. The medium further comprises instructions that are further configured to cause the computing system to analyze the expressed demand to extract the one or more characteristics. The medium further comprises instructions that are further configured to retrieve, from the memory, consumer data associated with the user, external data associated with the expressed demand, and internal data associated with one or more past offers previously generated by the computer system. The medium further comprises instructions that are further configured to generate a suggested offer based on the one or more characteristics and the retrieved consumer data, external data, and internal data. The suggested offer may provide a proposal for the item in response to the expressed demand. The medium further comprises instructions that are further configured to transmit, to the user device, the suggested offer.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 5A-C graphically illustrate the addition of ranked results.

DETAILED DESCRIPTION

The disclosure, designs, figures, and description provided in the following pages are non-limiting examples of some embodiments of the present invention. Other embodiments of systems and methods for providing a demand-driven market may or may not include the features disclosed herein. In addition, disclosed advantages and benefits may apply to only some embodiments of the disclosed inventions, and should not be used to limit the inventions.

The term "demand" is a broad term that is intended to have its ordinary meaning. In addition, in certain embodiments, demand refers to a stated desire by a user to engage in a certain activity that may or may not directly involve or reference a commercial transaction (e.g., a demand can include a user's desire to "lose weight," "wish friend happy birthday," etc.). In some embodiments, demand refers to a customer's intent or desire to engage in a commercial transaction (e.g., to acquire, purchase, sell, donate, etc. a good (e.g., a product) and/or service, etc.). A demand may be product and/or service specific, location specific, time specific, etc. A demand may be associated with one or more activities and a user. Furthermore, a demand may belong to a category, which is a classification and/or sub-classification of an activity based on its characteristics. A demand may also include one or more activity attributes, each of which may include a description, value, and/or directive, etc. For example, a description could refer to a distance, a value could refer to the numerical value or amplitude of the distance (e.g., 10 miles), and a directive could refer to a suggestion. In addition, a demand may include one or more preferences, e.g., a user-specific preference, such as age, food allergy, favorite music, etc. In some embodiments, a demand is sometimes referred to as an "intent."

The term "offer" is also a broad term that is intended to have its ordinary meaning. In addition, in certain embodiments, an offer refers to a proposal by a user, such as a supplier or merchant of goods and/or services, to provide goods and/or services to another user, such as the customer, according to the stated terms. The offer may be product and/or service specific, location, specific, time specific, etc. In some embodiments, the offer may be personalized to a specific user or group of users.

Figure 1:
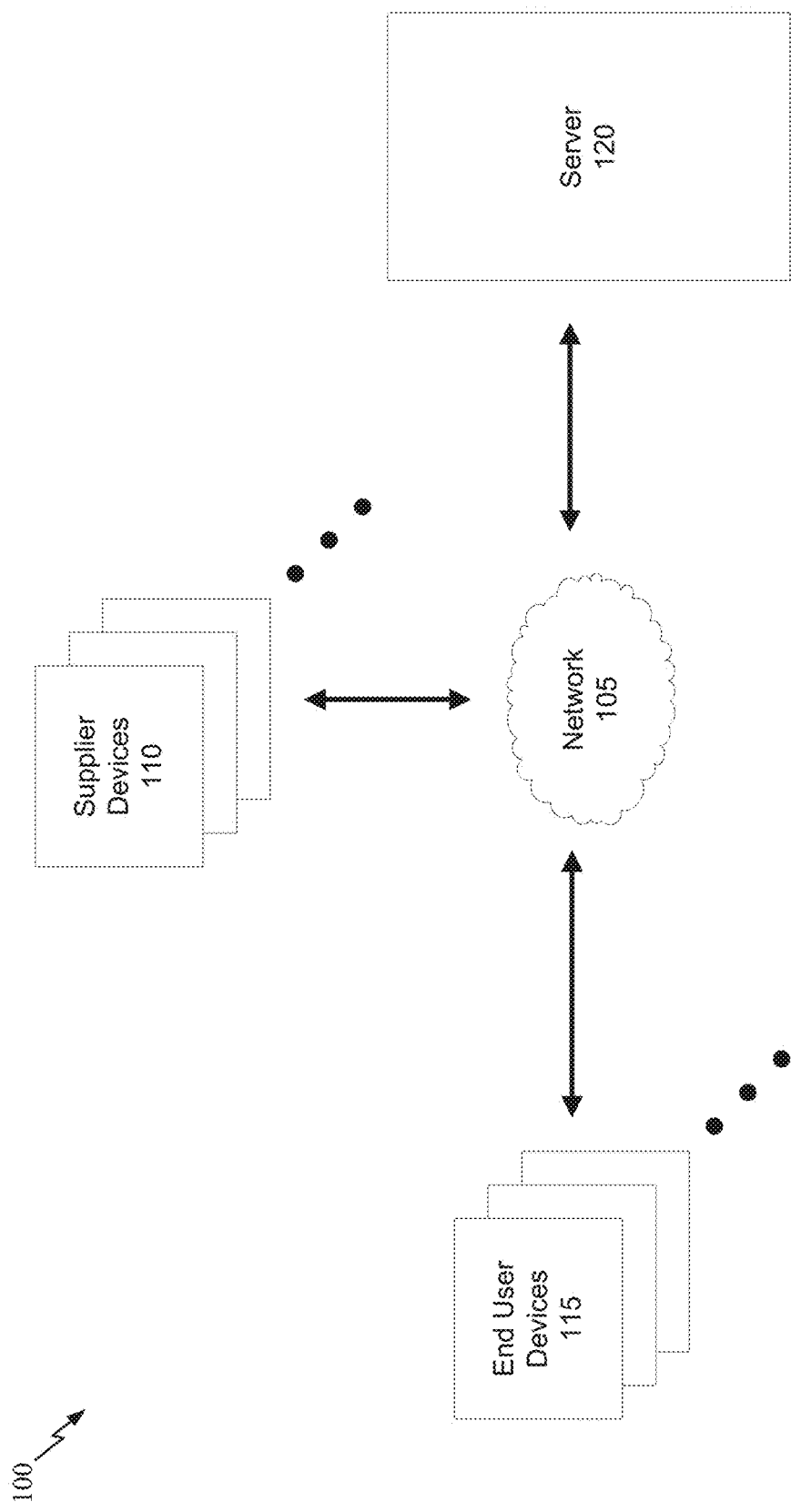
FIG. 1 is a block diagram of a communications system.

FIG. 1 is a block diagram of a communications system 100. Communications system 100 may include a network 105, one or more supplier devices 110, one or more end user devices 115, and a server 120. The network 105 may include any communications network, such as the Internet. Network 105 may be a wired network, a wireless network, or a combination of the two. For example, the network 105 may be a local area network (LAN), a wide area network (WAN), the Internet, and/or combinations of the same. The server 120 may be in communication with any of a variety of information-providing devices, either directly or via the network 105. For example, the server 120, may be in communication with a weather service, traffic application, news feed, RSS feed, etc., or other indicators, sensors, and/or applications that can provide information. Such information can be used by the server 120 to further predict or suggest user demands and/or to efficiently match demands to appropriate goods and services suppliers (as discussed in greater detail below).

The one or more supplier devices 110 may each include a computing device. In an embodiment, a supplier device 110 includes a portable device, such as a portable electronic device. For example, supplier device 110 may include a cell phone, a smart phone, a tablet, a laptop, a personal digital assistant (PDA), or the like. In another embodiment, supplier device 110 may include a stationary computing device, such as a computer, a desktop computer, a workstation, a server, terminal, kiosk, or the like. The supplier device 110 may communicate with server 120 through network 105. As an example, the supplier device 110 may include an application processor that communicates with the server 120 through network 105. In an embodiment, the application processor is configured to run an operating system, such as an operating system known by the trademark WINDOWS®, UNIX®, MAC OS®, IOS®, ANDROID®, WINDOWS PHONE®, LINUX®, or the like. The operating system may execute instructions to run applications on the supplier device 110 and display results to the user of the supplier device 110 via a display (not shown). For example, the operating system may be configured to run a browser, where the browser executes browser-executable code. The operating system may run a browser that allows a user to access a network application, such as a web application, hosted by the server 120. In another example, the operating system may be configured to run an application that receives and stores data from the server 120. For example, the supplier device 110 may allow a user to view demand and offer information as described herein while the supplier device 110 is not in communication with network 105 (e.g., via the use of a stand-alone application).

The supplier device 110 may include a display and one or more input devices for user interaction. An input device may be any device that allows a user to interact with the supplier device 110. For example, an input device may be a button, a mouse, stylus, keyboard, touch screen, microphone, and/or the like. The input device can be in communication with the application processor of the supplier device 110 to allow the user to interact with an application being executed, such as, for example, a browser, a stand-alone application, etc.

In general, the supplier device 110 may be configured to allow a user, such as a supplier or merchant of goods and/or services, to communicate with the server 120 in order to view indications of demand (sometimes referred to merely as "demand" or "demands") generated by customers and/or to create offers for one or more customers based on such customer's individual, stated demand.

The one or more end user (e.g., customer, client, etc.) devices 115 may each also include any computing device. In an embodiment, an end user device 115 includes a portable device, such as a portable electronic device. For example, end user device 115 may include a cell phone, a smart phone, a tablet, a laptop, a personal digital assistant (PDA), a personal information manager (PIM) or the like. In another embodiment, end user device 115 may include a stationary computing device, such as a computer, a desktop computer, a workstation, server, terminal, or the like. The end user device 115 may communicate with server 120 through network 105. As an example, the end user device 115 may include an application processor that communicates with the server 120 through network 105. In an embodiment, the application processor is configured to run an operating system, such as an operating system known by the trademark WINDOWS®, UNIX®, MAC OS®, IOS®, ANDROID®, WINDOWS PHONE®, LINUX®, or the like. The operating system may execute instructions to run applications on the end user device 115 and display results to the user of the end user device 115 via a display (not shown). For example, the operating system may be configured to run a browser, where the browser executes browser-executable code. The operating system may run a browser that allows the end user to access a network application, such as a web application, hosted by the server 120. In another example, the operating system may be configured to run an application that receives and stores data from the server 120. In other words, the end user device 115 may allow a user to view demand and offer information as described herein while the end user device 115 is not in communication with network 105 (e.g., via the use of a stand-alone application).

The end user device 115 may include a display and one or more input devices for user interaction. An input device may be any device that allows a user to interact with the end user device 115. For example, an input device may be a button, a mouse, stylus, keyboard, touch screen, microphone, and/or the like. The input device can be in communication with the application processor of the end user device 115 to allow the user to interact with an application being executed, such as, for example, a browser, stand-alone application, etc.

In general, the end user device 115 may be configured to allow a user, such as a customer, to communicate with the server 120 in order to create demands for goods and/or services. The end user device 115 may also be configured to allow the user to view one or more offers issued to the user by a merchant or supplier, which may be based on the user's created and stated demand.

The server 120 can include a computing device that is configured to communicate with the supplier device 110 and/or the end user device 115 through network 105. The server 120 can include one or more processors to execute one or more instructions, memory, and communication devices to transmit and receive data over the network 105. In an embodiment, the server 120 can be configured to facilitate real-time or near instantaneous communication between a supplier and a consumer. The server 120 can be configured to allow the supplier to provide to the consumer one or more offers that may be of interest to the consumer based on the individual consumer's stated demand for particular products and/or services. For example, the server 120 may facilitate such communication via a hosted network application, such as a web application, that may be accessed by the supplier and the consumer. While FIG. 1 illustrates one server 120, this is not meant to be limiting, as the functionality described herein may be implemented in more than one server (e.g., these servers can be co-located or can be geographically separate, etc.). The functionality described herein may also be implemented in one or more virtual machines that execute on a physical server. In addition, the functionality described herein may be implemented in server 120 or in other computing devices. Further, the functionality described herein may be implemented in a cloud computing environment.

Figure 2:
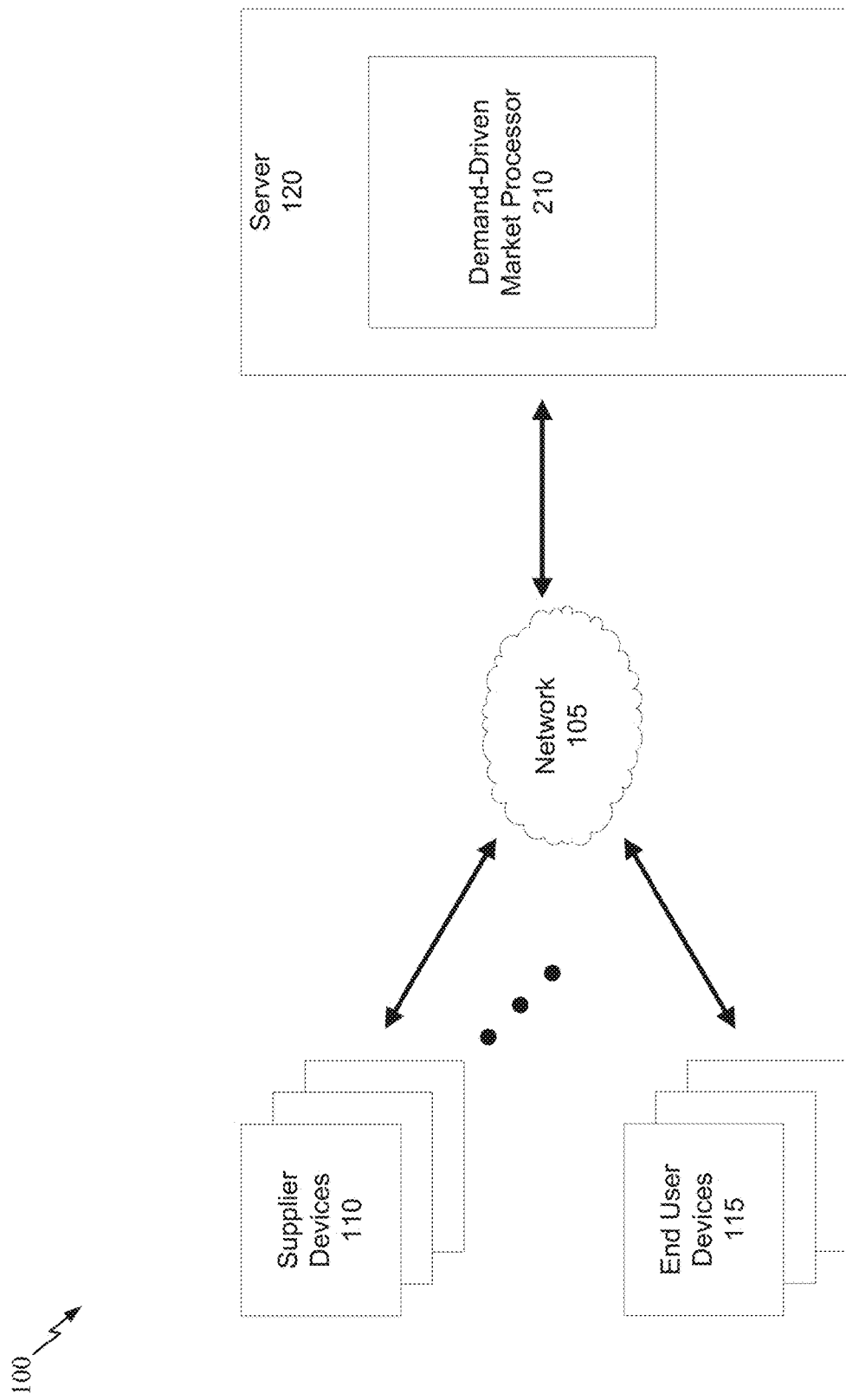
FIG. 2 is a more detailed block diagram of a communications system.

FIG. 2 is a more detailed block diagram of a communications system 100. In an embodiment, the server 120 includes a demand-driven market processor 210. The demand-driven market processor 210 may facilitate communication between a supplier and a customer such that the supplier can provide one or more offers to the customer that may be of interest to the customer based on the customer's stated demand. As described herein, the demand-driven market processor 210 may execute instructions to allow a customer to generate a demand, to allow a supplier to build an offer based on the generated demand, to process a demand-driven request, and/or to generate a market-summary dashboard for use by a supplier (as discussed in further detail, below).

While the server 120 is described herein with respect to the demand-driven market processor 210, this is not meant to be limiting. Generally, the demand-driven market processor 210 uses the principles and benefits of a semantic matching platform (SMP) to perform the operations described herein. In one embodiment, the SMP is configured perform a matching process (sometimes referred to as "smart matching") to accurately match expressions of consumer demand to specific suppliers (and other resources) that can satisfy those demands. For example, in one embodiment, the SMP matches expressions of consumer demand with businesses that have indicated a desire to be notified when such demands are expressed. For example, a car dealership may establish a profile such that it is notified of all users that express a demand to purchase a car.

In other embodiments, the SMP includes an abstraction processor that identifies two or more demands that may or may not be intuitively connected. For example, the abstraction processor may be configured to determine activities having a syntactic, lexicographical, or semantic relationship with some other activity (for example, as discussed below with respect to FIGS. 5A-C, etc.). The SMP can be configured to notify businesses when a user expresses a demand for an activity that is related to the business-followed-activity in such manner. For example, a car dealership may establish a profile such that it is notified of all users that express a demand to purchase a car. However, the abstraction processor may determine that the activity of purchasing a car is related to repair a car, buy a particular part for a car, buy a special gift, etc. Therefore, although the business may have only configured its profile in a narrow manner, such as that it is notified (or able to retrieve notifications) of users that express an interest or demand to purchase a car, the SMP will also notify such businesses of users that have expressed a demand for such abstraction-processor-identified related activities.

Furthermore, in some embodiments the matching process can utilize statistical information to identify matching businesses. For example, the SMP can include statistical information related to historical user activity, such as the likelihood that a second activity will be selected (e.g., demand will be expressed for that activity) after a first activity is selected. The SMP can therefore utilize a combination of known pre-defined relationships (e.g., human knowledge regarding the relationships between activities), activities identified via an abstraction process, as well as by utilizing statistical information.

The SMP may have broad applicability to not only demand-driven processes, but also marketplaces in general and other contexts. The server 120 may include additional processors or modules (and/or not include the demand-driven market processor 210 at all) that are configured to use the principles and benefits of the SMP to perform operations similar to those described herein.

In general, the SMP is configured to apply an ontology, which can be a continuously evolving and growing collection of intents to engage in a particular activity or activities (e.g., demands, such as things that people want or intend to do, purchase, etc.). In an embodiment, the ontology formalizes the manner in which demands may be expressed in a computable form to provide support for key functions, such as matching, searching, choosing, decision-making and other functions of everyday life. Such expressions could be symbolic representations (or other representations, e.g., numeric, etc.) of future actions, and may include properties like entities or objects, verbs or actions, attributes, contexts, constraints, relationships, and/or usage.

The demand-driven market processor is configured to apply an abstraction process. The abstraction process can connect two or more intents or activities by identifying similarities, intersections, or relations between them, and exploiting those shared characteristics to solve or reduce the effects of various problems. This abstraction process may enable efficiencies in matching users that express certain demands to suppliers that can help address them with offers.

For example, intents or activities can be matched by using their description. Two separate intents or activities may have different action properties, but may occur in the same location. This relationship may be exploited by the abstraction process. As another example, intents or activities can be connected by their relationship. Different types of relationships between intents or activities (e.g., intents or activities A and B) may include "A is a child of B," "A is satisfied by B," "A co-occurs with B," "A precedes B," "A follows B," and/or "A is a synonym with B," etc. In this way, for example, the phrase "make dinner" has the relation "is satisfied by" with "get groceries." The relationships may have equal or varying strengths. For example, based on captured data, such as the outcomes of transactions in a demand and supply cycle (e.g., whether offers built for generated demands as described herein were or were not purchased), the strengths of certain relationships may be increased or decreased for particular objects (e.g., if the transaction rate is low for a set of demands and offers, the strength of the relationship that defined the connection between the goods and/or services desired and the goods and/or services offered may be decreased). The strength of relationships is described in more detail below. A given relationship and its values can be created editorially, automatically, or in a mixed initiative manner that combines both. One type relationship, "A is satisfied by B," can be particularly useful. In one embodiment, the "satisfied" relationship identifies activities, intents, or demands that are largely or wholly, non-exclusively satisfied by engaging in other activities, intents, or demand. For example, the activity, "make dinner" is satisfied by the activity "go shopping for food." Therefore, a business that follows the activity "go shopping for food" can be notified not only when users express a demand to shop for food, but also when users express a demand for a related activity (e.g., an activity that satisfies one of the relationships described herein, or other predefined or computer-learned relationship), such as to "make dinner."

Such relationships may be used to generate intent or activity graphs, which can be used for matching and searching. By using semantic relations, as well as usage data and other attributes, the graphs may allow for the matching of intents and activities. The graphs may aid in searching as search results may be associated with terms related to the searched term (as depicted in the graph). The use of an ontology may provide another dimension to be used in generating rankings as well. Ontologies disclosed herein include demand ontologies and supply ontologies.

Figure 3:
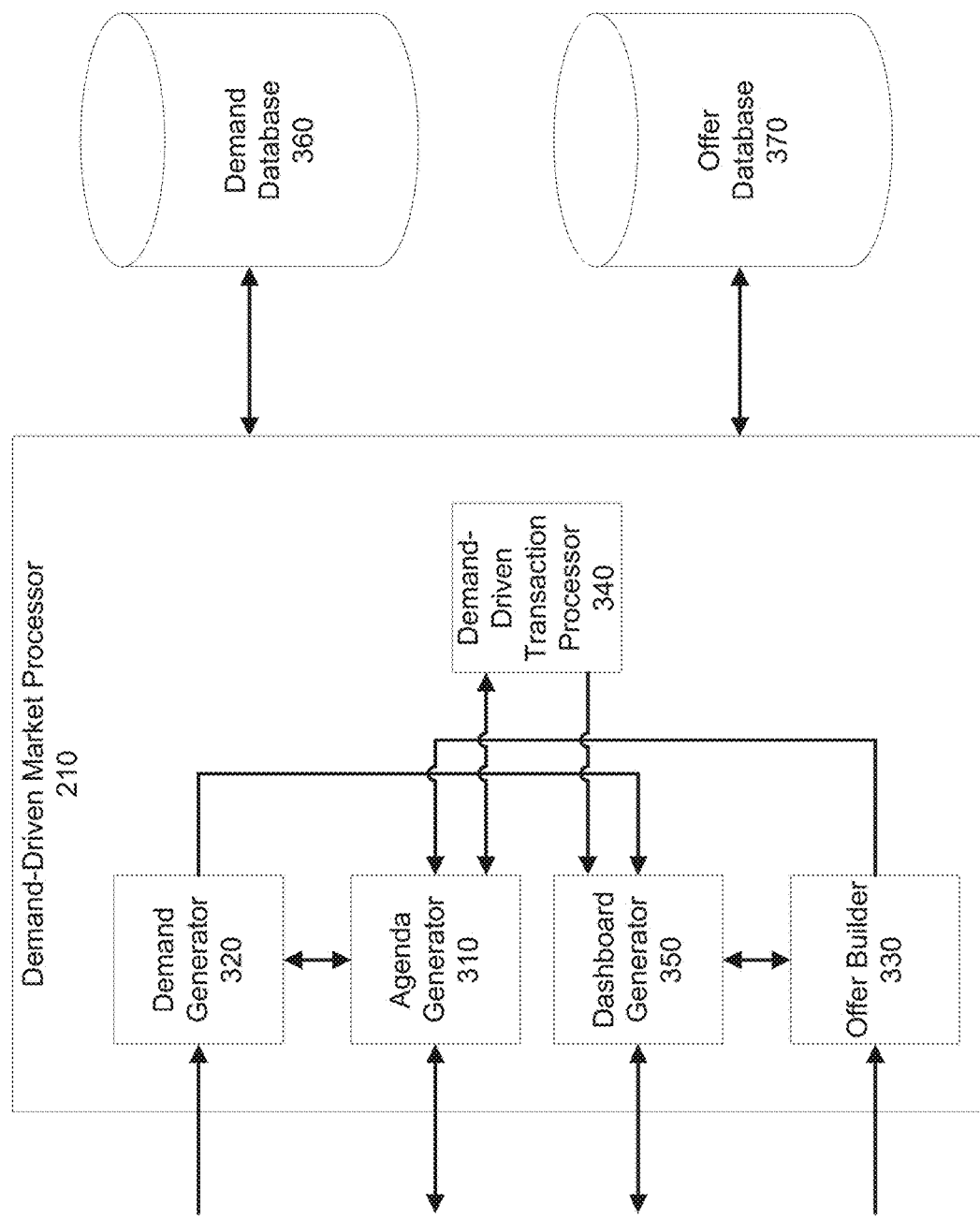
FIG. 3 is a more detailed block diagram of a server as illustrated in FIG. 1.

FIG. 3 is a more detailed block diagram of a server, such as server 120 of FIGS. 1-2. In an embodiment, the server 120 may include the demand-driven market processor 210 and may be in communication with a demand database 360 and/or an offer database 370. The term "database" is a broad term, intended to have its broadest ordinary meaning. In addition, the term database may refer to one or more data sets that are stored in one or more locations in one or more formats. The demand-driven market processor 210 may include modules, such as an agenda generator 310, a demand generator 320, an offer builder 330, a demand-driven transaction processor 340, and/or a dashboard generator 350. While the five modules are illustrated in FIG. 3, this is not meant to be limiting, and it should be apparent to one skilled in the art that any number of modules may be included in the demand-driven market processor 210. In addition, the operations performed by each module as described herein may be performed by any module or combination of modules.

In some aspects, the agenda generator 310 is configured to communicate with an end user device 115. The agenda generator 310 may be configured to generate an agenda for one or more consumers, where the agenda is personalized for each consumer and is a representation of a consumer's outstanding and/or completed demands. For example, the agenda generator 310 generates a graphical representation of a consumer's demands by organizing demands into groups for which no supplier has offered goods and/or services, groups for which at least one supplier has offered goods and/or services, and/or groups for which at least one supplier offered goods and/or services and the offer was purchased by the consumer. The agenda generator 310 may allow a consumer to access a generated agenda via the end user device 115. For example, the consumer may access the generated agenda by accessing the network application hosted by the server 120 in a browser or other application executed by the application processor of the end user device 115.

In an embodiment, the agenda generator 310 may generate an agenda based on results from the demand generator 320. In an embodiment, the demand generator 320 is configured to generate a demand for goods and/or services based on demand information provided by a consumer. This demand is matched to suppliers that offer goods and/or services related to the demand, and then the demand is sent to or becomes observable by the matched suppliers (additional details regarding supplier matching are provided herein). For example, demand information provided by the consumer may include a desire to engage in a certain activity; a type of good desired by the consumer; a type of service desired by the consumer; a time or time period in which the consumer would like the good and/or service; a time or time period by which the consumer would like the good and/or service; a location where the consumer would like the good and/or service; additional information regarding restrictions, special instructions, etc.; and/or the like.

A consumer may be able to provide this demand information to the demand generator 320 via the generated agenda. In an embodiment, the consumer may be able to express a demand by selecting from a set of suggested demands, by selecting a demand by type, and/or by entering a demand in a free-form format. The demand may be entered by typing in a natural language format, by speaking, by selecting keys, by touch via a touchscreen, by clicking and dragging, by using a form, and/or the like. Demands could also be received from another process or program, and may be communicated via an Application Programming Interface or other process. Some suggested demands may, for example, include finding a place to eat, buying a new car, obtaining insurance, finding a bar and/or restaurant, finding ingredients for a meal, obtaining health services, finding clothing, buying beverages, and/or the like. Some demand types may, for example, include automotive, finance, food, health, home and local, leisure, personal care, shopping, and/or the like. The demand generator 320 may offer a list of categories or subcategories after a type is chosen. For example, if the type "food" is chosen, the demand generator 320 may further list "bakery & dessert," "grocery," "restaurant," or the like as subcategories. These subcategories and the contents therein may be ranked based on what the demand generator 320 determines the consumer most likely wants to find.

In an embodiment, the demand generator 320 may be configured to use an ontology, such as a demand ontology, to discover items related or associated with goods and/or services initially identified by the consumer. For example, the entered demand information may be parsed and separated into different classes, such as a category, an agenda verb, an object, a verb interrogative, an object interrogative, a detail interrogative, and/or a location. The category may be a general description of the type of goods and/or service desired, an agenda verb may be a desired action, an object may be an item upon which the desired action is to take place, a verb interrogative may be a term that modifies the agenda verb, an object interrogative may be a term that modifies the object, a detail interrogative may be when the demand is to take place, and a location may be where the demand is to take place.

In an embodiment, the demand generator 320 may arrange the entries in each class to generate a standardized message. The demand generator 320 can use a standardized message to identify items related or associated with the initially identified goods and/or services. For example, if a user initially indicates a desire to "fix a car," the demand generator 320 may enter "auto" in the category parent class and "fix" in the children verb class. Other children verbs may be associated or related with the "auto" parent class, such as "buy" and/or "donate." When the demand generator 320 transmits the generated demand to the appropriate suppliers as described herein, the demand generator 320 may transmit the generated demand not just to those suppliers that fix cars, but also to those that buy cars and/or those that offer car donation services. In this way, regardless of the way that the consumer enters the demand information as described herein (e.g., natural language input, voice input, spoken input, keyed input, touchscreen input, click and drag interface, etc.) or the type of grammar and/or vocabulary used, the standardizing of messages allows the demand generator 320 to transmit the generated demand to suppliers that offer the exact goods and/or services desired as well as to suppliers that offer similar or related goods and/or services.

The generated demand (in the form of a standardized message) may be transmitted to the agenda generator 310, the demand database 360, and/or the dashboard generator 350. In an embodiment, based on receiving a generated demand, the agenda generator 310 may generate a new agenda and/or modify an existing agenda such that the newly generated demand is represented in the agenda. In further embodiments, the generated demand may be stored in the demand database 360. For example, the demand database 360 may contain demands generated for different consumers. A supplier may obtain access to the generated demands (e.g., generated demands related to its business) in order to analyze previous demands (e.g., demands that have been fulfilled, expired demands, etc.) and current demands (e.g., outstanding demands, demands that have not been fulfilled, etc.) for the purposes of generating offers more likely to be purchased by consumers. In alternate embodiments, the generated demand may be stored in memory on the end user device 115 and/or the server 120.

In further embodiments, the generated demand may be transmitted to the dashboard generator 350 to allow a supplier to build an offer tailored to the generated demand. The generated demand may be transmitted to the dashboard generator 350 such that it is available for those suppliers that offer the specific goods and/or services desired or related goods and/or services desired. The appropriate suppliers may be identified by using an ontology as described herein (e.g., a generated demand may be available to a supplier if the supplier offers the same goods and/or services desired or if the supplier offers goods and/or services that have a semantic relation with the goods and/or services desired).

Once the dashboard generator 350 receives the generated demand, the supplier may be immediately notified and/or the generated demand may be immediately observable. Notifications may include a message generated in the network application, an electronic message sent to the supplier (e.g., an email, a text message, etc.), a phone call, an audible sound generated by the supplier device 110 (e.g., a ring generated by the supplier's mobile device), a vibration generated by the supplier device 110, or the like. The dashboard generator 350 is described in greater detail below.

In some aspects, the dashboard generator 350 is configured to communicate with a supplier device 110. The dashboard generator 350 may be configured to generate a dashboard for one or more suppliers, where the dashboard is personalized for each supplier and is a representation of demand relevant to the supplier's business (both current and/or historical) and/or demand otherwise selected for observation by the supplier, a supplier's active offers, a supplier's expired offers, the number of offers purchased, net sales from purchased offers, offers generated by other businesses, an indication of goods and/or services offered by the supplier, and/or a number of users still actively looking for offers related to goods and/or services offered by the supplier. For example, the dashboard generator 350 generates a graphical representation of the information described herein. The dashboard generator 350 may allow a supplier to access the generated dashboard via the supplier device 110. For example, the supplier may access the generated dashboard by accessing a network application hosted by the server 120 in a browser or other application executed by the application processor of the supplier device 110.

In some embodiments, a user may be both a consumer and a supplier. In an embodiment, a user that is both a consumer and a supplier may additionally access a generated agenda via a supplier device 110 and a generated dashboard via an end user device 115 (e.g., the supplier device 110 and the end user device 115 may be different devices or the same device). For those users that are both consumers and suppliers, the users may be able to access both the generated agenda and the generated dashboard by accessing the network application hosted by the server 120 in a browser or other application executed by the application processor of the supplier device 110 and/or end user device 115. Within the network application, the user may have the option of switching from the generated agenda to the generated dashboard, and vice-versa.

In an embodiment, the dashboard generator 350 allows a supplier to add demands, goods and/or services that it is in the business of offering or interested in observing. The supplier may be able to add demands, goods and/or services by selecting from a set of demands, suggested goods and/or services, by selecting a demand, good and/or service by type, and/or by entering a demand, good and/or service in a free-form format. The demand, good and/or service may be entered by typing in a natural language format, by speaking, by selecting keys, by touch via a touchscreen, by clicking, gesturing, and dragging, and/or the like. Some suggested demands, goods and/or services may, for example, include finding a place to eat, buying a new car, obtaining insurance, finding a bar and/or restaurant, finding ingredients for a meal, obtaining health services, finding clothing, buying beverages, and/or the like. Some demand, good and/or service types may, for example, include automotive, finance, food, health, home and local, leisure, personal care, shopping, and/or the like. Note that the dashboard generator 350 may offer a list of subcategories after a type is chosen. For example, if the type "food" is chosen, the dashboard generator 350 may further list "bakery & dessert," "grocery," "restaurant," or the like as subcategories. These subcategories and the contents therein may be ranked based on what the dashboard generator 350 determines the supplier most likely wants to find.

In an embodiment, the agenda generator 310 may generate an agenda and the dashboard generator 350 may generate a dashboard based on results from the offer builder 330. In an embodiment, the offer builder 330 is configured to build an offer for goods and/or services based on offer information provided by a supplier. For example, offer information provided by the supplier may include an intended recipient of the offer (e.g., a consumer, a group of consumers, etc.); terms of the offer (e.g., a description of the goods and/or services being offered for sale, a purchase price for the goods and/or services, a discount on the goods and/or services, a time period during which the offer may be redeemed, disclaimers for the goods and/or services, restrictions on use of the offer, a photo of the location, goods, and/or services, etc.); and/or the like.

Before generating an offer, the supplier may view outstanding demands in the generated dashboard. The generated dashboard may group, filter and/or sort the outstanding demands based on time posted (e.g., sorted into groups and grouped by 30 minutes ago, 1 hour ago, 2 hours ago, etc.), a time period for the demand (e.g., sorted into groups and grouped by past, now, today, by a date, on a date, etc.), the type of activity (e.g., sorted into groups and grouped by activity object), whether the demand includes special notes from the consumer, and/or loyalty of the consumer to the supplier (e.g., a frequency of the user expressing the demand and/or acting on the expressed demand).

A supplier may be able to provide offer information to the offer builder 330 via the generated dashboard. The generated dashboard may include suggestions to aid the supplier in providing appropriate offer information. For example, suggestions may include offer templates, offers previously generated by the supplier, offers generated by competitors, expected return on a purchased offer after fees are deducted, locations where the offer can be redeemed, a photo of a location, good, and/or service, language that includes a restriction on the use of the offer, information on why the consumer may be valuable (e.g., the consumer is a frequent customer, the customer is a good tipper, etc.), and/or the like.

In an embodiment, the offer builder 330 allows a supplier to generate offers for goods and/or services by selecting from a set of suggested terms as described herein and/or by entering information in a free-form format. The information may be entered by typing in a natural language format, by speaking, by selecting keys, by touch via a touchscreen, by clicking and dragging, and/or the like. In some aspects, the offer builder 330 may restrict certain suppliers from building offers. For example, if a supplier has several active offers, but no consumer has purchased any of the offers, then the supplier may be restricted from building an additional offer. In this way, the supplier may be incentivized to create more competitive and/or targeted offers.

In an embodiment, the offer builder 330 may be configured to use an ontology, such as a supply ontology, to define the offer to support the demand identified by the consumer. For example, the entered offer information may be parsed and separated into different classes, such as a category, an offer verb, an offer type, a unit limit, an offer interrogative, a type interrogative, a detail interrogative, and/or a location. The category may be a general description of the type of goods and/or services offered, an offer verb may be an action applied to the price of the goods and/or services (e.g., a discount, buy 1 get 1 free, etc.), an offer type may be who the offer applies to, a unit limit may be a limit on how many goods and/or services the offer applies to, an offer interrogative may describe how much the offer is for, a type interrogative may describe how many goods and/or services the offer is good for, a detail interrogative may be when the goods and/or services may be available, and a location may be where the goods and/or services may be available. In an embodiment, the offer builder 330 may arrange the entries in each class to generate a standardized message. The standardized message may be transmitted to the consumer that generated the demand as described herein.

The built offer may be modified by the supplier via the generated dashboard. The built offer (in the form of a standardized message) may be transmitted to the agenda generator 310, the offer database 370, and/or the dashboard generator 350. In an embodiment, based on receiving a built offer, the agenda generator 310 may generate a new agenda and/or modify an existing agenda such that the newly built offer is represented in the agenda. Note that the agenda generator 310 may only generate a new agenda and/or modify an existing agenda for those consumers that indicated a demand for goods and/or services covered by the offer. Once the agenda has been updated, a consumer may be immediately notified. Notifications may include a message generated in the network application, an electronic message sent to the consumer (e.g., an email, a text message, etc.), a phone call, an audible sound generated by the end user device 115 (e.g., a ring generated by the consumer's mobile device), a vibration generated by the end user device 115, or the like. Note also that the offers may be synchronized across platforms such that the consumers and/or suppliers may access the network application via different devices (e.g., a desktop, a mobile device, etc.) and still be able to view the built offer.

In further embodiments, the built offer may be stored in the offer database 370. For example, the offer database 370 may contain offers built for different suppliers. A supplier may obtain access to the built offers (e.g., built offers related to its business) in order to view what competitors are offering to consumers the supplier may be targeting. Likewise, a consumer may obtain access to the built offers in order to view offers that may satisfy one or more stated demands for goods and/or services. In alternate embodiments, the built offer may be stored in memory on the supplier device 110 and/or the server 120. In further embodiments, the built offer may be transmitted to the dashboard generator 350 to allow a supplier to view outstanding offers that consumers may purchase and/or to view offers that were purchased.

In an embodiment, if a consumer decides to purchase an offer, the agenda generator 310 may receive payment information (e.g., credit card information, debit card information, bank account information, networked money transfer information, etc.) from the consumer and forward this information to the demand-driven transaction processor 340. For example, the generated agenda may include an option to purchase an offer displayed to the consumer. By choosing the option to purchase, the generated agenda may prompt the consumer to provide payment information. In alternate embodiments, not shown, if a consumer decides to purchase an offer, the generated agenda may prompt the consumer to provide payment information and the demand-driven transaction processor 340 may directly receive the payment information. In some aspects, the demand-driven transaction processor 340 may verify that the payment information is accurate (e.g., by comparing the payment information to information stored in a central repository, not shown) and process the payment. If payment is successful, the demand-driven transaction processor 340 may transmit notifications to the agenda generator 310 and/or the dashboard generator 350. The agenda generator 310 may then generate a new agenda and/or modify an existing agenda for the consumer that purchased the offer to reflect the fact that the offer has been purchased. The demand-driven transaction processor 340 may additionally generate redemption information and transmit this to the agenda generator 310 such that the consumer may view how to redeem the purchased offer. The dashboard generator 350 may generate a new dashboard and/or modify an existing dashboard for the supplier from which the offer was purchased to reflect the fact that the offer was purchased. For example, the graphical representation of the number of offers purchased and/or the net sales of purchased offers may be updated. Once the dashboard has been updated, the supplier may be immediately notified as described herein.

The consumer may be configured to rate the supplier after purchasing and/or using an offer via the generated agenda. The ratings may then be used by the agenda generator 310 in ranking and/or sorting built offers and by the offer builder 330 in suggestion more effective offers.

Generally, the demand-driven market processor 210 may monitor the demand and supply cycle to derive patterns that inform both sides (e.g., correlations between variables, like suppliers in a particular area are more responsive, certain types of demands are more successful for immediate rather than delayed services, etc.). Alternatively, a statistical engine included in the server 120, not shown, may monitor the demand and supply cycle to derive patterns that inform both sides. In some embodiments, the demand-driven market processor 210 may monitor the demand and supply cycle in real-time (e.g., the demand-driven market processor 210 may continuously derive patterns as demands are generated, offers are built, offers are purchased, and/or offers are not purchased). In other words, the demand-driven market processor 210 may continuously derive patterns based on generated demands, built offers, and/or outcomes after transactions have been or have not been consummated. In other embodiments, the demand-driven market processor 210 may periodically monitor the demand database 360 and/or the offer database 370 to derive patterns. By seeing explicit demand, as well as other available offers, suppliers can be encouraged to be competitive, and can compete for one (e.g., before groups have a chance to form) or many consumers depending on their unique acquisition constraints.

In some embodiments, the agenda generator 310 and/or the dashboard generator 350 may organize, filter, and/or rank generated demands and/or built offers. The agenda generator 310 may use internal metrics (e.g., distance adequacy, incentive strength, social recommendation level, a weighted sum that can use normalization across variables, etc.) to rank built offers. For example, an offer score may be represented by the following equation:

$$OfferScore = \sum_{j=1}^{n} a_{i,j} w_j \quad (1)$$

where $a_{i,j}$ is the value of each metric j for each offer i, and $w_j$ is the weight of that metric in the assessment. As an example, if the distance adequacy metric is used, the metric could be computed as the ratio of (actual distance−maximal distance)/maximal distance. If the incentive strength metric is used, the metric could be computed as the frequency with which such offers are fulfilled. If the social recommendation level metric is used, the metric could be computed as the ratio of (current rating/maximal rating).

In further embodiments, the agenda generator 310 and/or the dashboard generator 350 may execute instructions that implement a computer process, such as a ranking process, that is configured to integrate hereogeneous scoring dimensions into a single rank. The ranking process can be used in ranking activities (e.g., actions typically thought of by a consumer in the course of formulating a demand), offers, searches (e.g., search results), and/or suggestions. In an embodiment, the ranking process combines different dimensions that are pertinent to the evaluation of certain data structures or symbolic representations (e.g., activities, offers, suppliers, consumers, goods, services, etc.). For example, when searching for an activity, usage of an activity, properties with respect to the intent graph described herein, frequency of usage, location, time, and/or rank obtained through a term vector search may be relevant to a final ranking of search results.

In some aspects, each dimension is normalized. For example, each dimension may be normalized by taking the ratio of a maximal value of the given dimension, d, to the value for that particular activity. For example, the ratio may be represented by the following equation:

$$f(d) = (\text{Activity}_i)/\text{MAX}(\text{Activity}_{i \to n}) \quad (2)$$

In an embodiment, a higher value would translate into a "better" score. Examples of dimensions may include a term score (based on a term vector analysis), a match score (e.g., a number of times an activity is clicked off of search results per the number of times a query term is used in the same session), a popularity score (e.g., a number of users), a frequency score (e.g., a ratio of a usage score over a number of users over the same time period), a usage score (e.g., a number of times the activity is chosen from any agenda over a defined period of time), a usage p score (e.g., a number of times the activity is chosen by a particular user for any agenda over a defined period of time), a link score (e.g., an incoming and/or outgoing link for any relation), a degree score (e.g., a measure of how connected an activity is to others), a closeness score (e.g., a measure of how near an activity is to others), a family score (e.g., a number of parents (2 term rank), children (3 term rank), and/or siblings (1 term rank)), a concur score (e.g., a value inferred by query statistics and part of a link score), and/or a response score (e.g., a number of purchased offers over a number of offers made). When processing link scores, "social" scores can be specialized to only certain relations, if desired. Other possible dimensions may include an attribute score, a time score, a location score, and the like.

In an embodiment, a basic formula for an Activity$_i$ uses a weighted product of normalized values for each dimension d included and measured. The composite value of the activity (also called the influence coefficient of the activity) may be represented by the following equation:

$$CV(Activity_i) = \prod_{d \in dimensions} f(d)^{w(d)} \quad (3)$$

Weights for each dimension may be represented through the exponents (relative contribution to the rank: established manually at a start, then subject to automated adjustments).

For example, a term score may be 1 and a link score may be 0.25, which would lead to the following equation:

$$CV(\text{Activity}_i) = \text{termScore}^1 * \text{linkScore}(\text{Activity}_i)^{0.25} \quad (4)$$

A rank for the activity may then be based on the above-calculated composite value. In general, rankings may determine how activities, offers, searches, and/or suggestions are ordered. For example, activities, offers, searches, and/or suggestions may be displayed near the top if the rank is high. Likewise, activities, offers, searches, and/or suggestions may be displayed near the bottom if the rank is low.

In other embodiments normalization is implemented by utilizing the relationship:

$$f(d) = \text{MIN}(\text{Activity}_{i \to n})/1(\text{Activity}_i) \quad (5)$$

In the case where smaller (parameter) values are better. The process can verify that each dimension is normalized so that better values increase in the same direction. Further, a potential division by 0 is avoided by replacing 0 by a very small number, e.g., 0.0001. In another embodiment, normalization is implemented by utilizing the relationship:

$$f(d) = \text{MAX}(\text{Activity}_{i \to n})/(\text{Activity}_i) \quad (6)$$

In another embodiment, normalization is not implemented. A potential division by 0 may be avoided by replacing 0 by a very small number relative to the parameter values.

In order to change these measures (scores) into a distance from the origin, where the closer to the origin the better, the process can also utilize the following composite value relationship:

$$CV(Activity_i) = -\log \prod_{d \in dimensions} f(d)^{w(d)} = -\sum_{d \in dimensions} w_d \log f(d) \quad (7)$$

This implementation can use the same normalization approaches. The potential log(0) is avoided by replacing 0 by a very small number, e.g., 0.0001.

The ranking process may be configurable. For example, certain dimensions may be considered and certain dimensions may not be considered when ranking activities, offers, searches, and/or suggestions.

Figure 4:
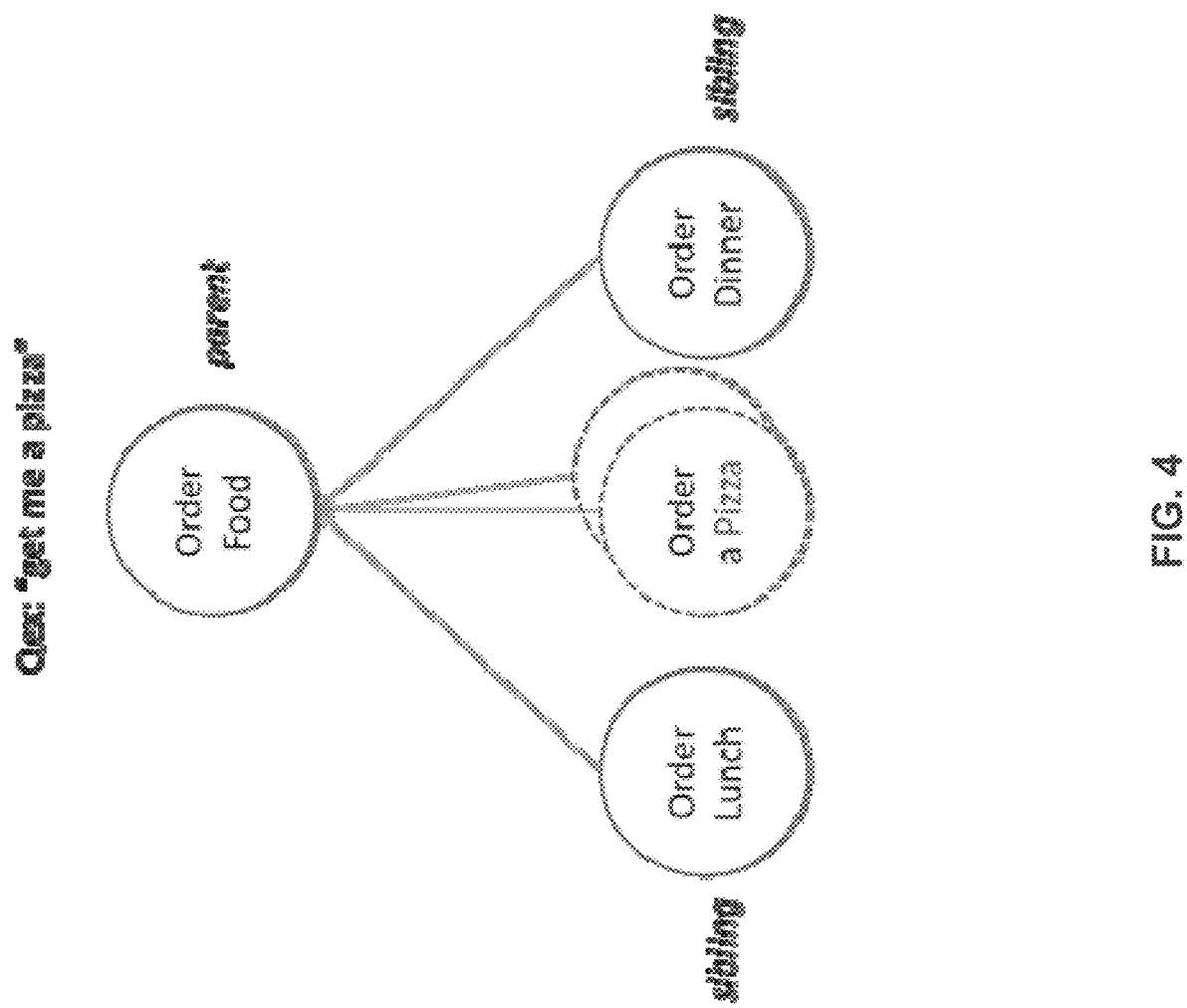
FIG. 4 illustrates an example parent-child-sibling relationship for an activity.

As an example, an activity search may use two or more instances of the INFOSTAR (trademark of NUDGIT, INC.) process, described in greater detail below, for ranking purposes. A query may be run against an index (term score) to obtain a first set of results. The ranking process may be executed on the first set using certain dimensions and the first set may be ranked. A semantic search in the intent graph may then be performed. For example, for each element of the first set, the element's parents, children, and/or siblings may be identified. If parents, children, and/or siblings exist, a separate set (e.g., a family set) may be made for those. The exploitation of the "family tree" may be parametrizable, meaning that the scope of expansion may be limited to parents, children, and/or siblings. As an example, FIG. 4 illustrates an example parent-child-sibling relationship for the activity of ordering a pizza. For each element of the first set, another set (e.g., a relations set) may be generated based on other elements items that have a relationship (e.g., any relationship described herein) with the given element (e.g., those elements that have a concurrence relationship with the given element). The ranking process that includes a family score dimension and a relation score dimension (e.g., a number of relationships) may be instantiated, where a second set includes the first set with the family scores and/or the relation scores. The ranking process, e.g., the ranking process known by the trademark INFOSTAR™, may be executed on the second set and the second set may be ranked. The ranked results of the second set may then be added to the ranked results of the first set.

Figure 5A:
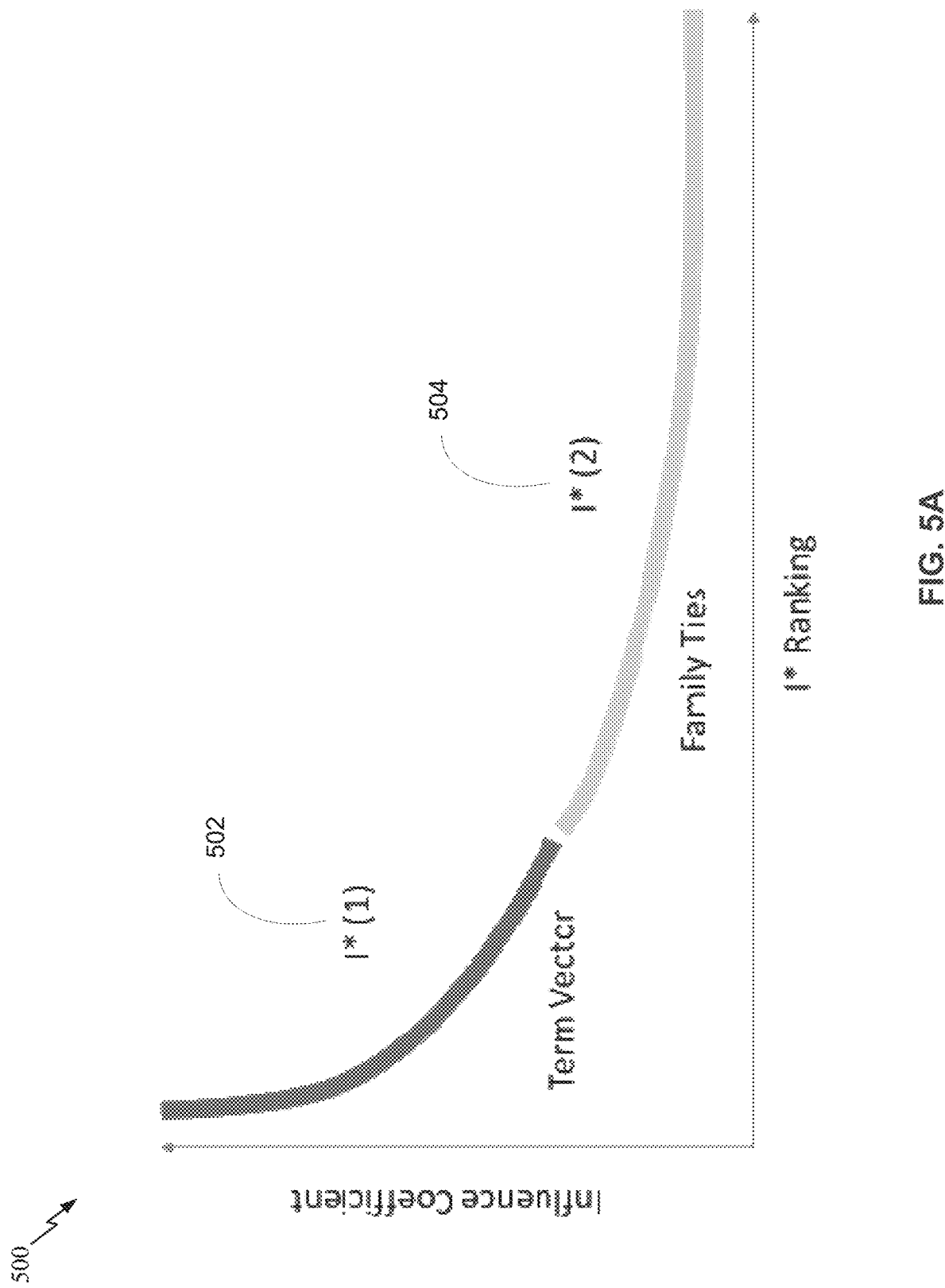
Figure 5B:
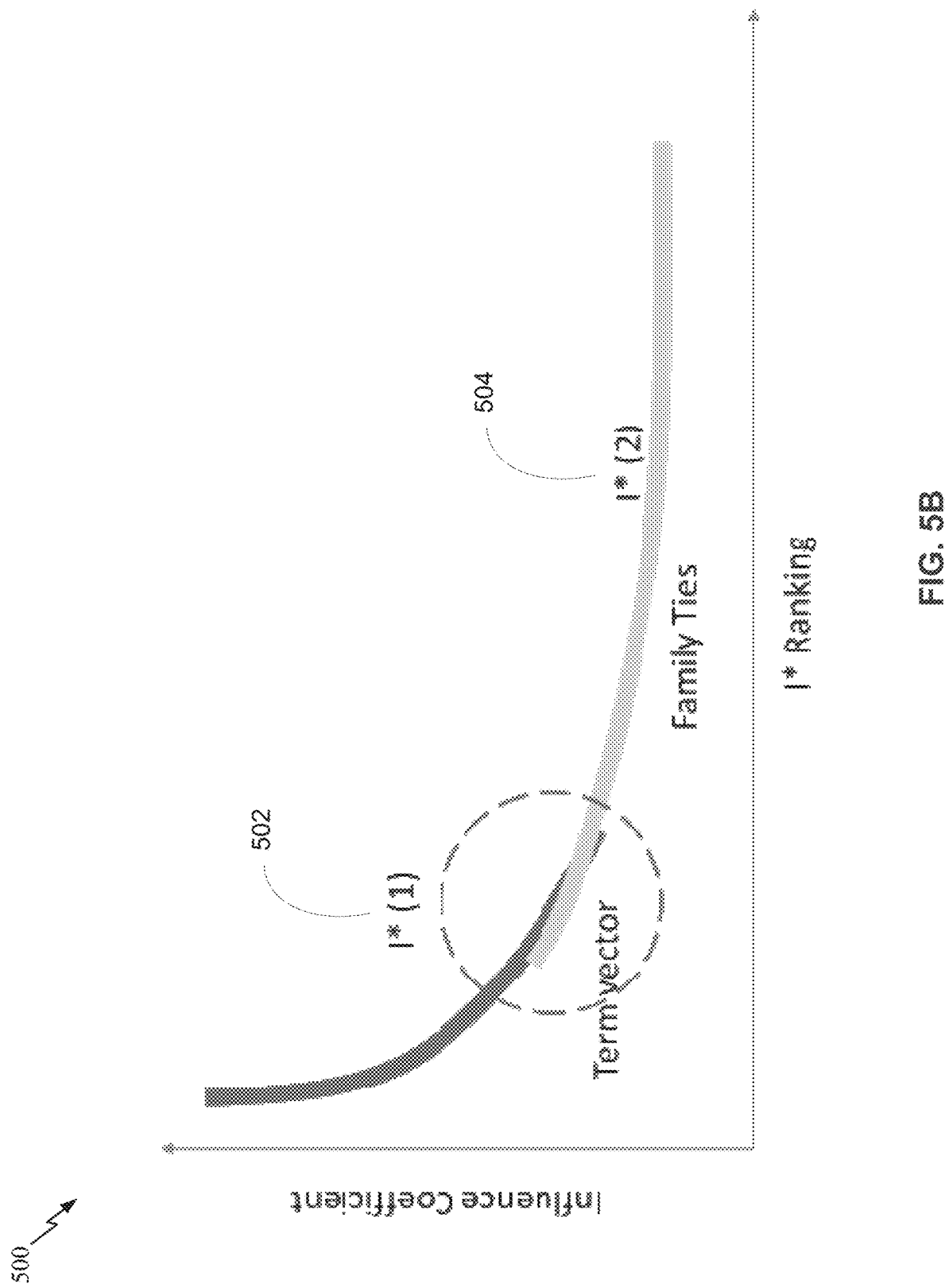

FIGS. 5A-C graphically illustrate various embodiments of methods to rank search results from two search processes. FIG. 5A depicts a graph 500 of the first set of search results 502 and the second set of search results 504. The first set of search result 502 are assigned higher influence coefficients (and therefore considered more relevant search results than the second set of search results 504). For example, in one embodiment, the first set of search results 502 are determined by a "term vector" search, or a search that provides results that are syntactically or lexigraphically related to the query. For example, the search can return results that include a particular word or group of words (e.g., search terms, keywords, etc.) that appear in the search query. For example, a search query of "get a car" could return syntactic results, such as "get car insurance," and "wash car." In one embodiment, the second set of search results 504 are determined by a "family relationship" search, or a search that provides results that are semantically related to the query. For example, the search can return results that are children of a common parent (grandparent, great-grandparent, etc.) of the search query (see FIG. 4). For example, a query of "get a car," might have a parent activity of "buy something expensive," (e.g., a species-genus relationship), or "get a loan" (a relationship based upon the relatedness of the two activities, such as the search query activity the parent activity). Such relatedness between activities can be predetermined and known by the ranking process (e.g., a memory or database can store such relationships between activities). The search results can include children of the parent activity. For example, if the search query is "get a car," and a parent activity is "buy something expensive," the related semantic search result (which is a child of the parent activity) can include "buy a house" Similarly, if the search query is "get a car," and a parent activity is "get a loan," the related semantic search result (which is a child of the parent activity) can also include "buy a house."

A ranking process (e.g., the ranking process known by the trademark INFOSTAR™ or I*™) can rank the search results based upon the type of relationship between the query and the search results. For example, in some embodiments, the ranking process ranks all syntactically related results higher than merely semantically related results, such as illustrated in FIG. 5A. In another illustrative, non-limiting example, a search for "car" (with no action verb attached) could syntactically or lexigraphically related results (e.g., results that include the term "car," such as "buy a car," "fix car," "wash car," etc.) as well as symantically related results (e.g., results that are siblings, or children of a parent activity, such as "get a loan."). The ranking process can be configured to rank the syntactic results higher than the semantic results, as shown in FIG. 5A.

In other embodiments, the ranking process can combine or interweave the search results from the two search processes (e.g., the syntactic search process and the semantic search process), as shown in FIGS. 5B and C. FIG. 5B depicts the graph 500 of the first set 502 and the second set 504 when there is overlap between two (or more) search processes. FIG. 5C depicts the graph 500 in which there is a mesh of dimensions and semantic relations. As depicted by graph 500 in FIG. 5C, the semantically related activities are explored and delivered for the first dimensionally ranked before the second. For example, the ranking process can be configured to select a first syntactic search result as the highest ranked result and the semantic results that relate to the first syntactic search result (e.g., its family relations) as the next highest ranked result. The ranking process can select a second syntactic search result as the next highest ranked result, and its semantic relations as the next highest ranked result, and so on.

For example, if an activity query is "car," the syntactic results could include "buy a car," "fix car," and "wash car." The result "buy a car" may have a semantic relationship to the activity "get a loan." If this is the only result that has a related semantic activity, the ranking process could rank the search results (from highest to lowest) as "buy a car," "get a loan," "fix car," and "wash car."

In some embodiments, the dashboard generator 350 may not update dashboards for all suppliers to which a generated demand pertains. The dashboard generator 350 may use heuristic rules to selectively notify suppliers of pending demands. For example, the dashboard generator 350 may take into account date and time, weather conditions, distance between consumer and supplier, the type of goods and/or services desired, cost, quality, gender, frequency, duration, or the like. As an example, if a consumer generates a demand for flowers, a supplier, like a flower shop, may not be notified if it is currently raining and the supplier is greater than a threshold distance from the consumer (e.g., 10 miles, etc.).

Likewise, in some embodiments, the agenda generator 310 may rank offers according to heuristic rules. For example, if a supplier builds an offer for goods and/or services at a fixed price and the consumer previously purchased an offer from the supplier, then the offer may be ranked higher.

Similarly, in some embodiments, the agenda generator 310 may generate suggestions based on heuristic rules. The term "heuristic" is a broad term that is intended to have its broadest, ordinary meaning. In addition, in some embodiment, a heuristic refers to a form of compiled knowledge that can be represented in a rule, logical construct, or other structure. For example, one rule of a heuristic might include, "if TIME is earlier than 8:00 am then GET BREAKFAST." In such example, if the time was earlier than 8:00 am then the agenda generator 310 could suggest that the user "get breakfast."

The suggestions may be based on observations (e.g., system observation, user observation, etc.) and/or preferences (e.g., time, input by the user, etc.). For example, if a consumer generated a demand for a table reservation at a restaurant for two people, and the consumer's friends gave the restaurant a high rating, then the agenda generator 310 may suggest that the consumer may also want to purchase flowers. As another example, if a consumer previously purchased a product, and the product is one that is periodically purchased (e.g., hair coloring, toothpaste, etc.), the agenda generator 310 may suggest that the consumer may want to purchase the product and/or purchase the product sometime during the week.

Moreover, in some embodiments, the dashboard generator 350 may group generated demands based on heuristic rules. For example, if several consumers generated demands for the same goods and/or services for a same or similar time, then the dashboard generator 350 may group those demands together. In addition, generated demands for the same goods and/or services for a different time may be displayed concurrently with the grouped demands. As an example, if a supplier offers haircuts, generated demands for haircuts on a Wednesday afternoon may be grouped and an indication may be made as to how many demands were generated for haircuts on Wednesday afternoon. Generated demands for haircuts on a Thursday morning may then be grouped and displayed below the Wednesday afternoon demand grouping, and so on. In some aspects, further groupings may be made. For example, the Wednesday afternoon and Thursday morning demands may be grouped, and a number of total demands may be indicated. Demands may be grouped (or ungrouped) based on supplier preference, until the dashboard generator 350 determines that time-based needs may involve more discrete demand exposure, and/or the like. As another example, if a supplier offers multiple related goods and/or services (e.g., the supplier sells olive oil and vinegar), then the dashboard generator 350 may group demands for those related goods and/or services (e.g., olive oil and vinegar demands would be grouped under "condiments"). In this way, a supplier may be able to efficiently build offers based on availability, demand, and/or the like.

Furthermore, in some embodiments, the offer builder 330 may suggest offers, as described herein, based on heuristic rules. For example, based on a generated demand that the supplier wishes to build an offer for, the offer builder 330 may suggest an offer type, a purchase price, and/or a time period for which the offer would be valid. The suggestions for offer type, purchase price, and/or time period may be based on patterns learned by the demand-driven market processor 210 and/or the statistical engine, not shown (e.g., patterns based on outcome (either after a transaction has been consummated or a transaction has not been consummated), such as what incentives works best for what demands, what demands are rapidly fulfilled, what offers are rapidly purchased, what demands are less successful, what offers are less successful, etc.).

In some embodiments, the server 120 may be configured to accommodate new activities. For example, the server 120 may be configured to generate demands and/or build offers for new types of activities based on data received from external sources (e.g., a supplier offering goods and/or services not already recognized or covered by implemented activities, a consumer desiring goods and/or services not already recognized or covered by implemented activities, etc.). The new activity may be included in a new category, an existing category, a new subcategory, an existing subcategory, or the like. The propagation of the new activity through the system (e.g., level of exposure to users and suppliers) may be based on criteria such as editorial consistency with existing activities and organic utilization.

In some embodiments, the server 120 may include a verification processor, not shown. The verification processor may be configured to determine whether a supplier is a legitimate business or person. The verification processor may monitor whether the supplier is the person or entity as represented, whether the supplier has the authority to bind the person or entity in contract, whether the user is in violation of any policy or other discretionary standard, and/or whether a method of recourse is available for any violation of contract, policy or similar breach. Based on these factors, the verification processor may classify the supplier as verified, in good standing, or not in good standing. Based on the classification, the supplier's use of the network application may or may not be restricted.

Figure 6:
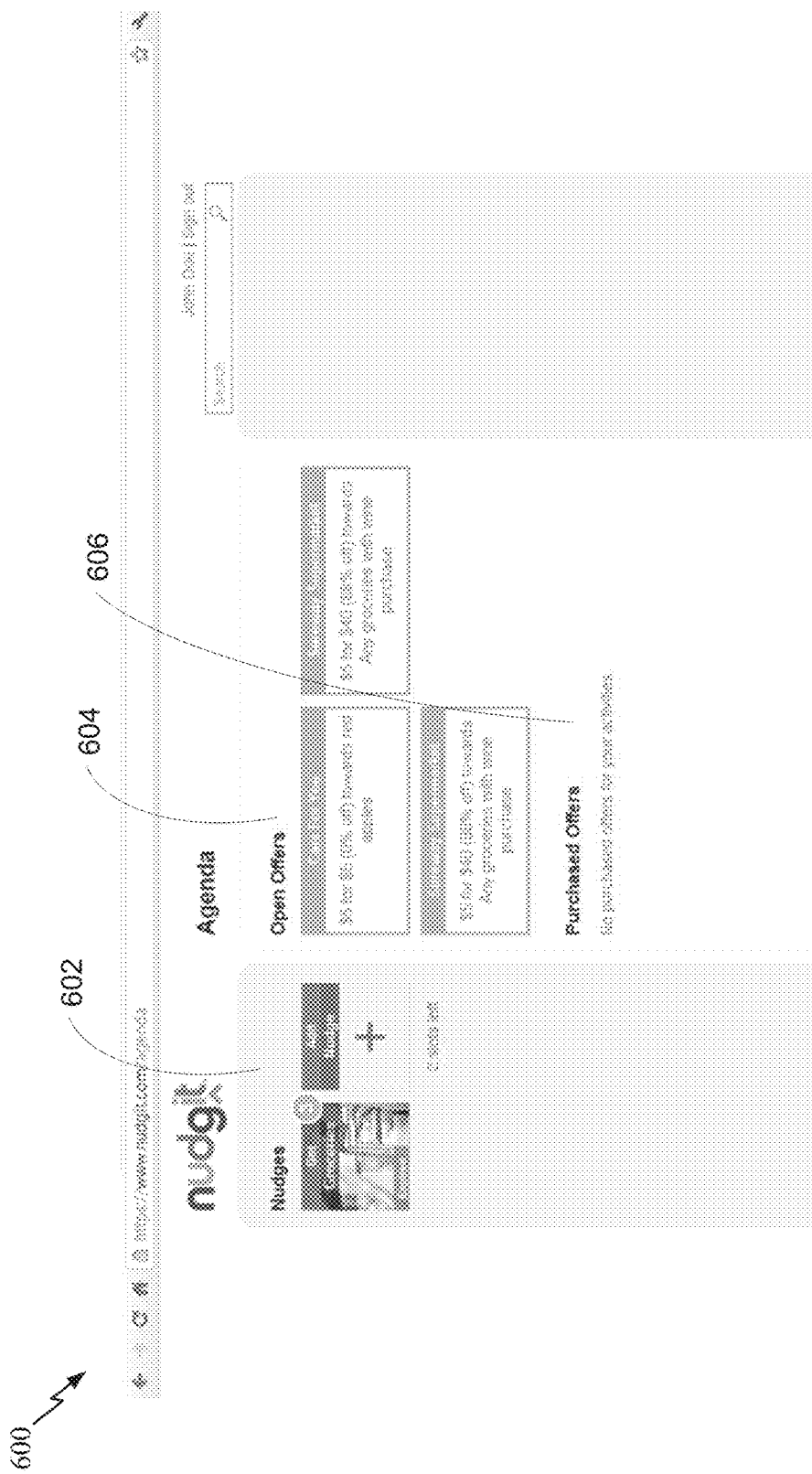
FIG. 6 illustrates an agenda viewed through a browser accessing a network application.

FIG. 6 illustrates an agenda 600 viewed through a browser accessing a network application. Although the illustrated agenda 600 is viewed through a browser, the same or similar agenda (as well as all of the browser-implemented examples provided herein) may be viewed through any other client application, including, but not limited to a stand-alone application (e.g., a downloadable program, application, "app," etc.). The agenda 600 includes active and/or expired demands 602 (referred to in some figures, and below, by the term, "nudges" 602), open offers 604, and purchased offers 606. The nudges 602 may indicate which ones are expired and/or a number of pending offers associated with the nudge. The open offers 604 may include a description of the type of goods and/or services being offered (and the deal being offered) and/or who made the offer. While purchased offers 606 is empty as illustrated in FIG. 6, the purchased offers 606 may include similar information as open offers 604.

Figure 7A:
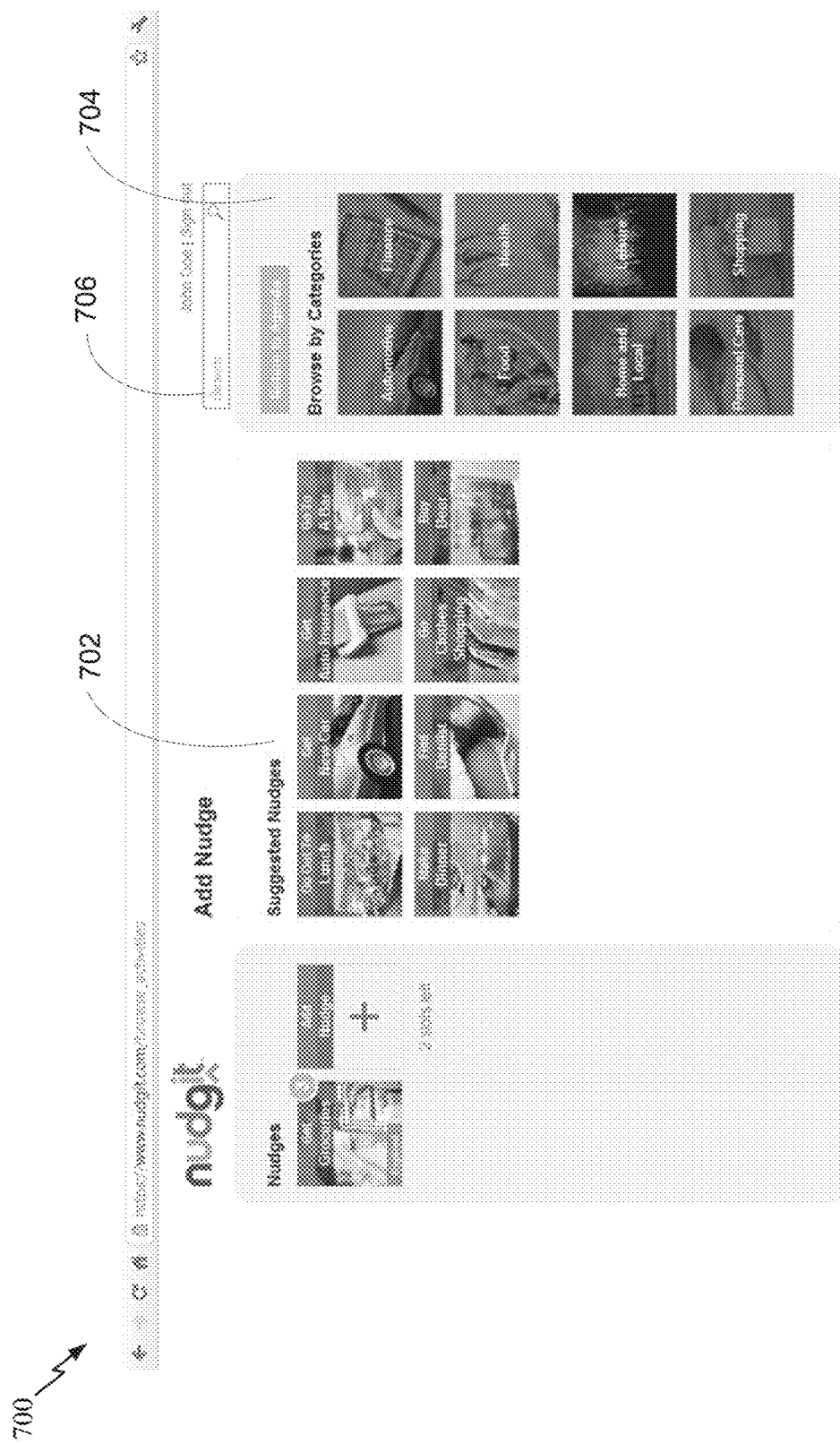
FIGS. 7A-H illustrate another agenda viewed through a browser accessing a network application in which a demand is being generated.

FIGS. 7A-H illustrate another agenda 700 viewed through a browser accessing a network application in which a demand is being generated. In FIG. 7A, the consumer may select from one of the suggested nudges 702, one of the categories 704, and/or perform a free-form search via search box 706 in order to begin the demand generation process by choosing an activity. Some of the suggested nudges 702 include "go out to lunch," "get new car," "get auto insurance," and so on. Some of the categories 704 include "automotive," "finance," "food," and so on. If a free-form search is undertaken, an ontology, such as the demand ontology, may be implemented in order to generate an appropriate demand. Also, based on the ontology, the search box may display the most likely expression matches in real-time as the consumer types or otherwise enters characters into the search box (e.g., an auto-complete service based on an ontology, like the demand ontology).

Figure 7B:
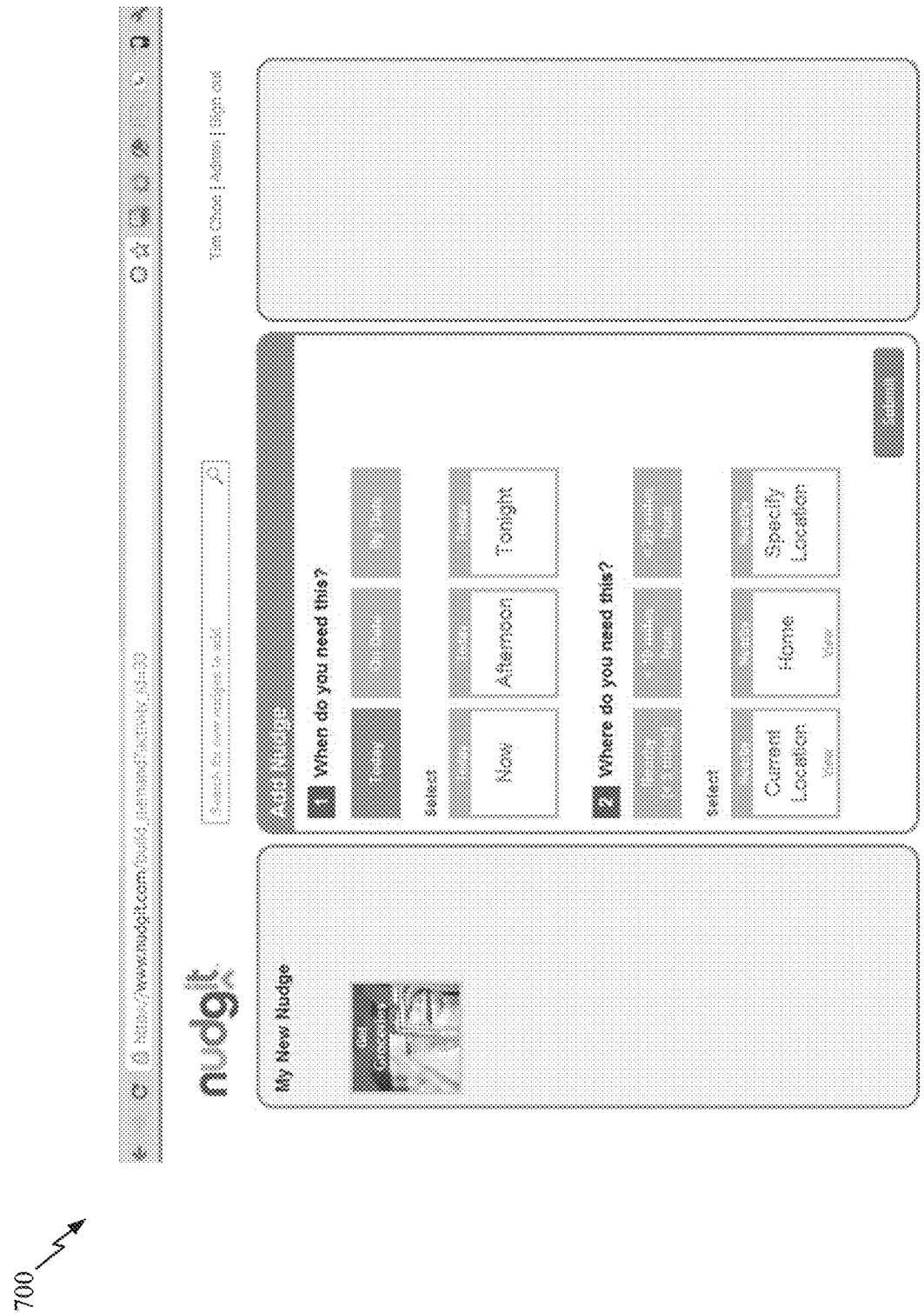
Figure 7C:
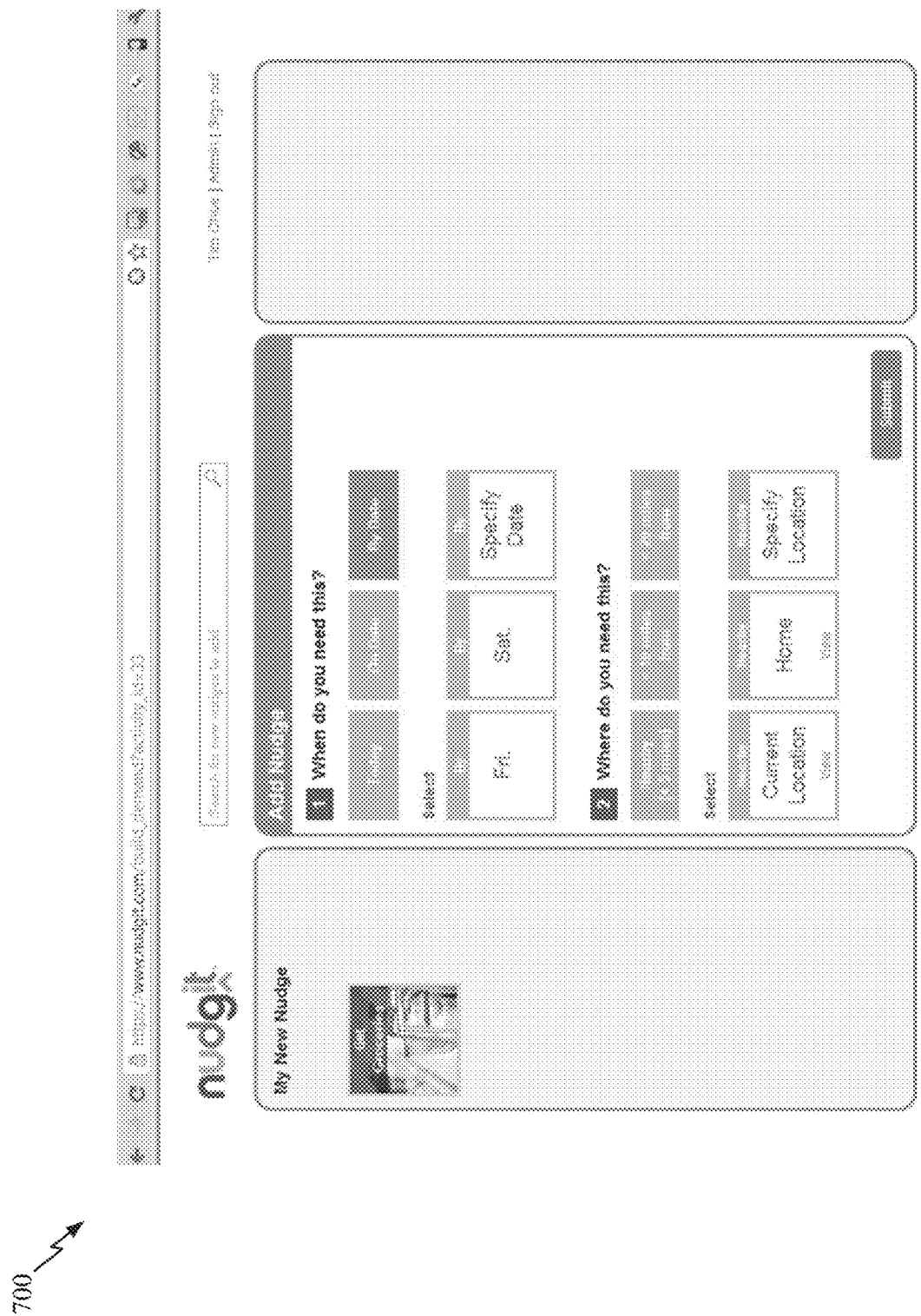

FIGS. 7B-C illustrate the next step after an activity has been chosen. As illustrated, "get groceries" was the activity chosen. The network application, via for example the demand generator 320, provides several options to the consumer. The consumer can select on which date or by which date the consumer desires the activity. In addition, in some embodiments if the user selects Today as the date the activity is desired, the network application can provide further predetermined choices relating to the time of day, such as Now, Afternoon, Tonight (see FIG. 7B). In some embodiments, if the user selects On/By Date as the date the activity is desired, the network application can provide further predetermined choices relating to the On/By Date, such as Tomorrow, Day After Tomorrow, Specified Date, etc. The consumer can also specify a location for receiving the desired activity (e.g., at, nearby and/or within a selected distance (e.g., within a selected radius) of a Current Location, a Saved Location (e.g., Home, Work, etc.), a Specific Location (e.g., enter the address, area code, zip code, landmark, etc.)).

Figure 7D:
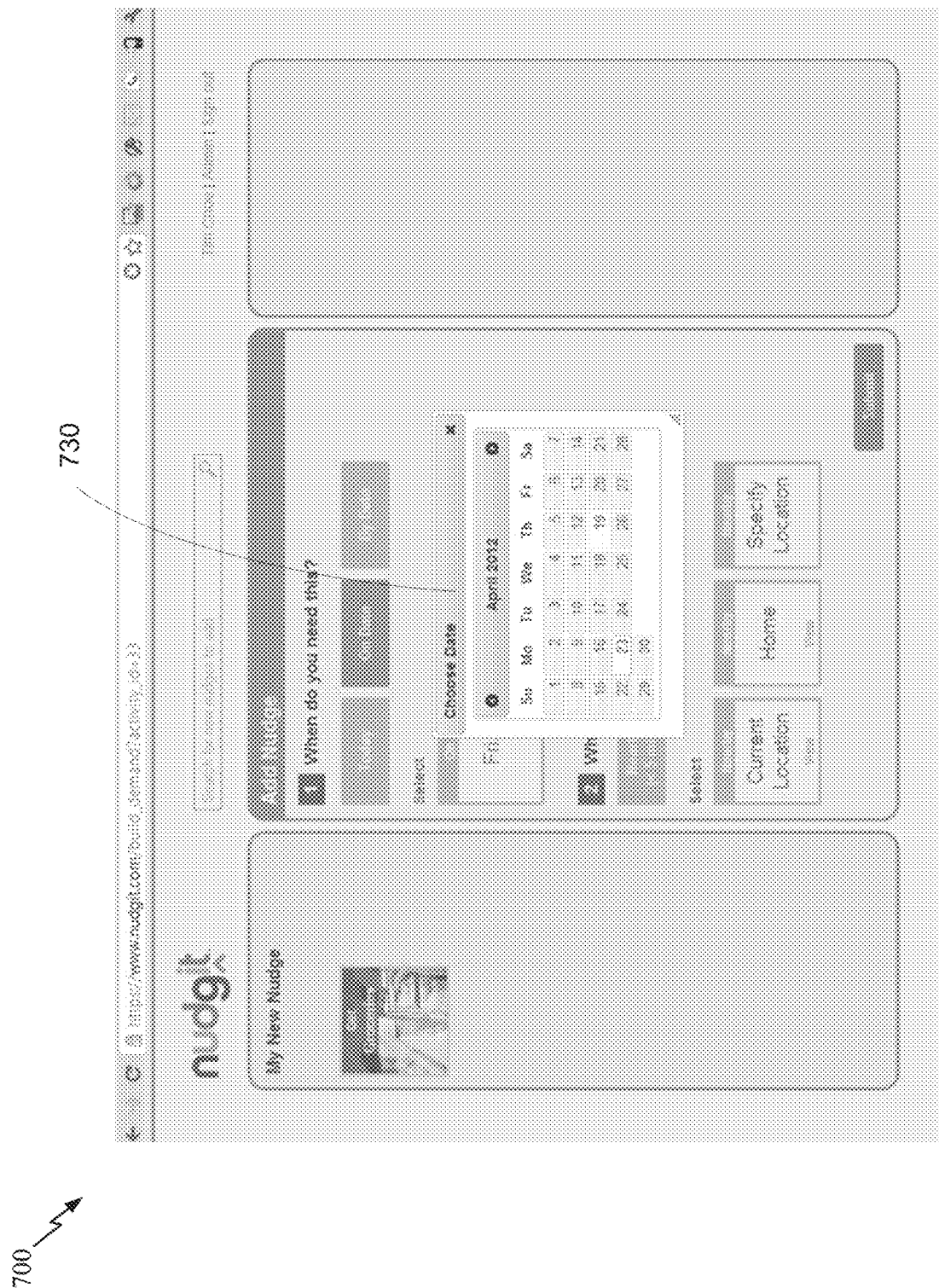
Figure 7E:
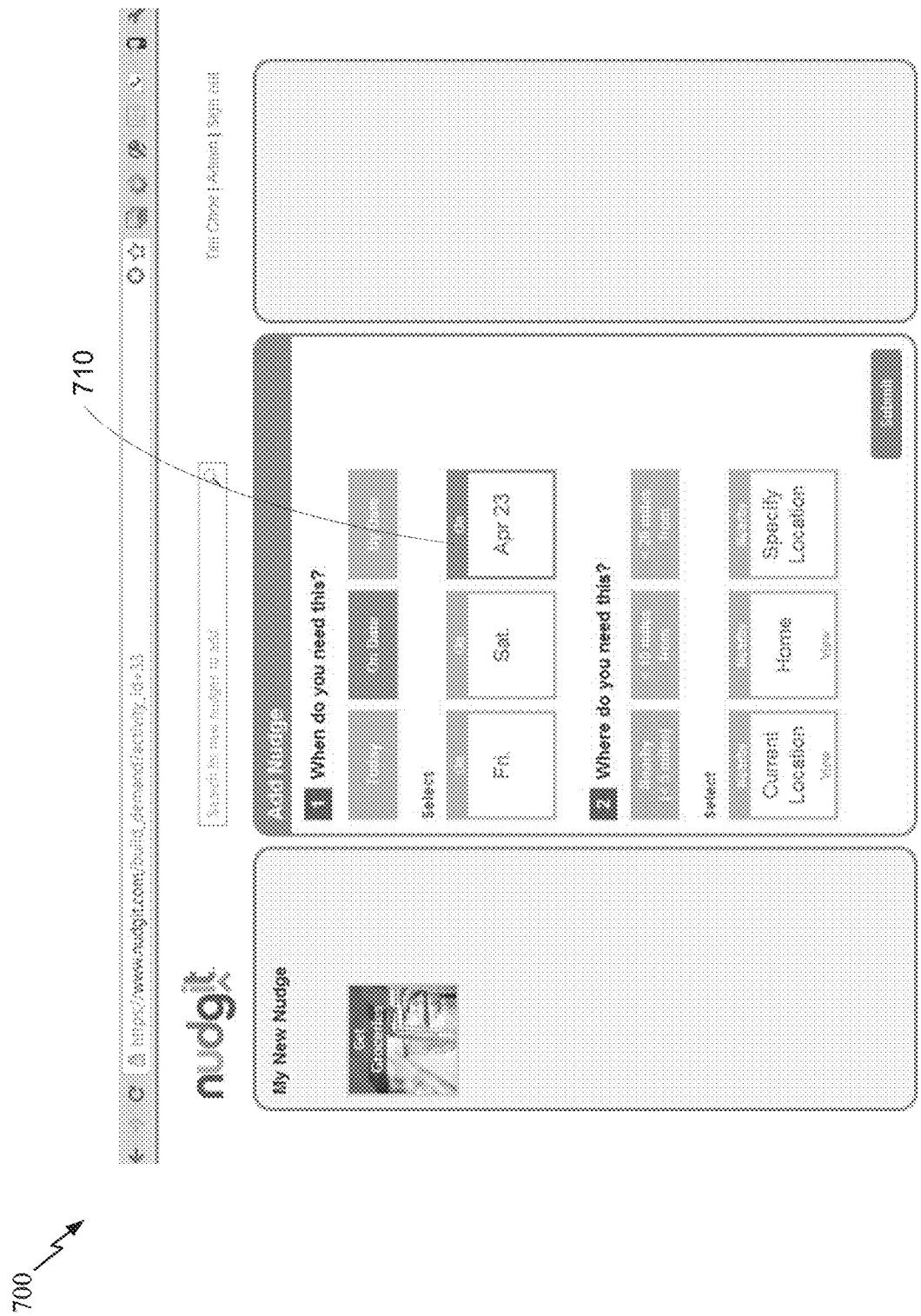

FIG. 7D illustrates a pop-up window 730 that displays a calendar and that may appear when selecting a date. In other embodiments, alternatives to pop-up windows may be used, such as separate tabs, screen overlays, sliding panels, and the like. For example, a mobile device may show separate windows using a horizontal or vertical scrolling display, which may advantageously require less display area. FIG. 7E illustrates that upon selecting a date, the chosen date is displayed in box 710.

Figure 7F:
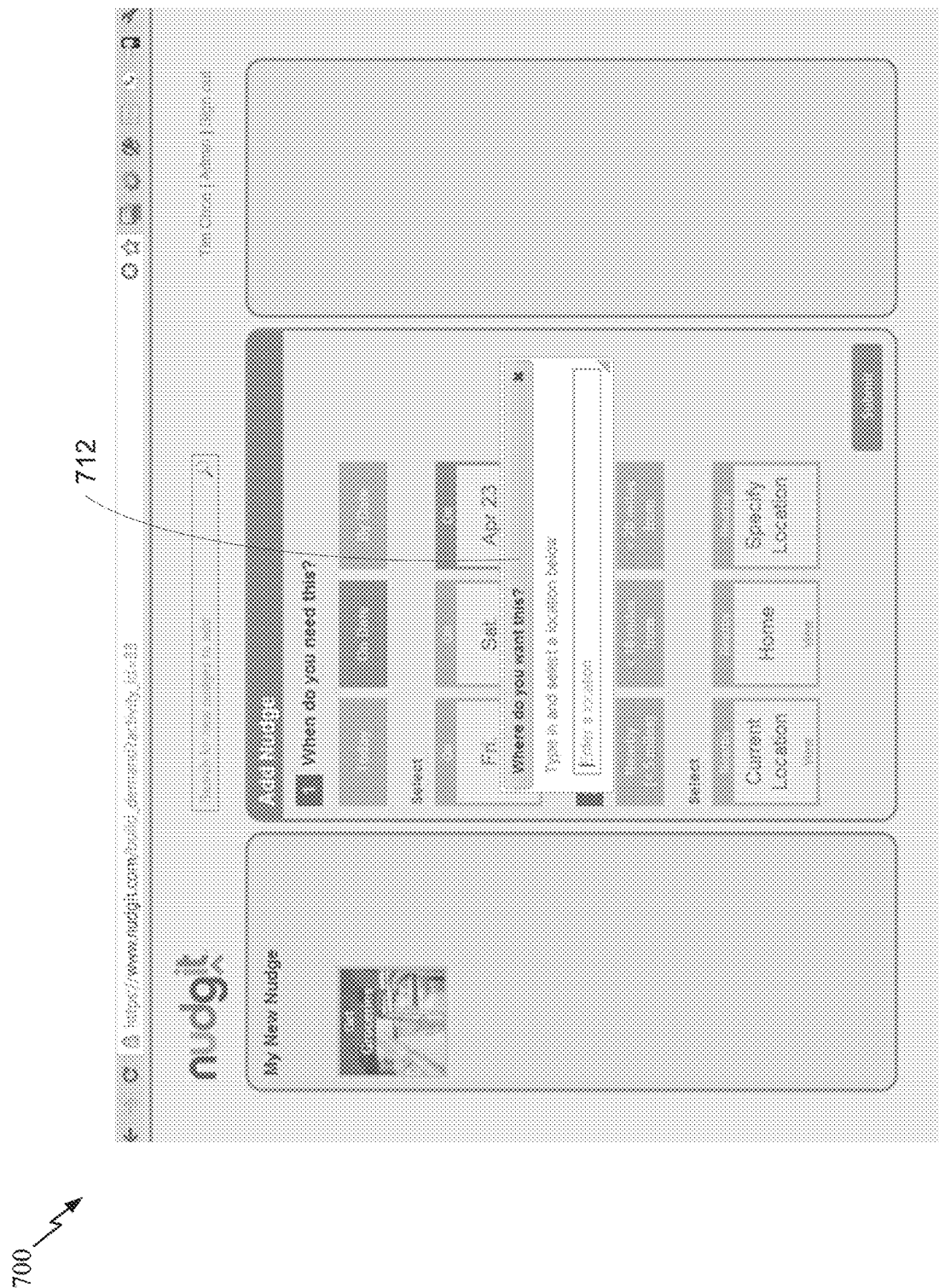
Figure 7G:
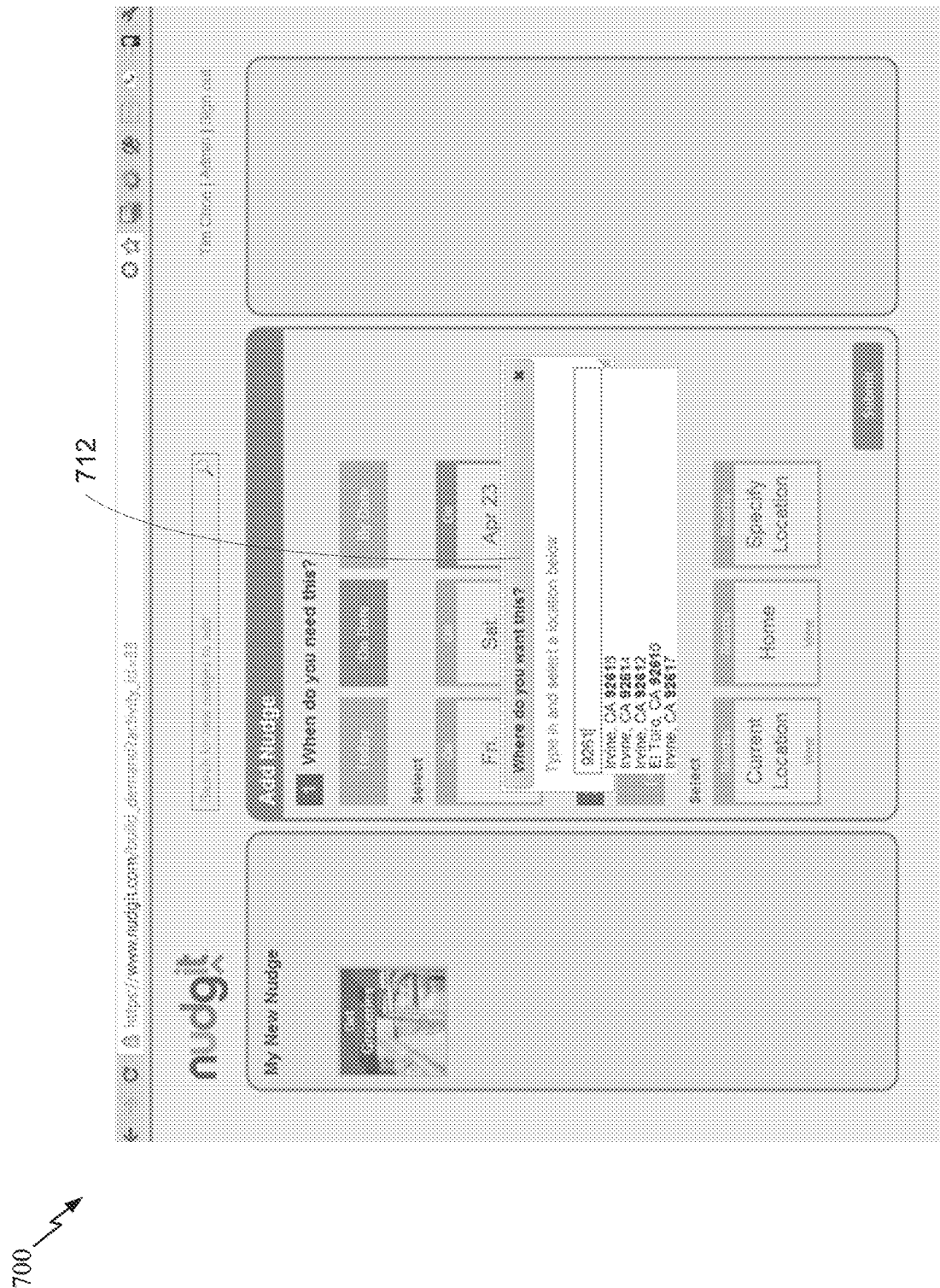

FIG. 7F illustrates a pop-up window that displays a text field box that may appear when selecting to specify a location. In other embodiments, alternatives to pop-up windows may be used, such as separate tabs, screen overlays, sliding panels, and the like. For example, a mobile device may show separate windows using a horizontal or vertical scrolling display, which may advantageously require less display area. If current location in box 712 is chosen, the server 120 may attempt to determine a location of the end user device 115. The server 120 may determine the location based on global positioning satellite information, an Internet protocol ("IP") address of the end user device 115, and/or any other known means of determining a location of an end user device 115. FIG. 7G illustrates that upon typing in the text field box, an ontology, such as a demand ontology, may be implemented in order to display the most likely expression matches in real-time. In some embodiments, the most likely expression matches may be based on previous locations chosen by the consumer and/or a current location of the consumer.

Figure 7H:
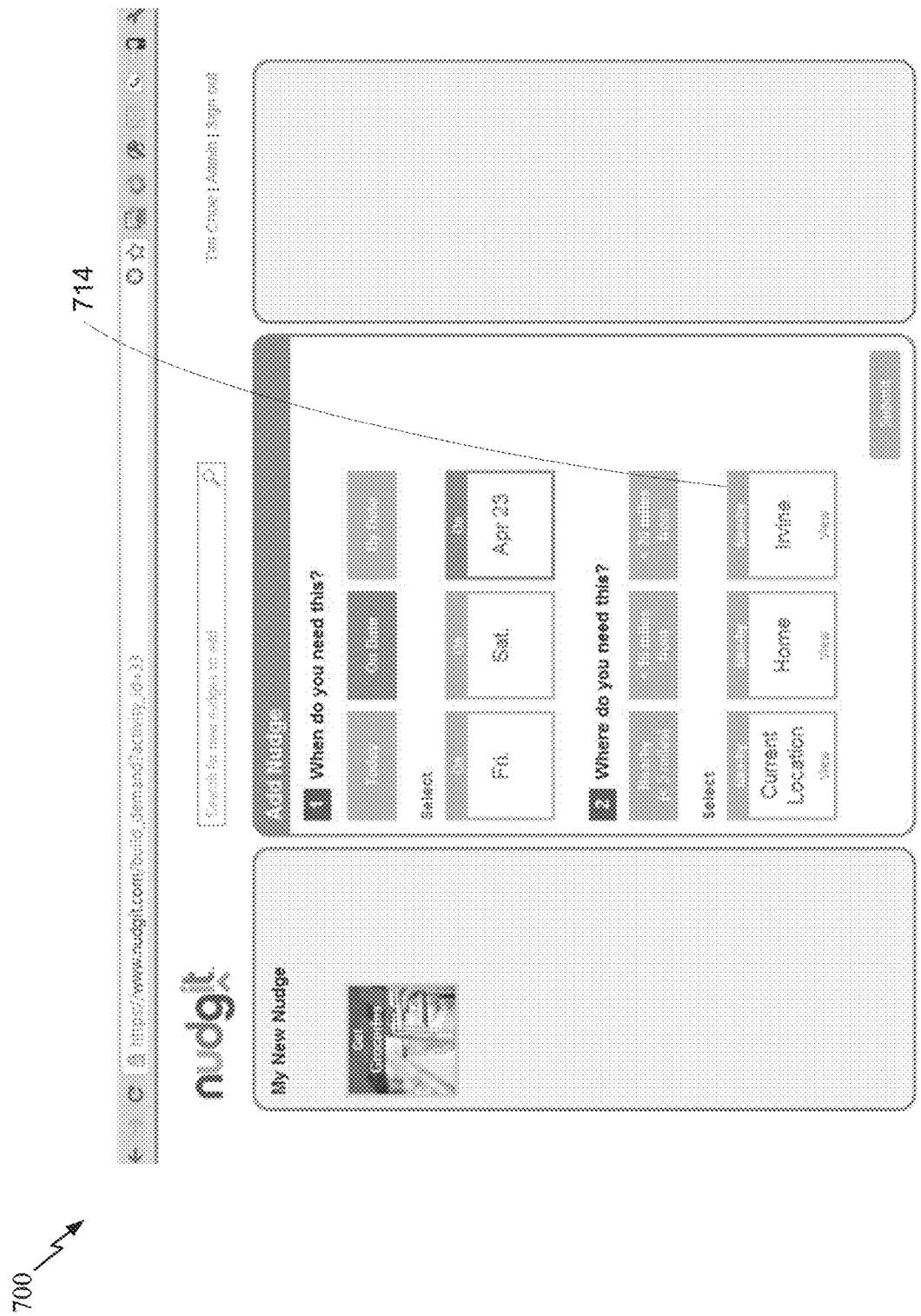

FIG. 7H illustrates that upon selecting a location for the desired activity, the chosen location is displayed in box 714.

Figure 8:
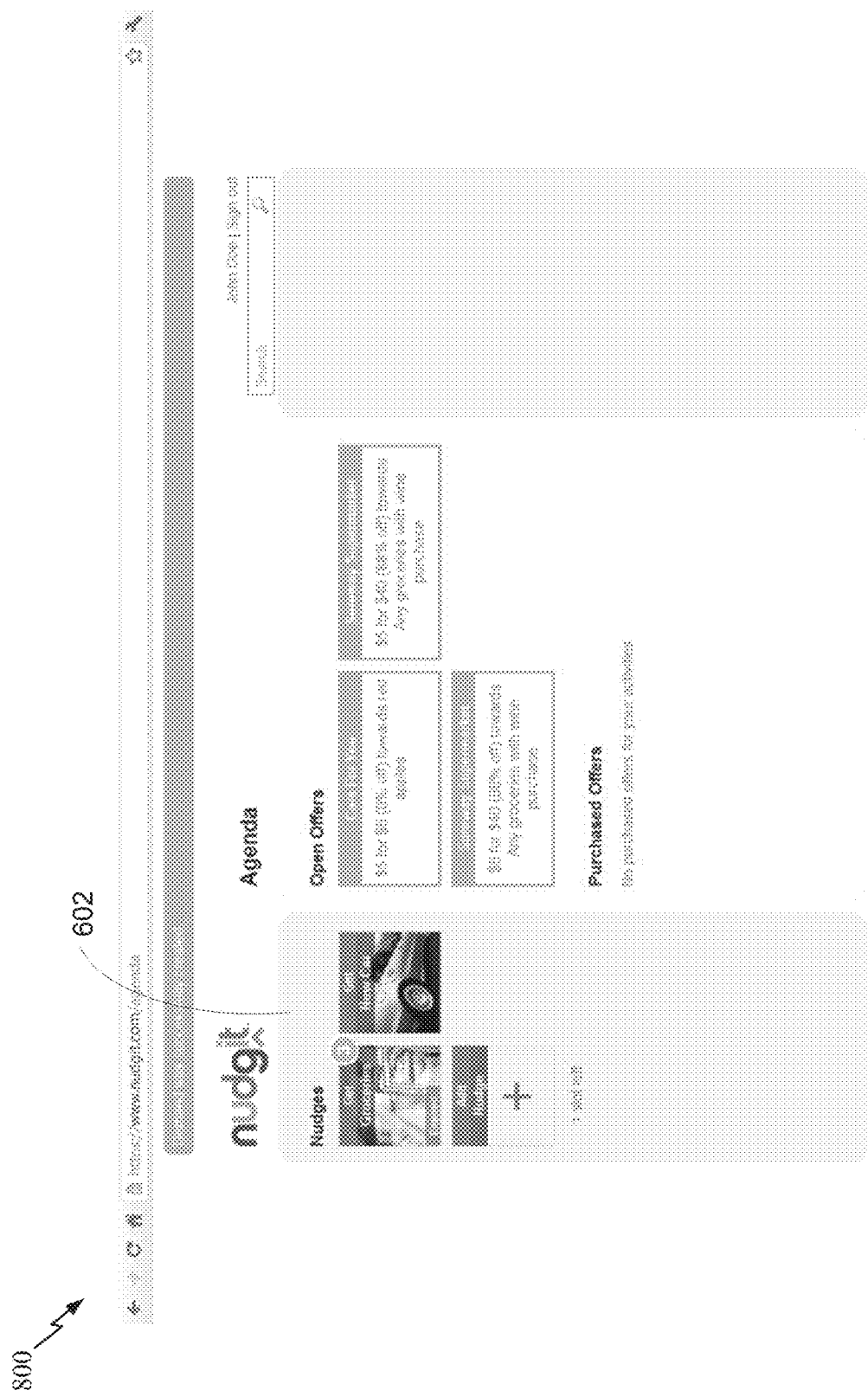
FIG. 8 illustrates another agenda viewed through a browser accessing a network application.

FIG. 8 illustrates another agenda 800 viewed through a browser accessing a network application. FIG. 8 depicts the agenda 800 after a new demand has been generated. For example, after generating a demand for "get new car" as described with respect to FIGS. 7A-H, nudges 602 includes a new icon indicating that "get new car" is now an outstanding nudge.

Figure 9:
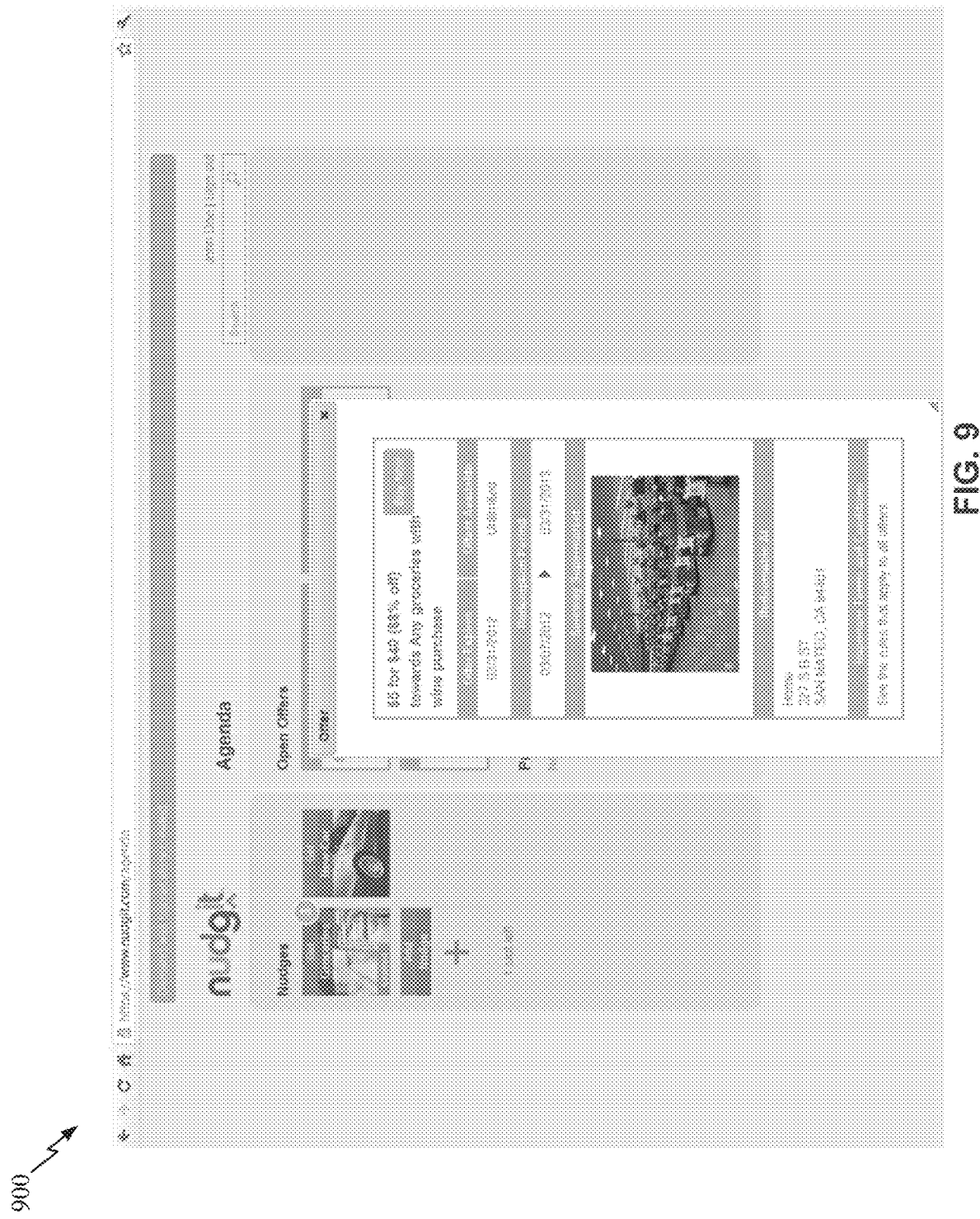
FIG. 9 illustrates another agenda viewed through a browser accessing a network application.

FIG. 9 illustrates another agenda 900 viewed through a browser accessing a network application. FIG. 9 depicts the agenda 900 after one of the open offers is selected (e.g., via a mouseover, a click, a gesture, a voice input, etc.). A pop-up window may appear and include a description of the offer (e.g., what it is for, who made the offer, when it expires, a redemption period, a photo of the location and/or goods and/or services, a location where the offer is redeemable, terms and conditions, and/or an option to purchase the offer). In other embodiments, alternatives to pop-up windows may be used, such as separate tabs, screen overlays, sliding panels, and the like. For example, a mobile device may show separate windows using a horizontal or vertical scrolling display, which may advantageously require less display area.

Figure 10:
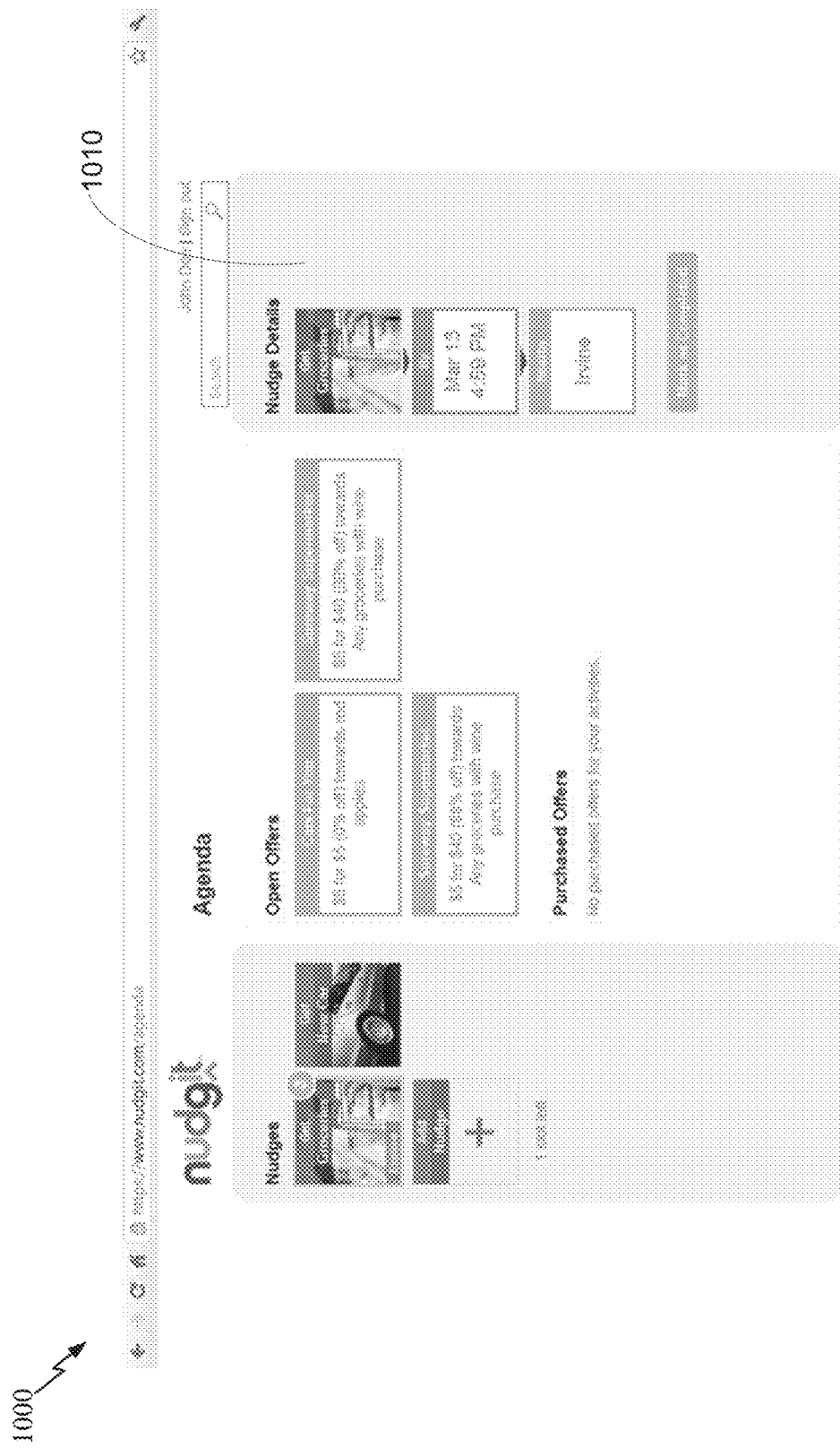
FIG. 10 illustrates another agenda viewed through a browser accessing a network application.

FIG. 10 illustrates another agenda 1000 viewed through a browser accessing a network application. Upon selecting one of the expired or outstanding nudges, details of the nudge may become visible, such as in field 1010, and the offers associated with that nudge may be visible.

Figure 11:
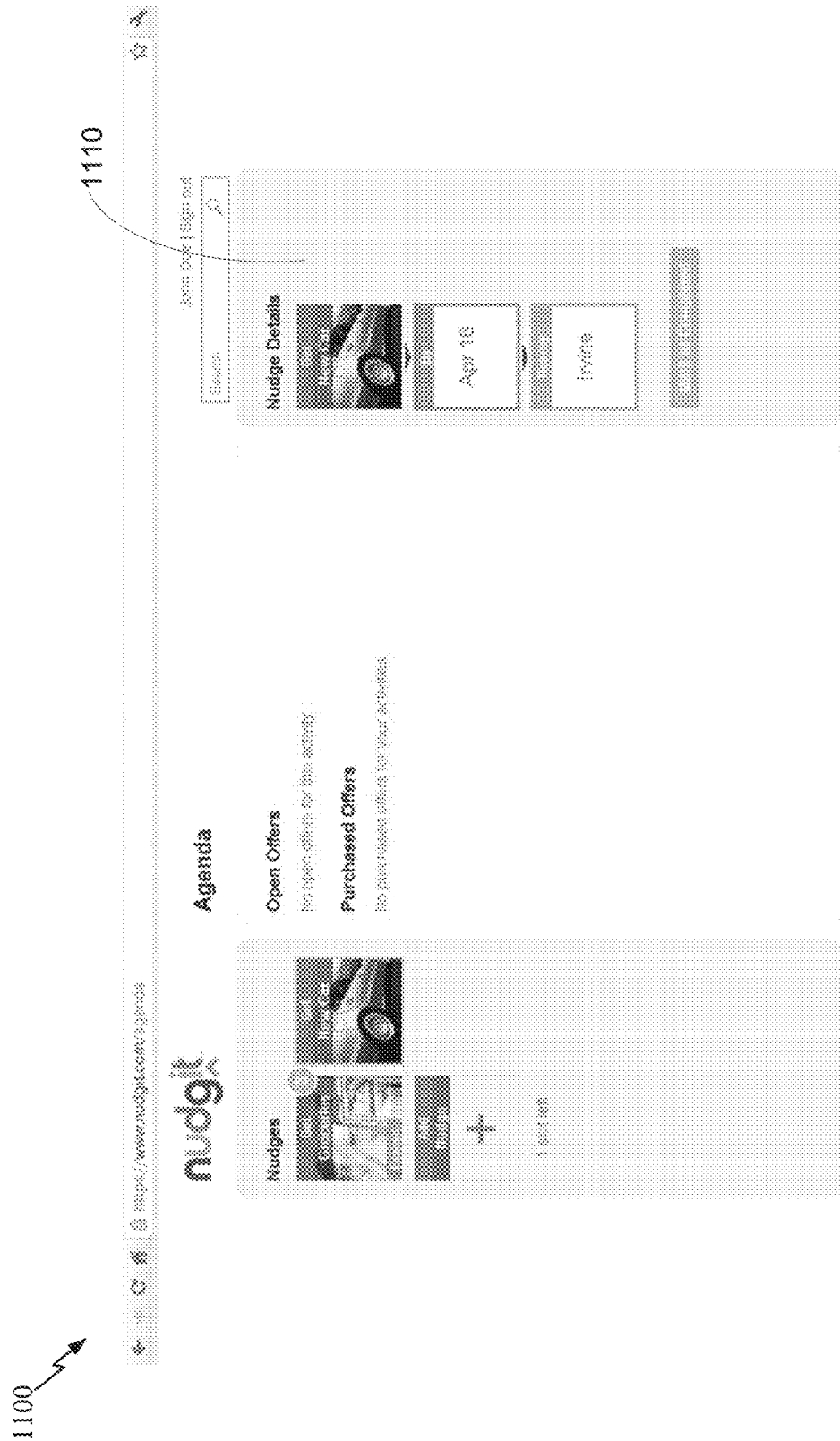
FIG. 11 illustrates another agenda viewed through a browser accessing a network application.

FIG. 11 illustrates another agenda 1100 viewed through a browser accessing a network application. Upon selecting the "get new car" nudge (e.g., via a mouseover, a click, a gesture, a voice input, etc.), the open and purchased offers become empty since no offers have been received for the newly created nudge. However, the details of the nudge may still be visible, such as in field 1110.

Figure 12:
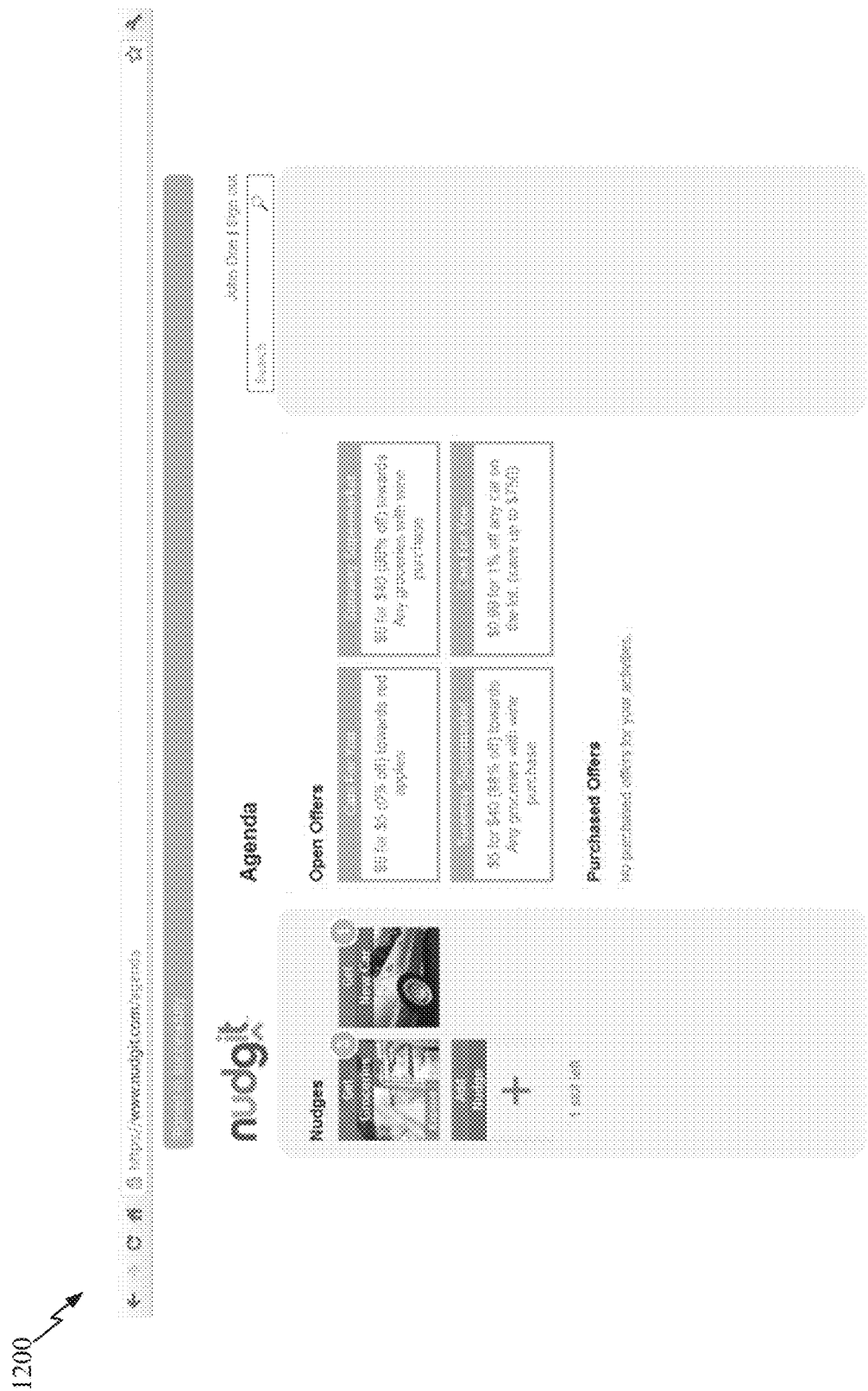
FIG. 12 illustrates another agenda viewed through a browser accessing a network application.

FIG. 12 illustrates another agenda 1200 viewed through a browser accessing a network application. As illustrated in FIG. 12, an offer has been received for the "get new car" nudge, as indicated in the open offers field as well as by the numbered icon placed over the "get new car" nudge.

Figure 13:
FIG. 13 illustrates another agenda viewed through a browser accessing a network application.

FIG. 13 illustrates another agenda 1300 viewed through a browser accessing a network application. FIG. 13 depicts the agenda 1300 after an offer associated with the "get new car" nudge is selected. A pop-up window may appear and include a description of the offer as described herein. In other embodiments, alternatives to pop-up windows may be used, such as separate tabs, screen overlays, sliding panels, and the like. For example, a mobile device may show separate windows using a horizontal or vertical scrolling display, which may advantageously require less display area.

Figure 14A:
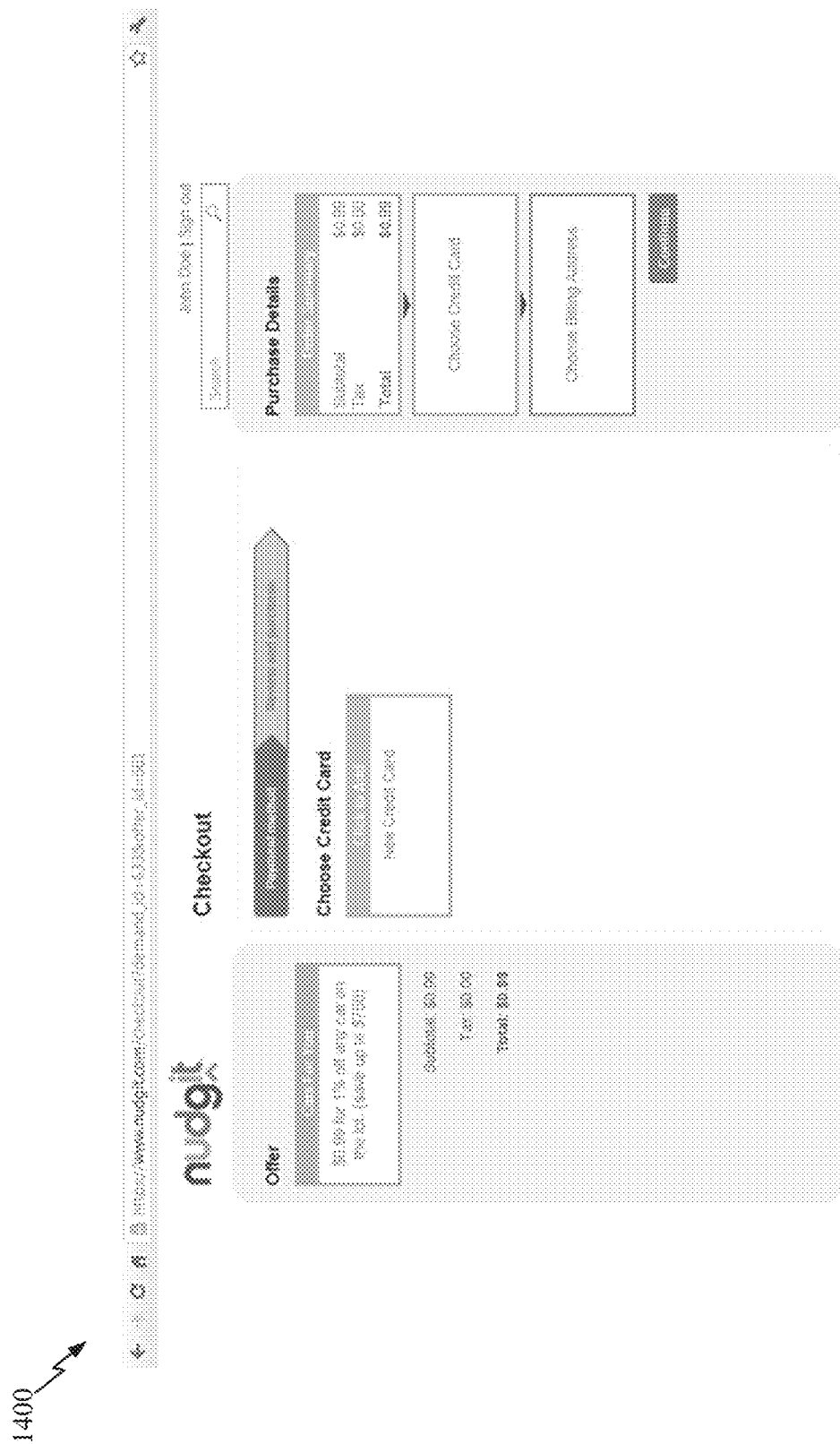
FIGS. 14A-E illustrate another agenda viewed through a browser accessing a network application in which an offer is being purchased.
Figure 14B:
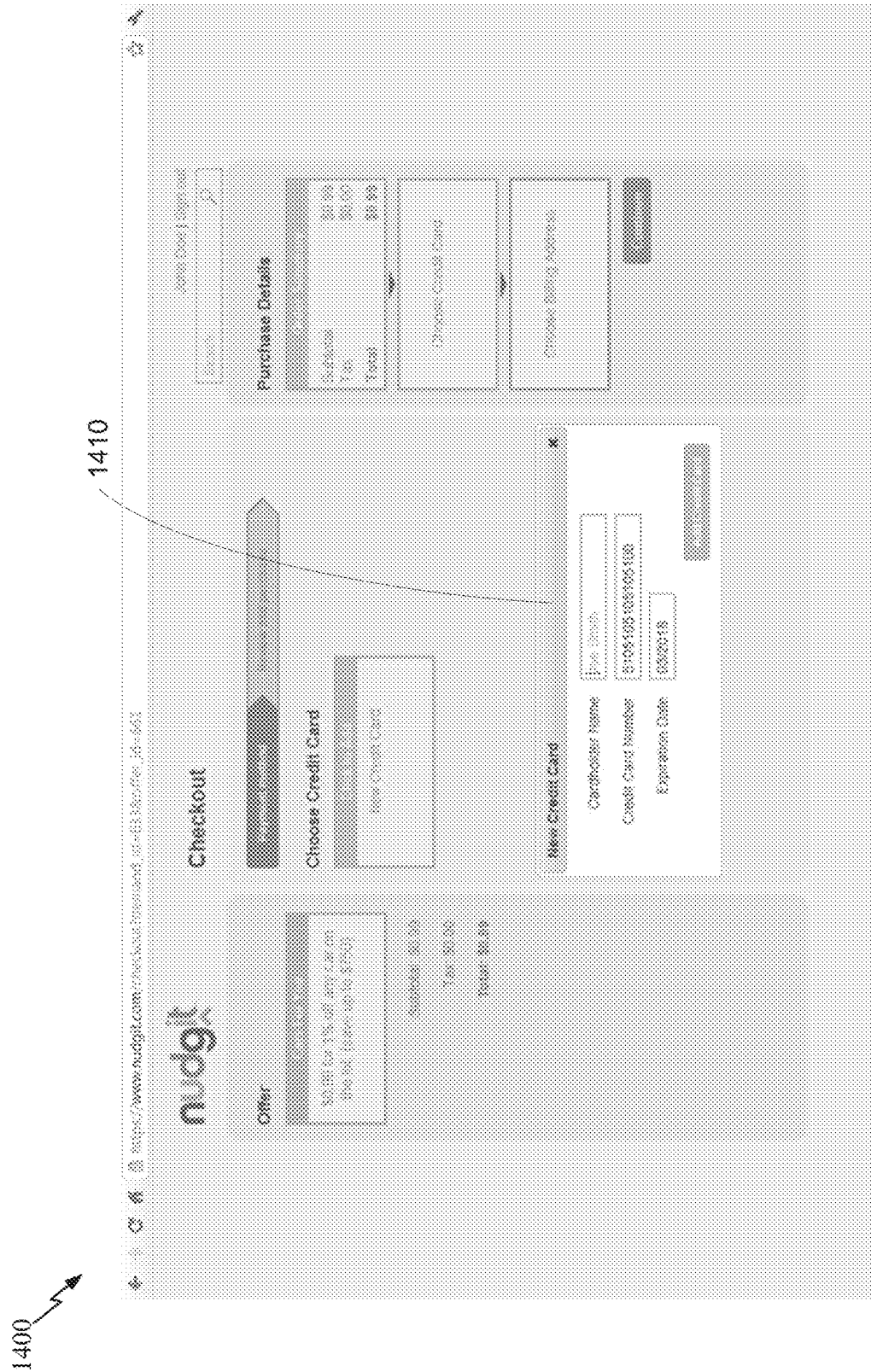
Figure 14C:
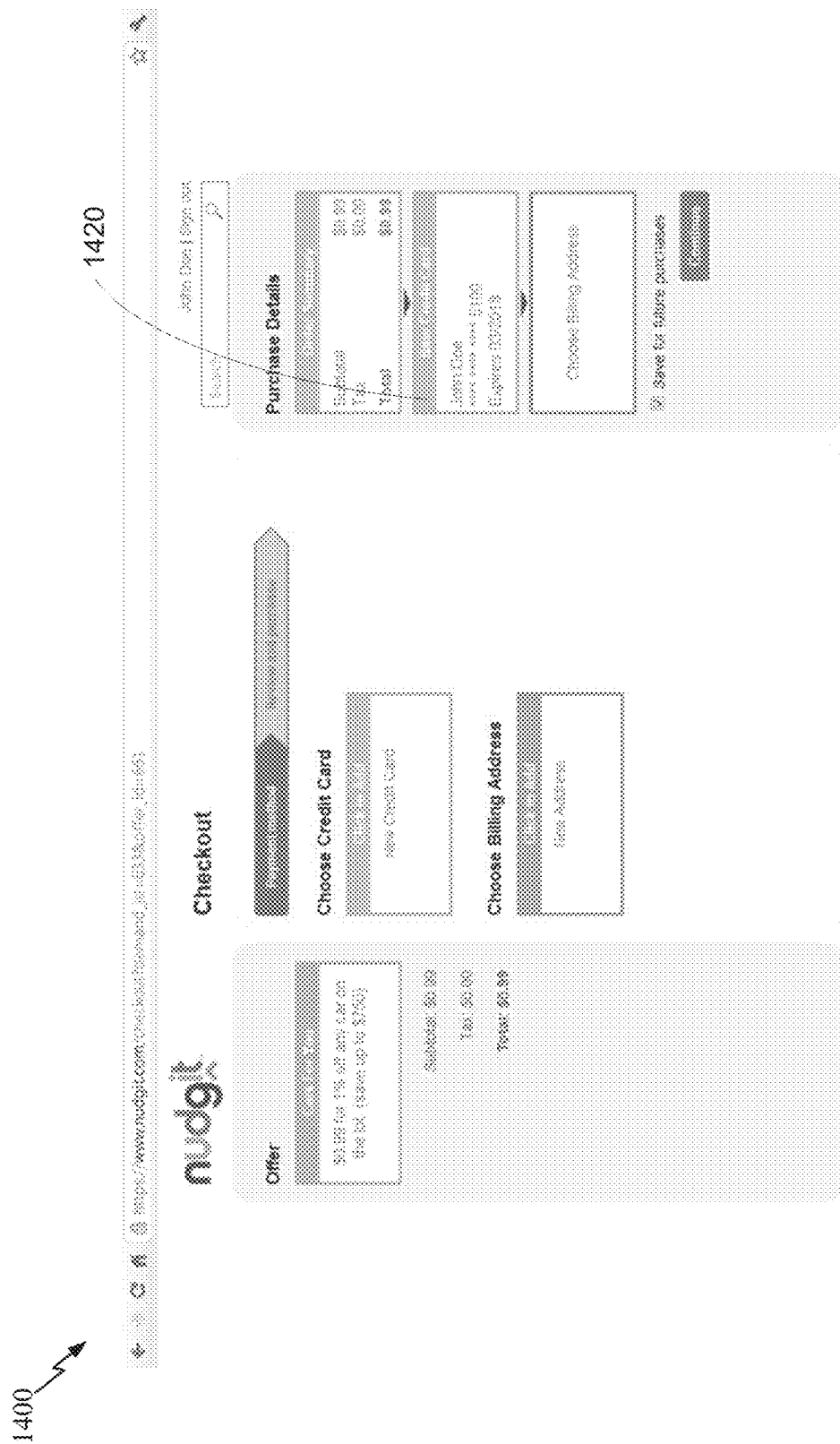
Figure 14D:
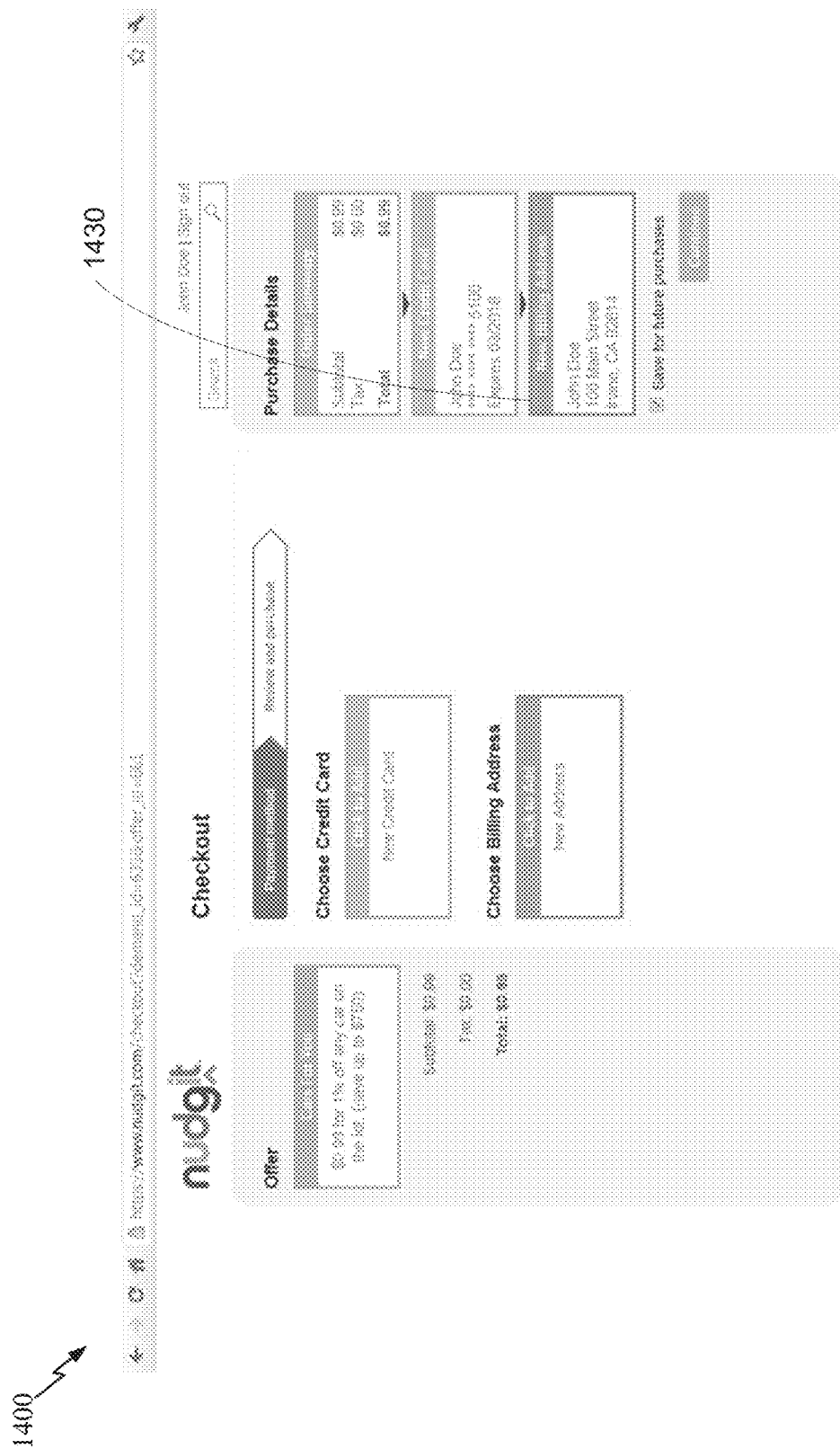
Figure 14E:
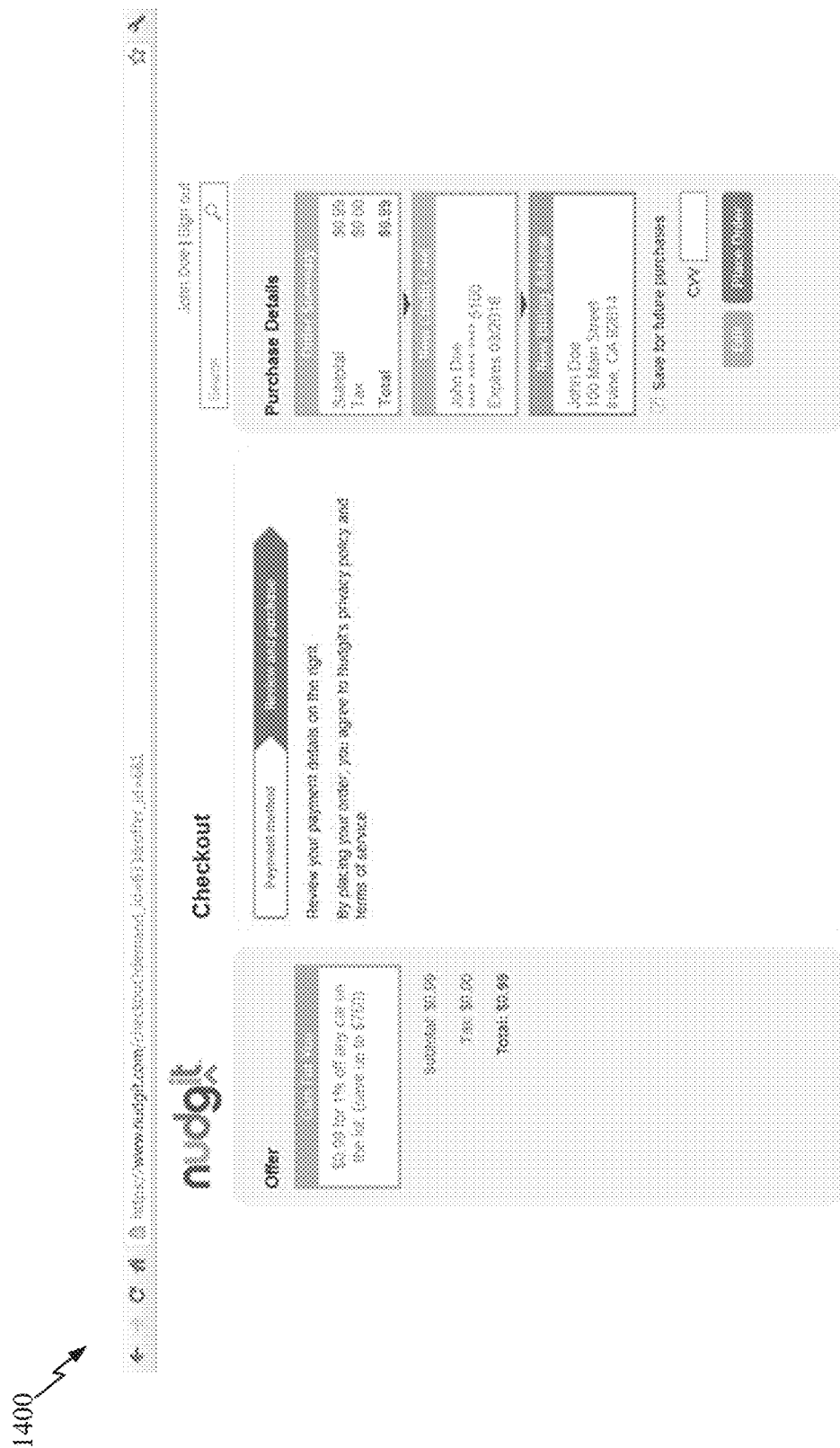

FIGS. 14A-E illustrate another agenda 1400 viewed through a browser accessing a network application in which an offer is being purchased. As illustrated in FIG. 14A, the agenda 1400 may provide a description of the offer that may be purchased, including a subtotal price and a total price after taking into account tax and/or other fees. In an embodiment, a consumer may be able to enter credit card or other purchase information (e.g., check, wire transfer, gift card, etc.). For example, as illustrated in FIG. 14B, a pop-up window 1410 may appear that allows a consumer to enter and store credit card or other purchase information. In other embodiments, alternatives to pop-up windows may be used, such as separate tabs, screen overlays, sliding panels, and the like. For example, a mobile device may show separate windows using a horizontal or vertical scrolling display, which may advantageously require less display area. Likewise, as illustrated in FIG. 14C, a consumer may also store billing information (e.g., name, address, etc.). In some embodiments, once the credit card or other purchase information is entered, a representation of this information may be displayed in a box, such as box 1420. As illustrated in FIG. 14D, a representation of the billing information may also be displayed in a box, such as box 1430, once the information is entered. In an embodiment, the consumer may be given a choice as to whether he or she wants to store credit card or other purchase information in memory, such as memory residing on server 120. As illustrated in FIG. 14E, a consumer may be given an option to edit the purchase order before it is submitted and the transaction consummated.

Figure 15:
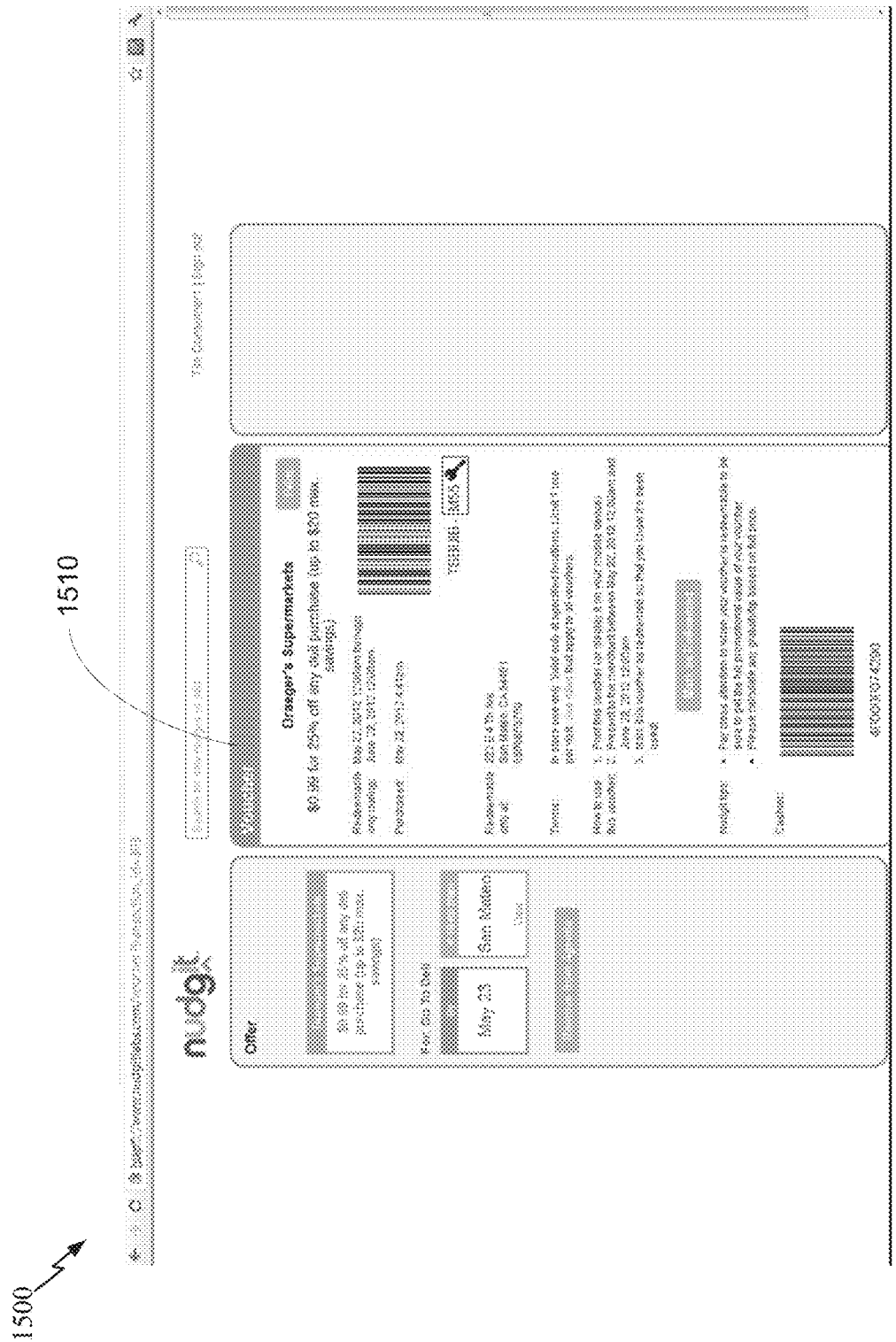
FIG. 15 illustrates another agenda viewed through a browser accessing a network application in which a voucher is generated based on the purchase of an offer.

FIG. 15 illustrates another agenda 1500 viewed through a browser accessing a network application in which a voucher 1510 is generated based on the purchase of an offer. The voucher 1510 may include identification information (e.g., a bar code, a verification code, a unique key, and/or the like), a location that the voucher 1510 is redeemable at, a name or other identification of the purchasing party, a time the offer was purchased, an identification of the offer purchased, a time period during which the voucher 1510 is redeemable, terms and conditions of use of the voucher 1510, and/or other like information. As an example, the identification information may be generated by the network application and/or supplied by a supplier. In an embodiment, the voucher 1510 is printable. In other embodiments, the voucher 1510 may be redeemed electronically. For example, the voucher 1510 may include a bar code that can be displayed on a mobile device and scanned by an appropriate device. Likewise, the voucher 1510 may include information that the end user device 115 transmits to a reader configured to facilitate transactions for the goods and/or services.

Figure 16:
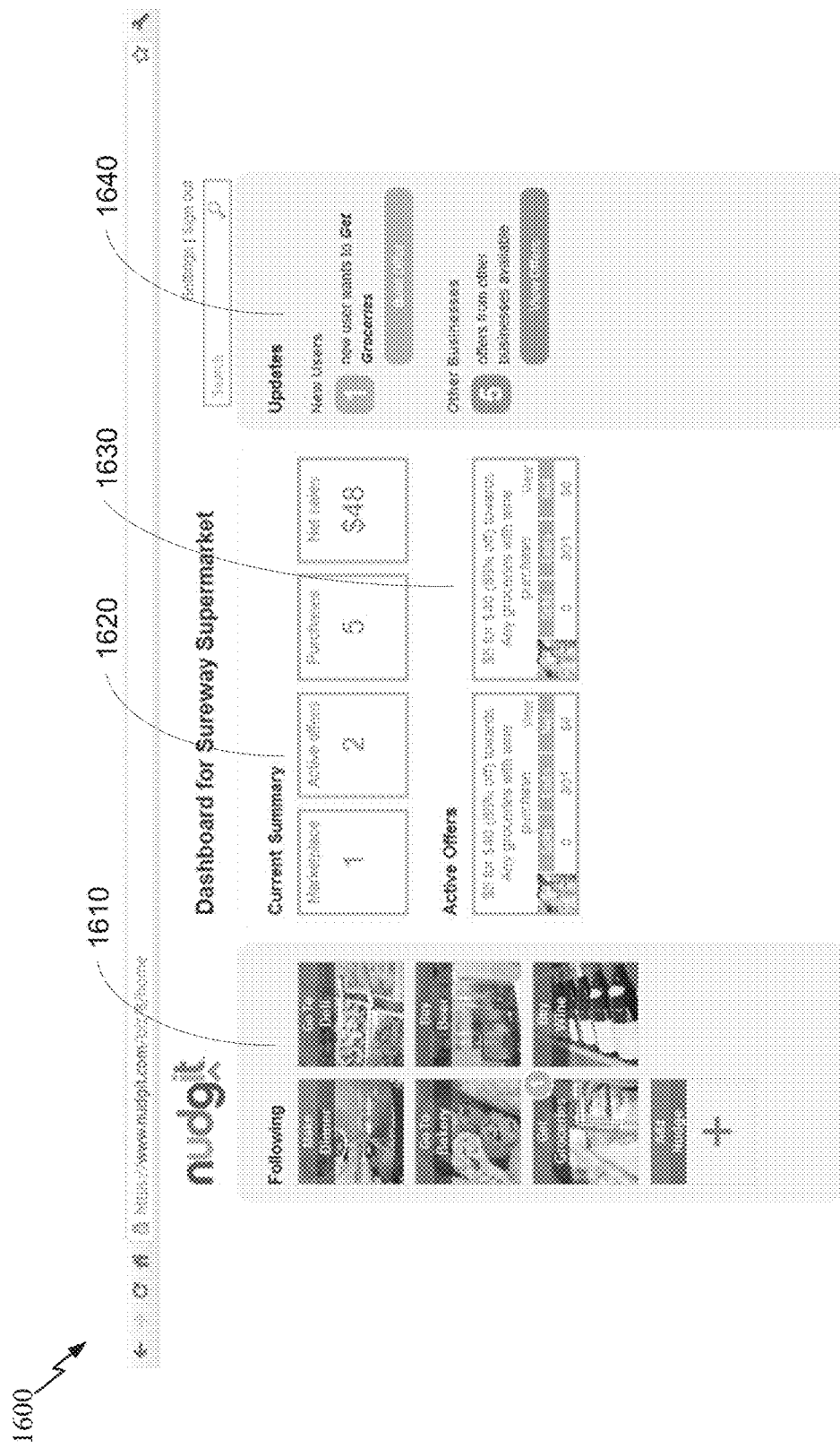
FIG. 16 illustrates a dashboard viewed through a browser accessing a network application.

FIG. 16 illustrates a dashboard 1600 viewed through a browser accessing a network application. The dashboard 1600 may include a following field 1610, a current summary field 1620, an active offer field 1630, and/or an update field 1640. In an embodiment, the following field 1610 may include the types of activities for which the supplier receives generated demands. The dashboard 1600 may allow a supplier to add and/or remove activities from the following field 1610. Activities may be added based on suggestions provided by the dashboard 1600. In an embodiment, the current summary field 1620 includes an indication of a number of consumers that desire goods and/or services offered by the supplier, an indication of a number of built offers still outstanding, an indication of a number of offers that were purchased, and/or an indication of net sales from purchased offers. The current summary field 1620 may be interactive such that a supplier may receive additional information by selecting (e.g., via a mouseover, a click, a gesture, a voice input, etc.) one of the indications. For example, a supplier may select one of the indications to generate, view, and/or print a report.

In an embodiment, active offer field 1630 identifies built offers that are still outstanding and/or may provide a description of each built offer. In an embodiment, the update field

1640 identifies new consumers (e.g., consumers that recently generated a demand for goods and/or services that the supplier follows in the following field 1610 and that have not already been addressed by the supplier) and/or offers built by other businesses (e.g., businesses that offer goods and/or services that are the same as or related to the goods and/or services offered by the supplier, other businesses that may be considered competitors by the supplier, etc.).

Figure 17A:
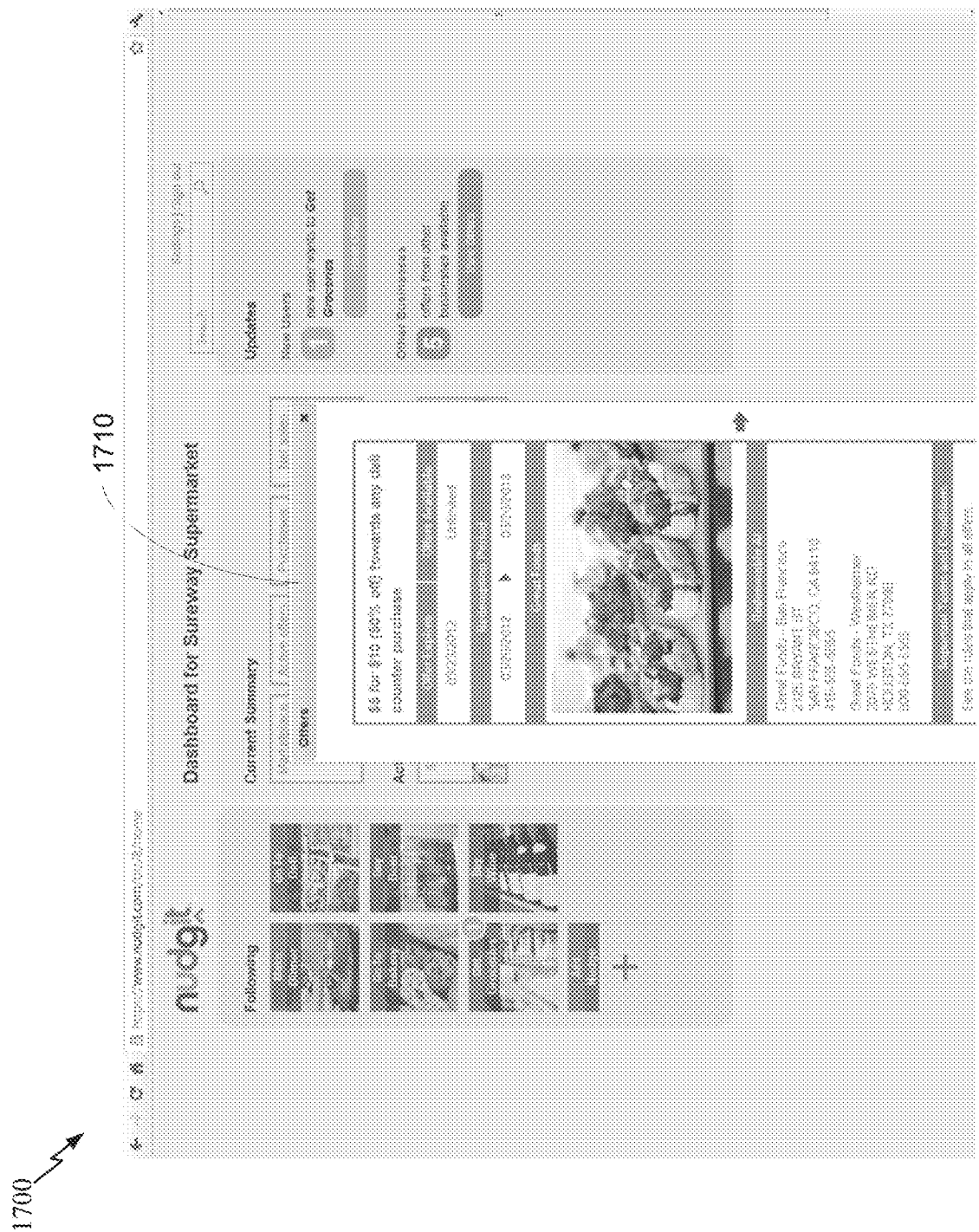
FIGS. 17A-B illustrate another dashboard viewed through a browser accessing a network application.
Figure 17B:
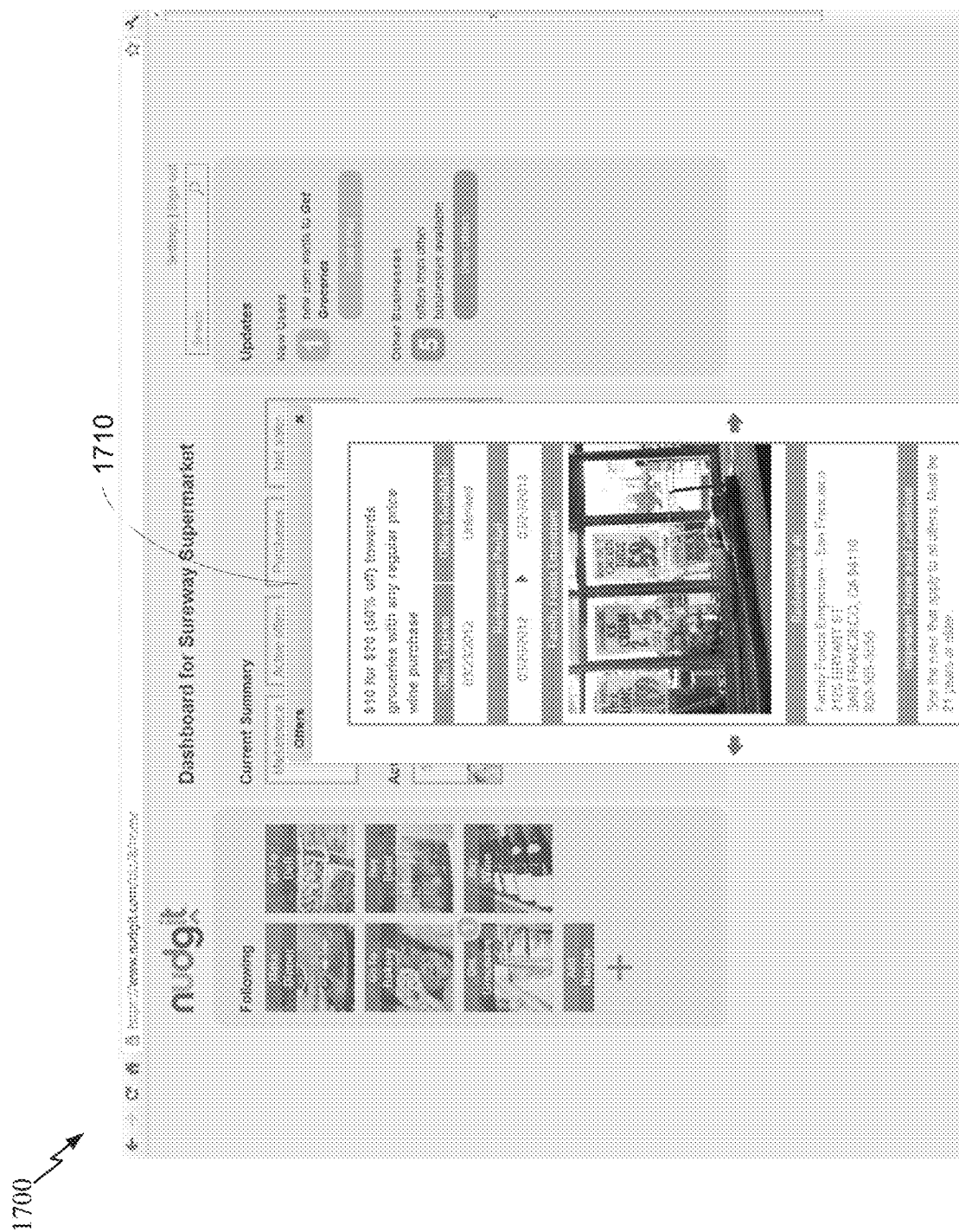

FIGS. 17A-B illustrate another dashboard 1700 viewed through a browser accessing a network application. In an embodiment, a supplier may be able to view the terms of offers built by other businesses via a button or other selectable component in the update field 1640. In an embodiment, the offers appear in a pop-up window 1710. In other embodiments, alternatives to pop-up windows may be used, such as separate tabs, screen overlays, sliding panels, and the like. For example, a mobile device may show separate windows using a horizontal or vertical scrolling display, which may advantageously require less display area. Within the pop-up window 1710 or alternative to a pop-up window, the consumer may be able to browse through some or all pertinent offers.

Figure 18:
FIG. 18 illustrates another dashboard viewed through a browser accessing a network application.
Figure 19A:
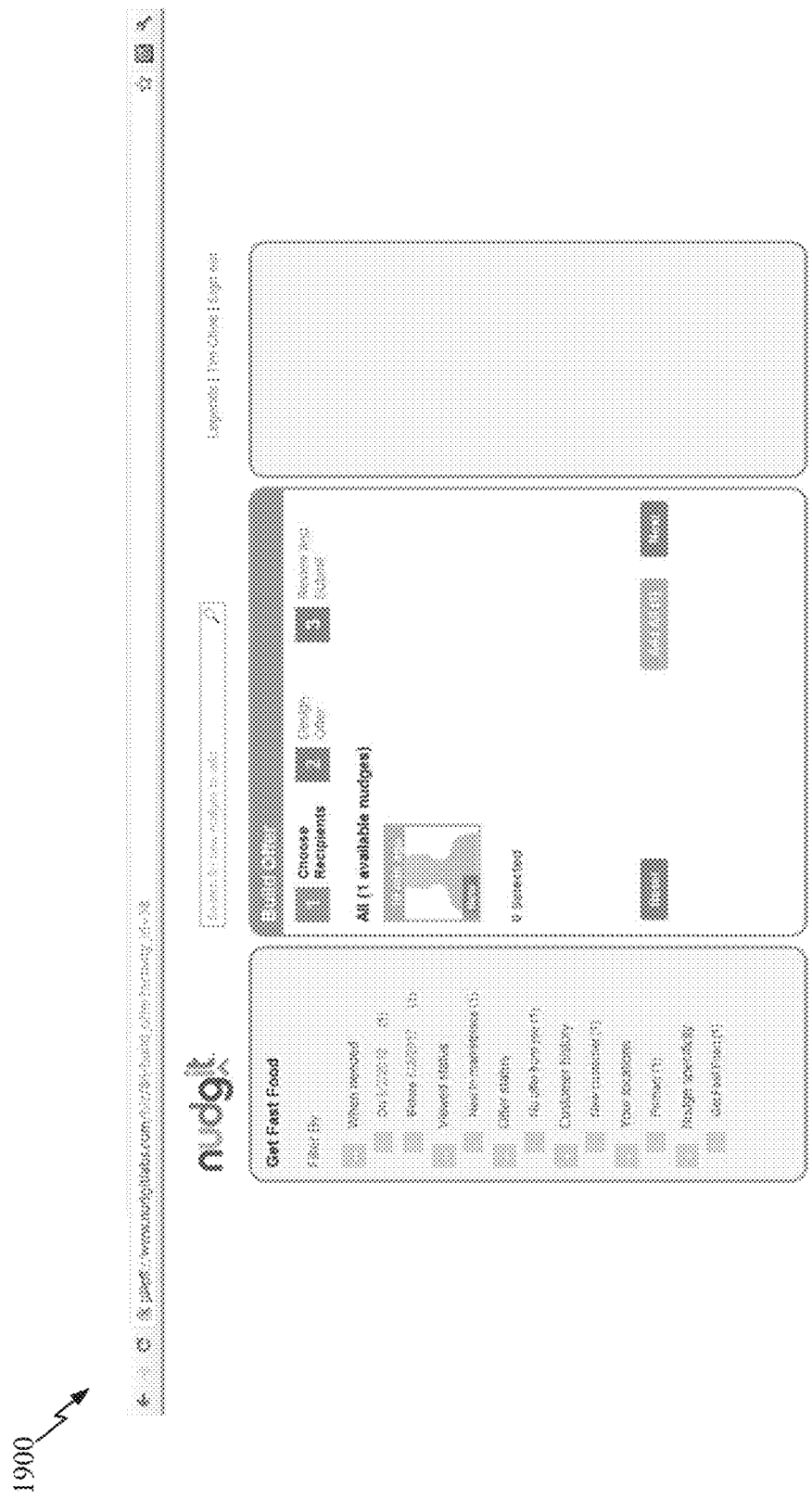
FIGS. 19A-K illustrate another dashboard viewed through a browser accessing a network application.
Figure 19B:
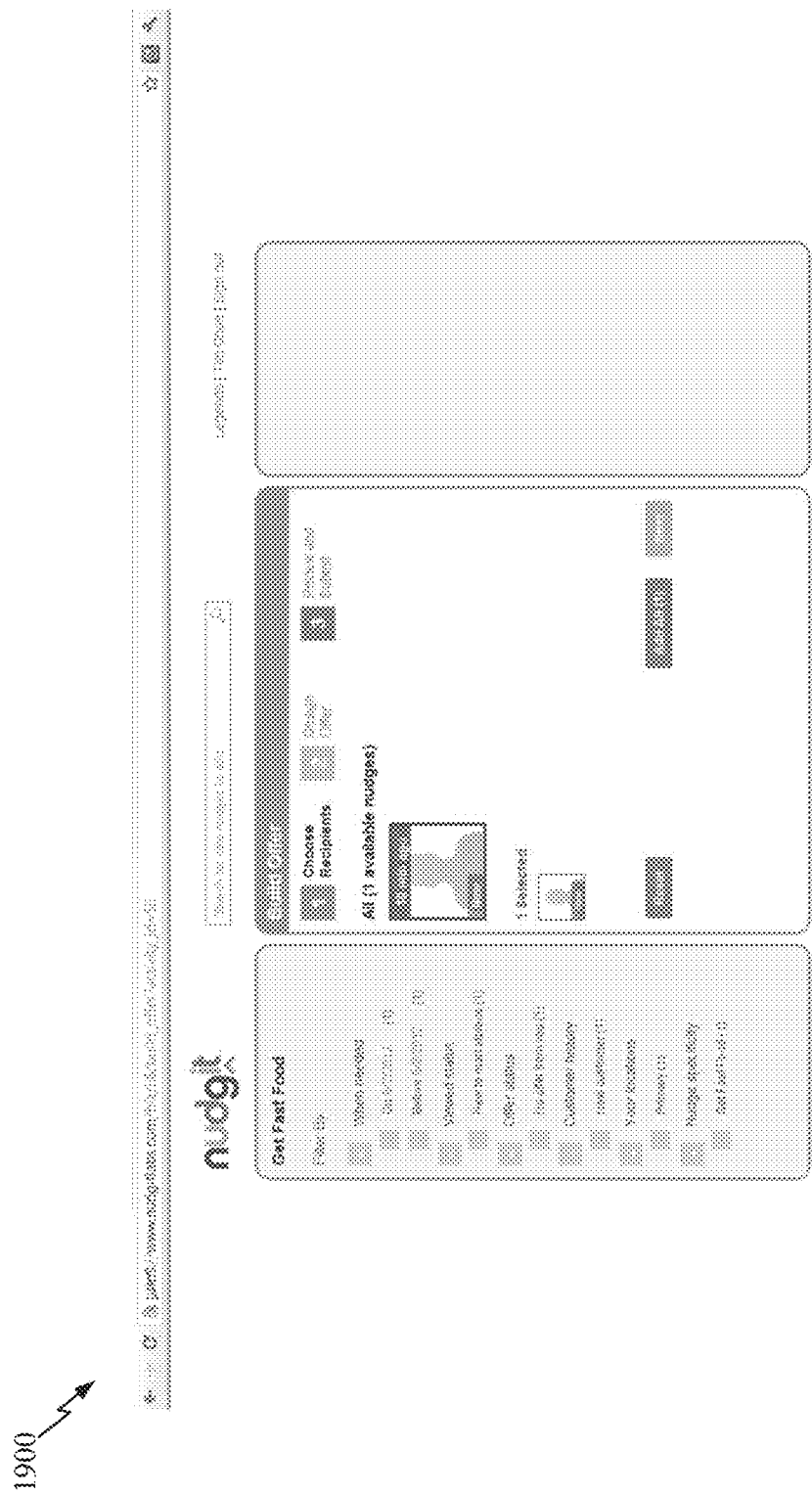
Figure 19C:
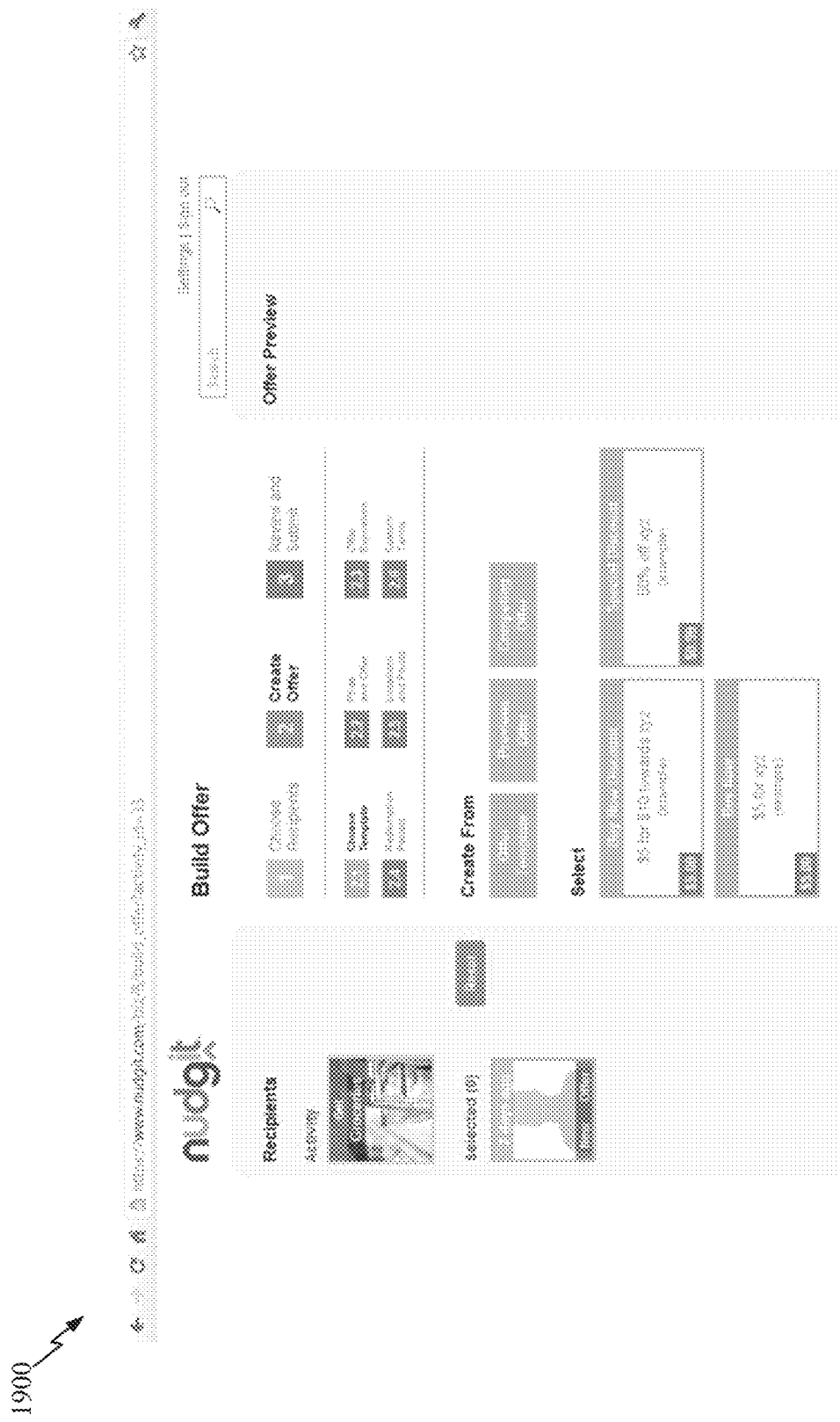
Figure 19D:
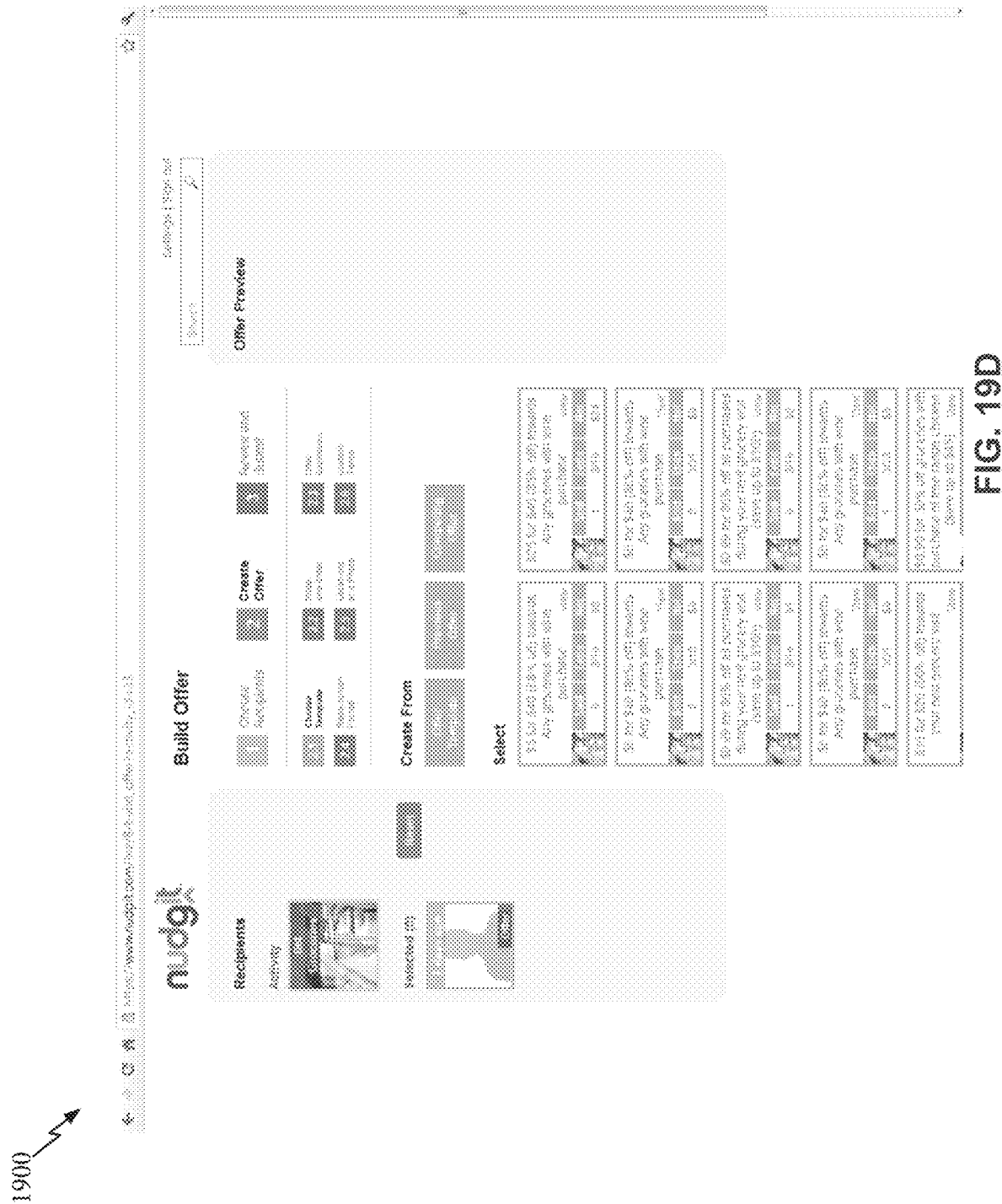
Figure 19E:
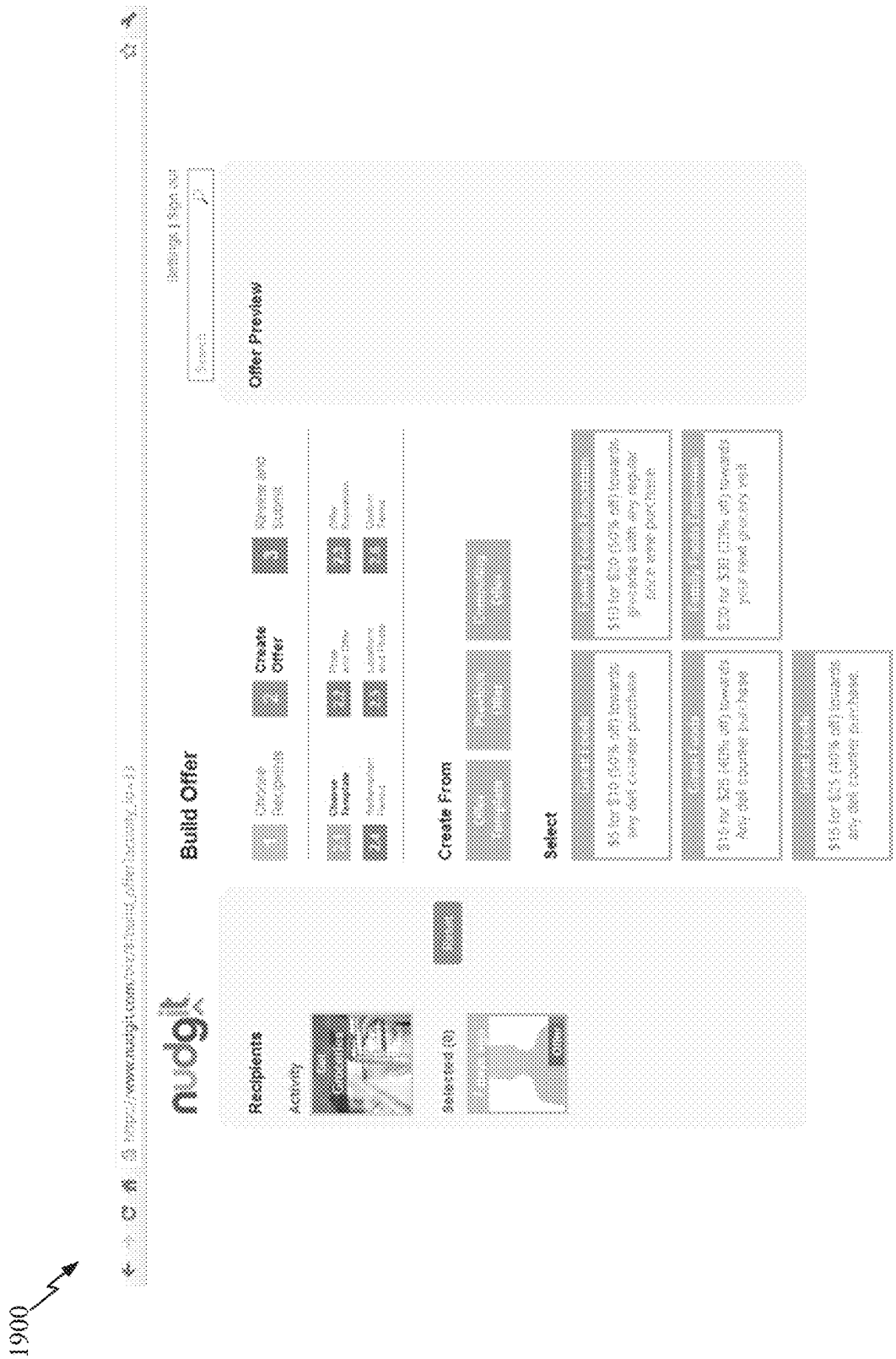
Figure 19F:
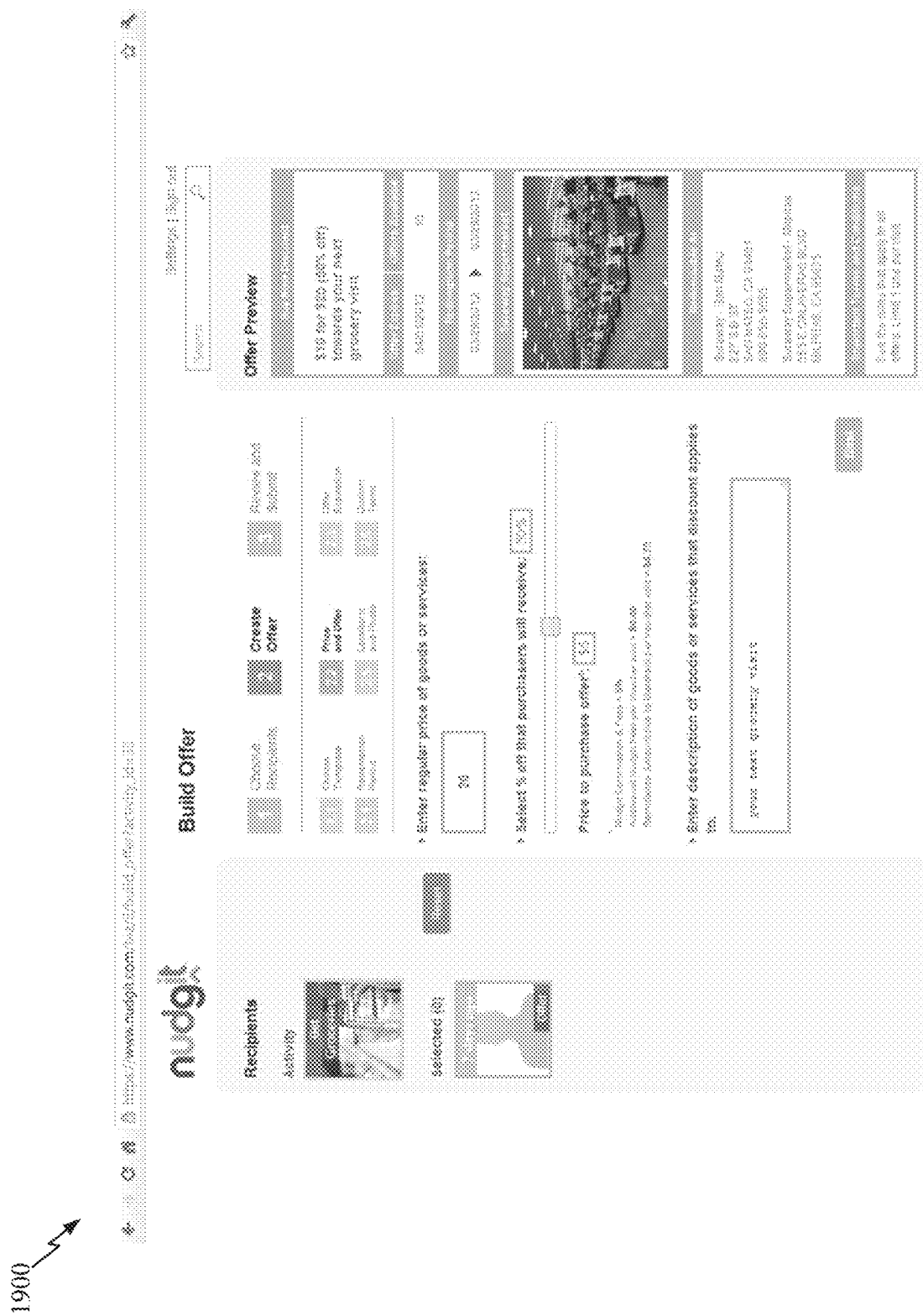
Figure 19G:
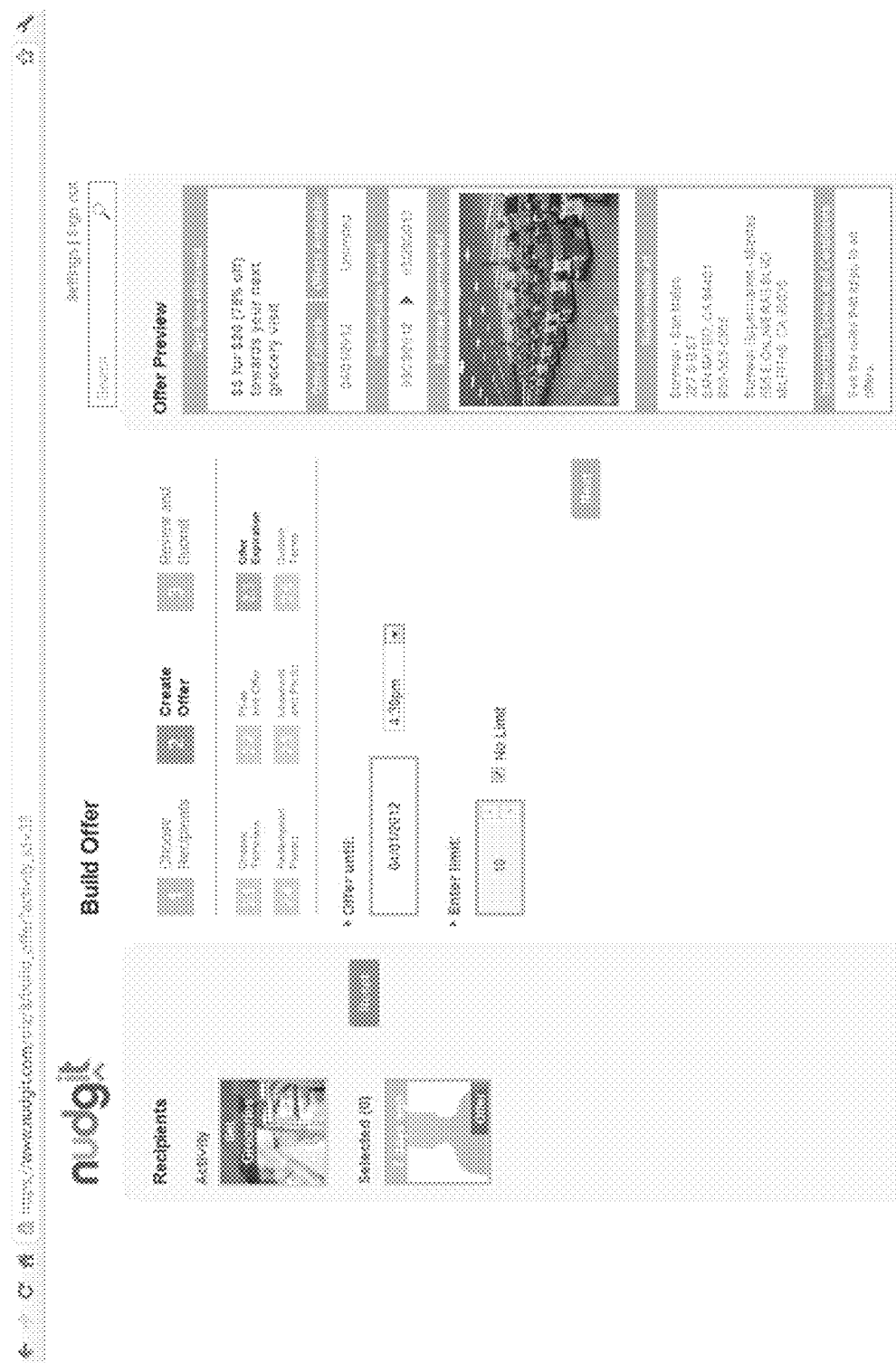
Figure 19H:
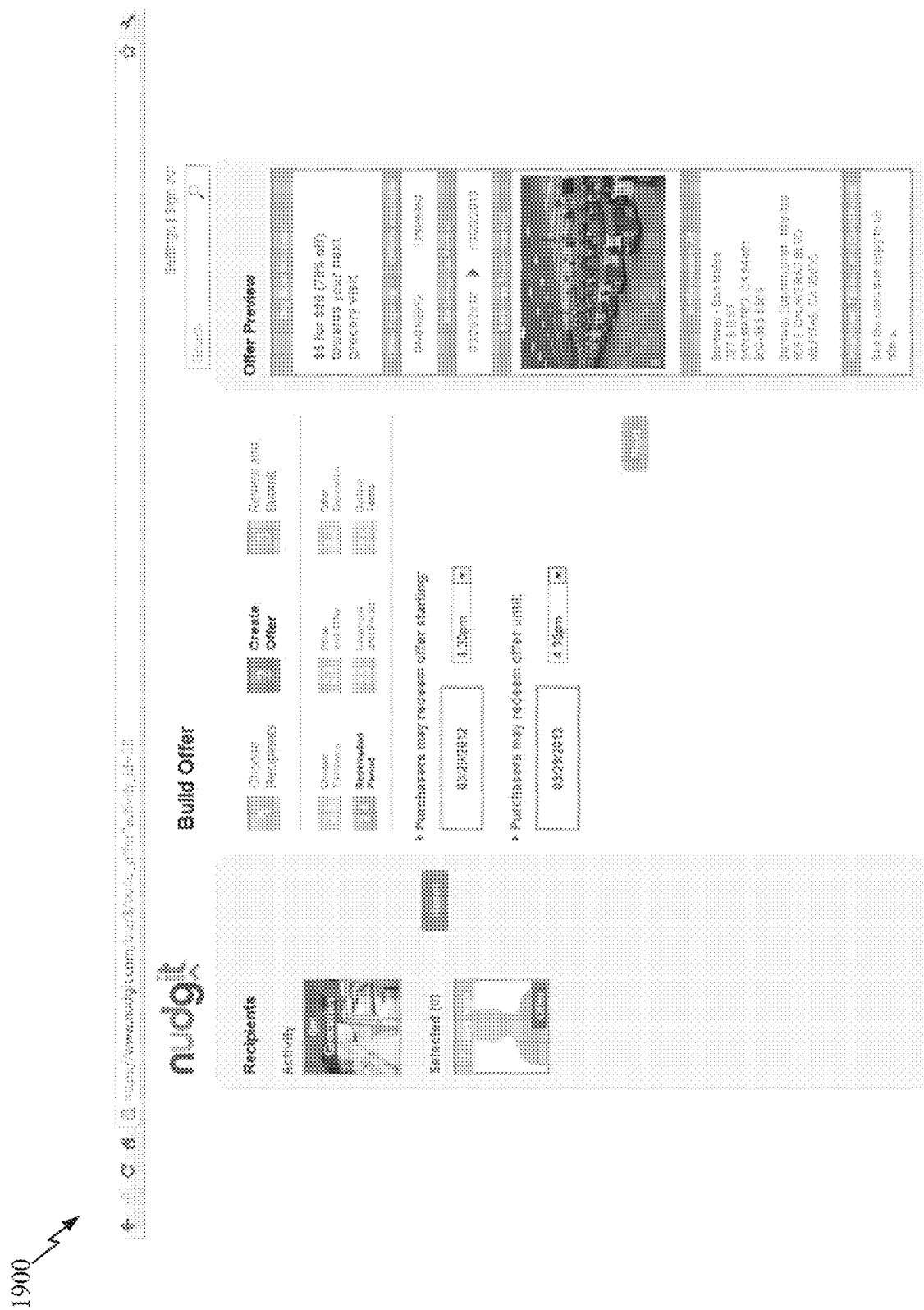
Figure 19I:
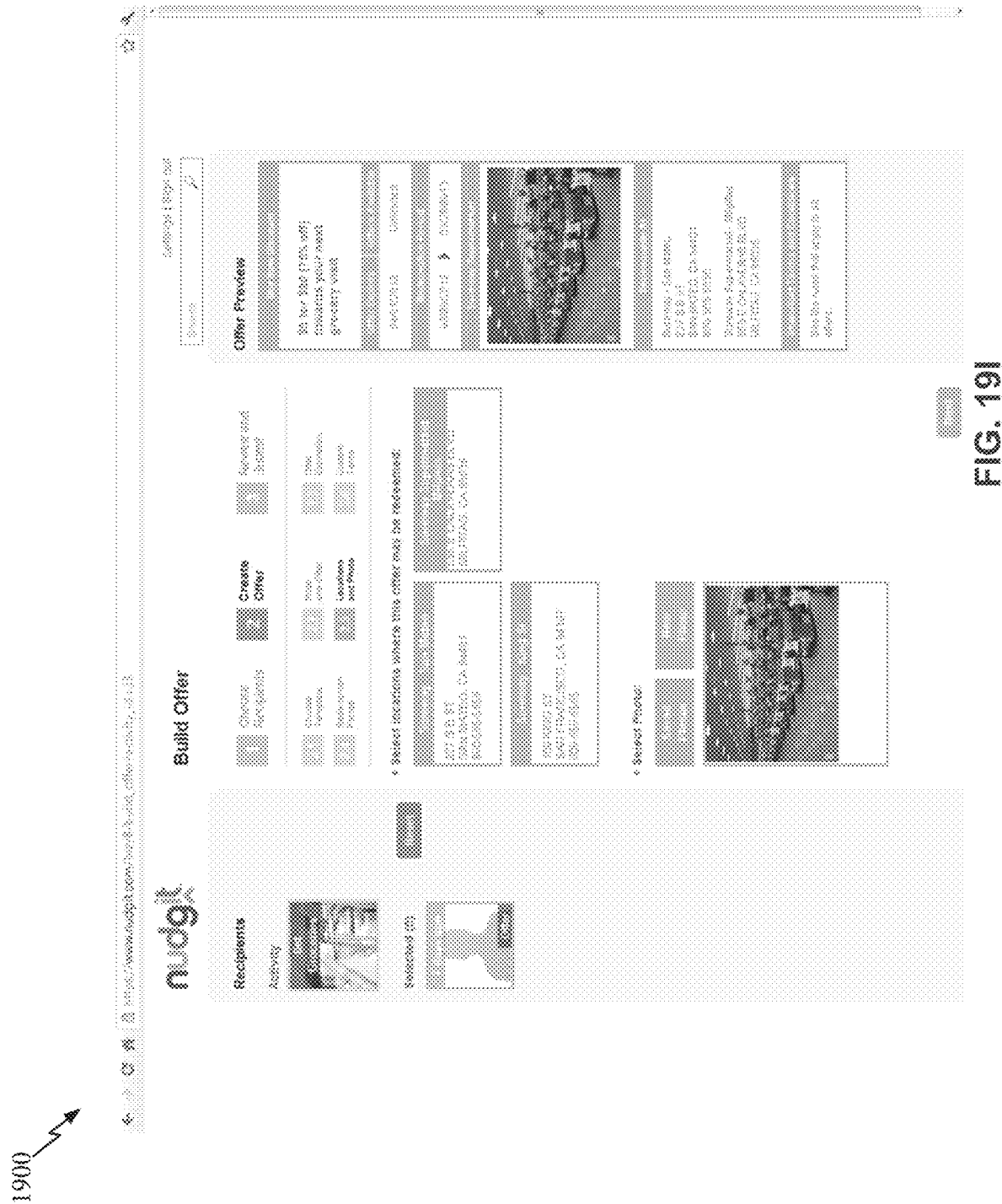
Figure 19J:
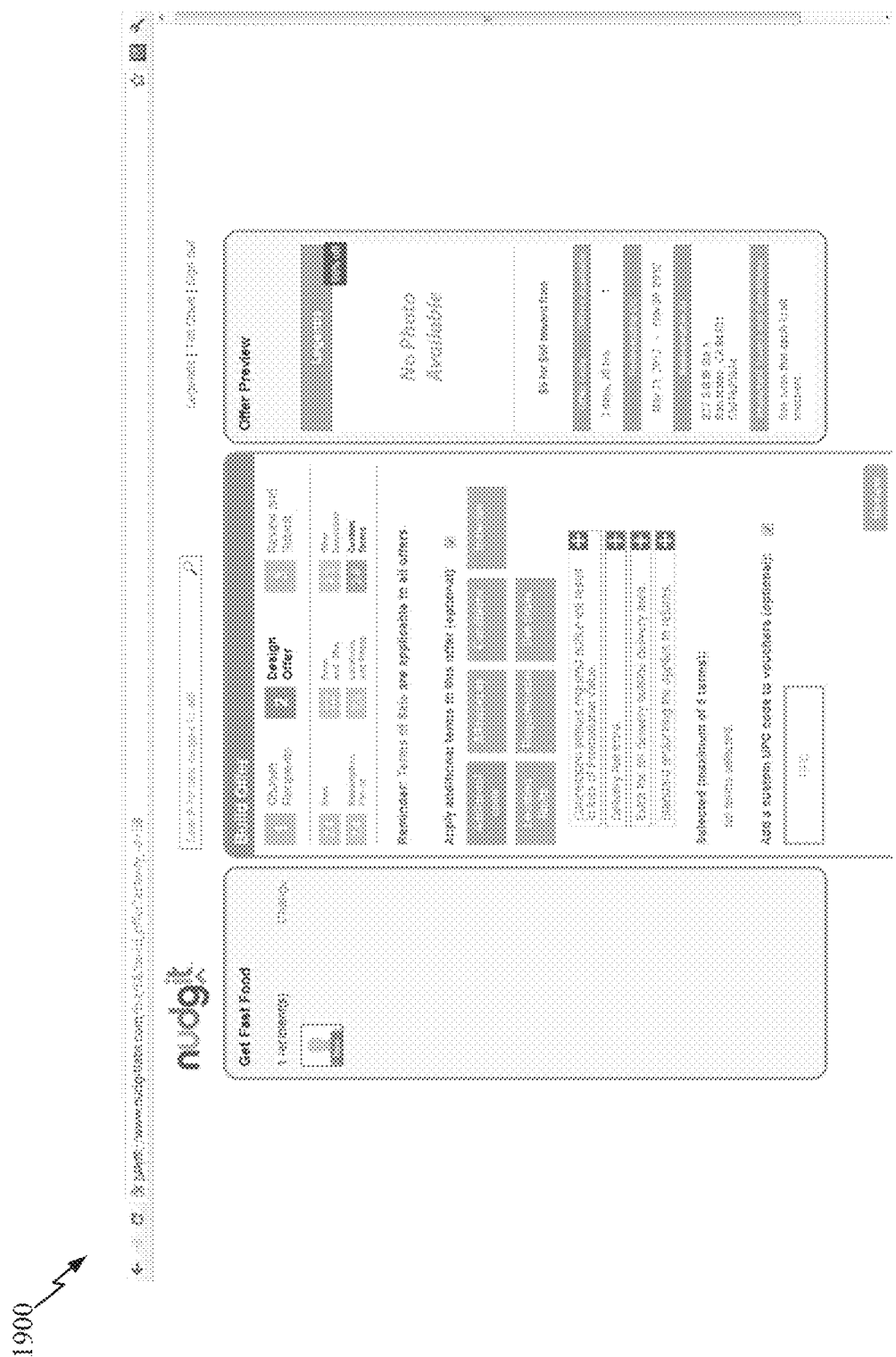
Figure 19K:
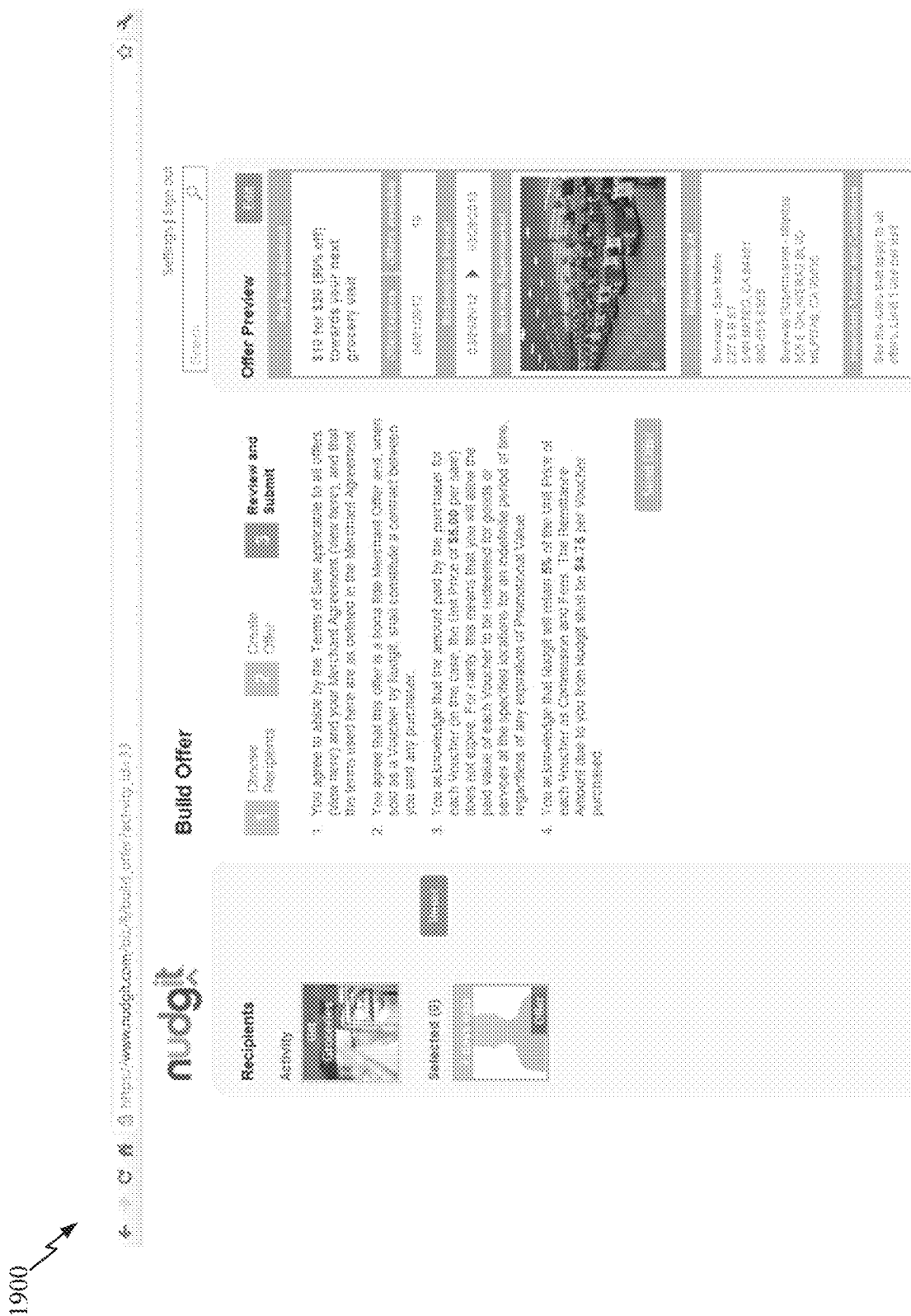

FIG. 18 illustrates another dashboard 1800 viewed through a browser accessing a network application. In an embodiment, the supplier may be able to add an activity to the following field 1610 based on suggestions provided by the dashboard generator 350, based on categories and/or subcategories offered by the dashboard generator 350, and/or based on entering a free-form search. In some embodiments, an ontology, such as a demand ontology, may be used to assist the supplier in adding an activity.

FIGS. 19A-K illustrates another dashboard 1900 viewed through a browser accessing a network application. In an embodiment, the server 120, such as via the offer builder 330, may allow a supplier to build an offer tailored to a received generated demand of a consumer. FIGS. 19A-K graphically illustrate the process by which an offer may be built. As described herein, the supplier may provide offer information, the dashboard 1900 may provide suggestions to aid the supplier in providing appropriate offer information, the supplier may be able to select from a set of suggested terms, and/or the supplier may be able to enter information in a free-form format. In an embodiment, offer terms entered by the supplier may be analyzed in real-time and compared against the demand space. If the entered offer terms deviate by a predetermined degree from other offer terms in the demand space and/or deviate from offer terms expected based on the demand for the good and/or service, then the entered offer terms may be flagged for the supplier. In this way, suppliers may be able to generate more effective and relevant offer terms.

Figure 20A:
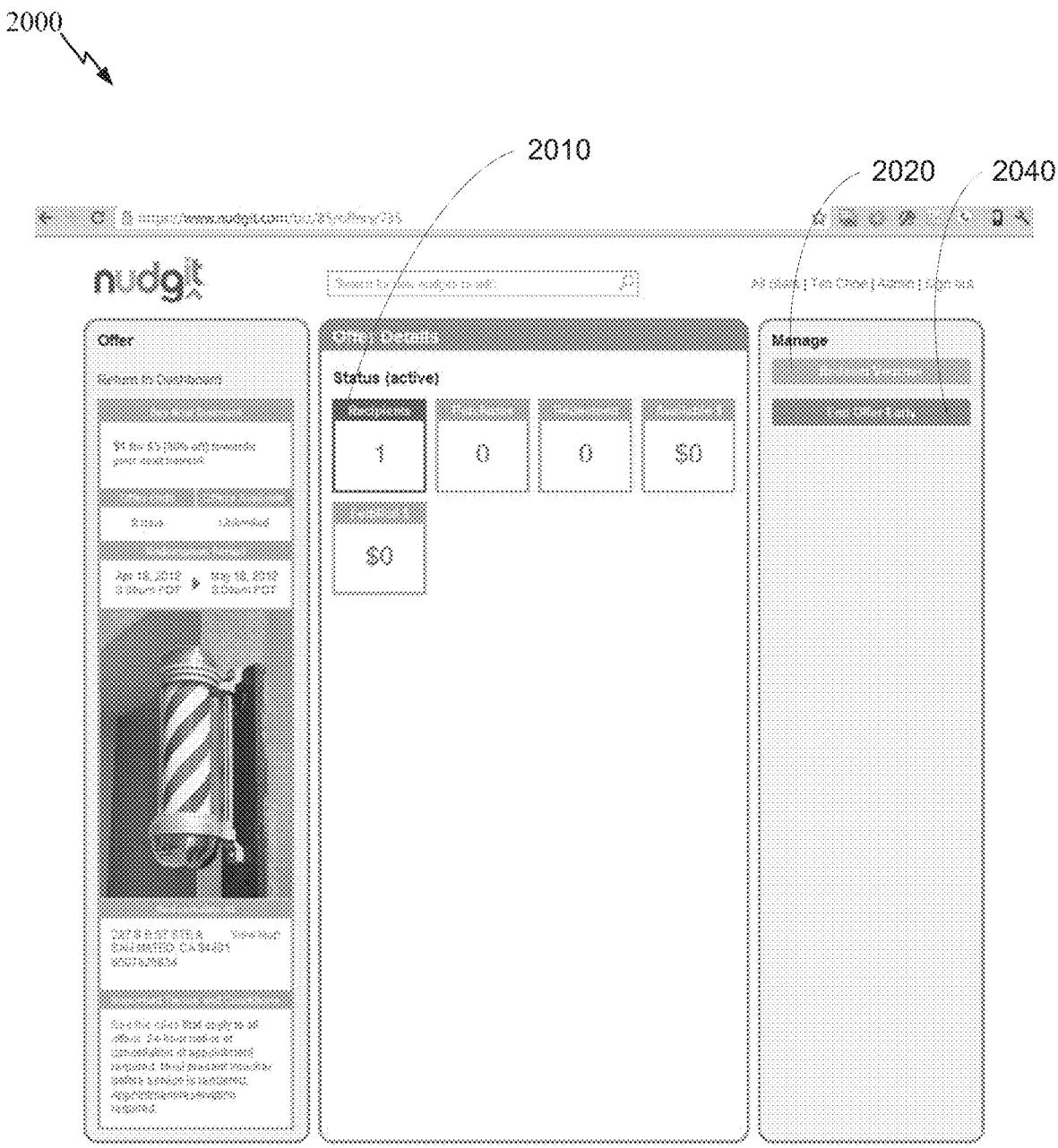
FIG. 20A and FIG. 20B illustrate other dashboards viewed through a browser accessing a network application.
Figure 20B:
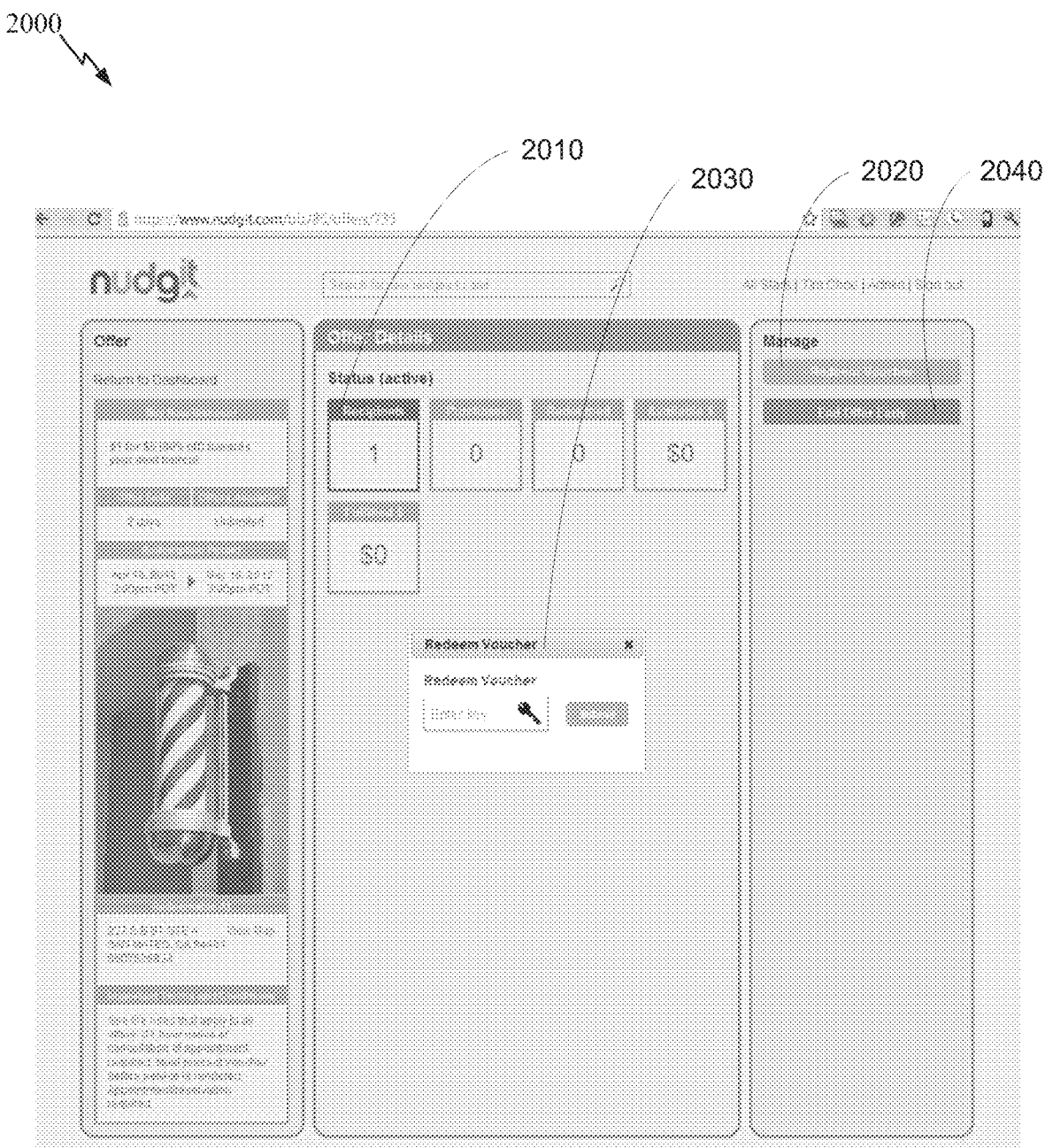

FIGS. 20A and B illustrate another dashboard 2000 viewed through a browser accessing a network application. In an embodiment, an activity in the following field 1610 may be selected. Upon selecting an activity, one or more offers associated with the activity and offer details associated with the offer may be displayed. For example, a description of the offer, an expiration date, an indication of a number of offers remaining, a redemption period, one or more locations the offer is redeemable at, terms and/or conditions of the offer, an indication of a number of recipients of the offer, an indication of a number of offers purchased, an indication of a number of offers redeemed, an indication of an amount of money payable to the supplier following redemption of an offer ("Available $" indicator), an indication of an amount of money paid to the supplier following redemption of an offer ("Fulfilled $" indicator), and/or an indication of net sales based on the offers being redeemed may be provided to the supplier. A Recipients indicator 2010 allows a supplier to view offers and analyze the recipients of any offer. For example, the supplier can determine what kinds of recipients purchased the offer (see FIG. 20A). A Redeem Voucher indicator 2020 allows a supplier to redeem purchased vouchers by inputting the redemption key presented by the purchaser (see FIG. 20B). For example, the supplier can type or otherwise enter the redemption key in a pop-up window 2030 that appears when selecting the Redeem Voucher indicator 2020. In other embodiments, alternatives to pop-up windows may be used, such as separate tabs, screen overlays, sliding panels, and the like. For example, a mobile device may show separate windows using a horizontal or vertical scrolling display, which may advantageously require less display area. An End Offer Early indicator 2040 allows a supplier to end an offer before its original expiration (see FIG. 20B).

Figure 21:
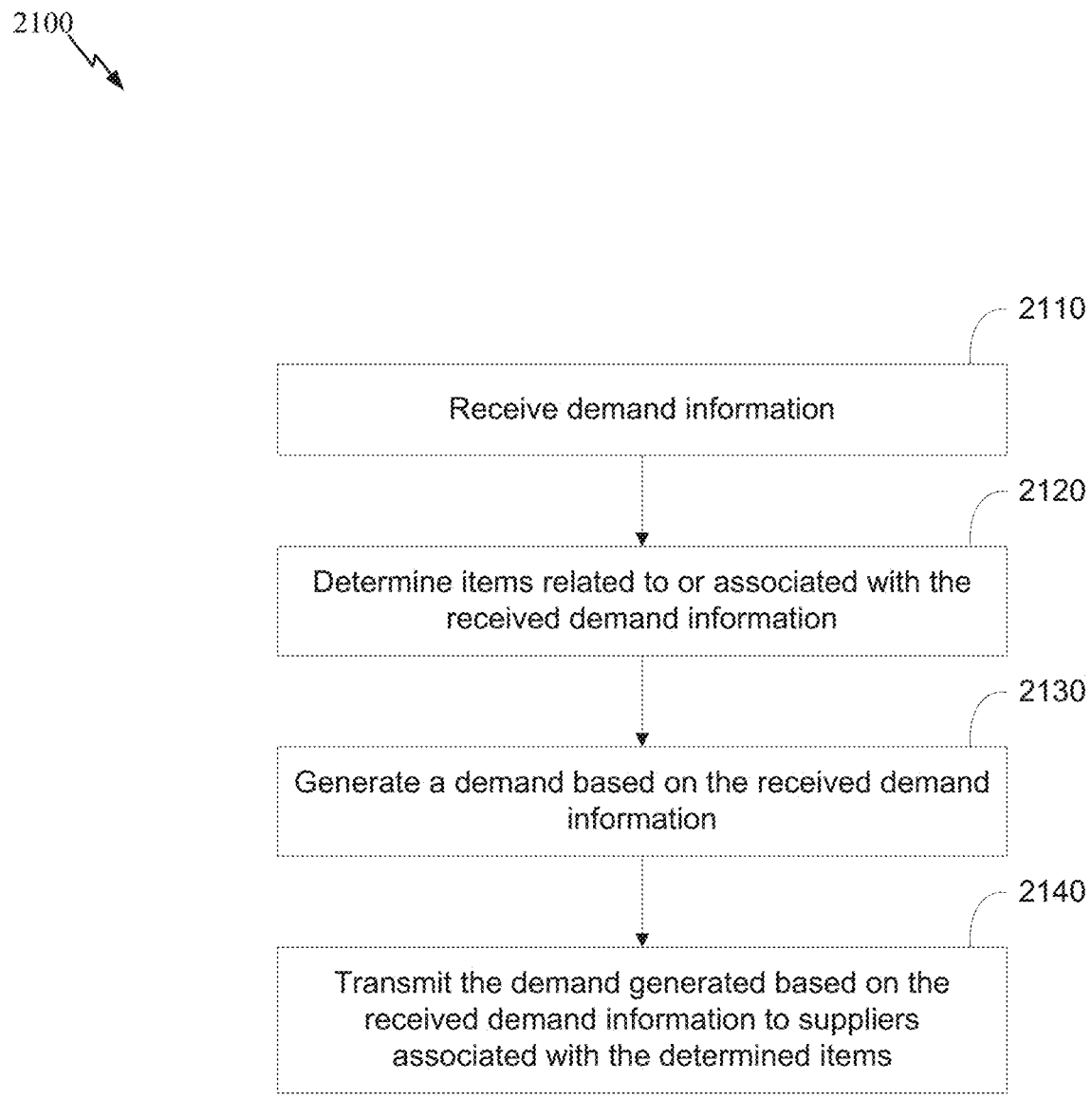
FIG. 21 illustrates an embodiment of a process for allowing a consumer to generate a demand.

FIG. 21 illustrates an embodiment of a process 2100 for allowing a consumer to generate a demand. In various embodiments, additional blocks may be performed, fewer blocks than shown may be performed, and/or the blocks may be performed in an order different than that shown. The process may be performed, for example, by demand generator 320 of FIG. 3.

In an embodiment, the process 2100 begins at block 2110. At block 2110, demand information is received. In an embodiment, demand information may include a type of good desired by the consumer; a type of service desired by the consumer; a time on which the consumer would like the good and/or service; a time by which the consumer would like the good and/or service; a location where the consumer would like the good and/or service; additional information regarding restrictions, special instructions, etc.; and/or the like. In some embodiments, after block 2110, the process 2100 proceeds to block 2120. At block 2120, items related to or associated with the received demand information are determined. In an embodiment, the determination is made by implementing an ontology, such as an ontology as described herein. In some embodiments, after block 2120, the process 2100 proceeds to block 2130. At block 2130, a demand is generated based on the received demand information. The demand may be generated by applying any of the methods described herein, including the matching processes discussed above. For example, in some embodiments, the demand is merely a particular activity selected or identified by the user (e.g., the user expresses a desire to "buy a car," and the demand is therefore determined to be "buy a car"). In other embodiments, the demand is generated by applying an ontology to identify syntactically, lexicographically, and/or semantically related activities. In some embodiments, after block 2130, the process 2100 proceeds to block 2140. At block 2140, the demand generated based on the received demand information is transmitted to suppliers associated with the determined items. In an embodiment, the generated demand is made available to those suppliers that offer goods and/or services the same as or related to the goods and/or services desired as defined by the generated demand.

Figure 22:
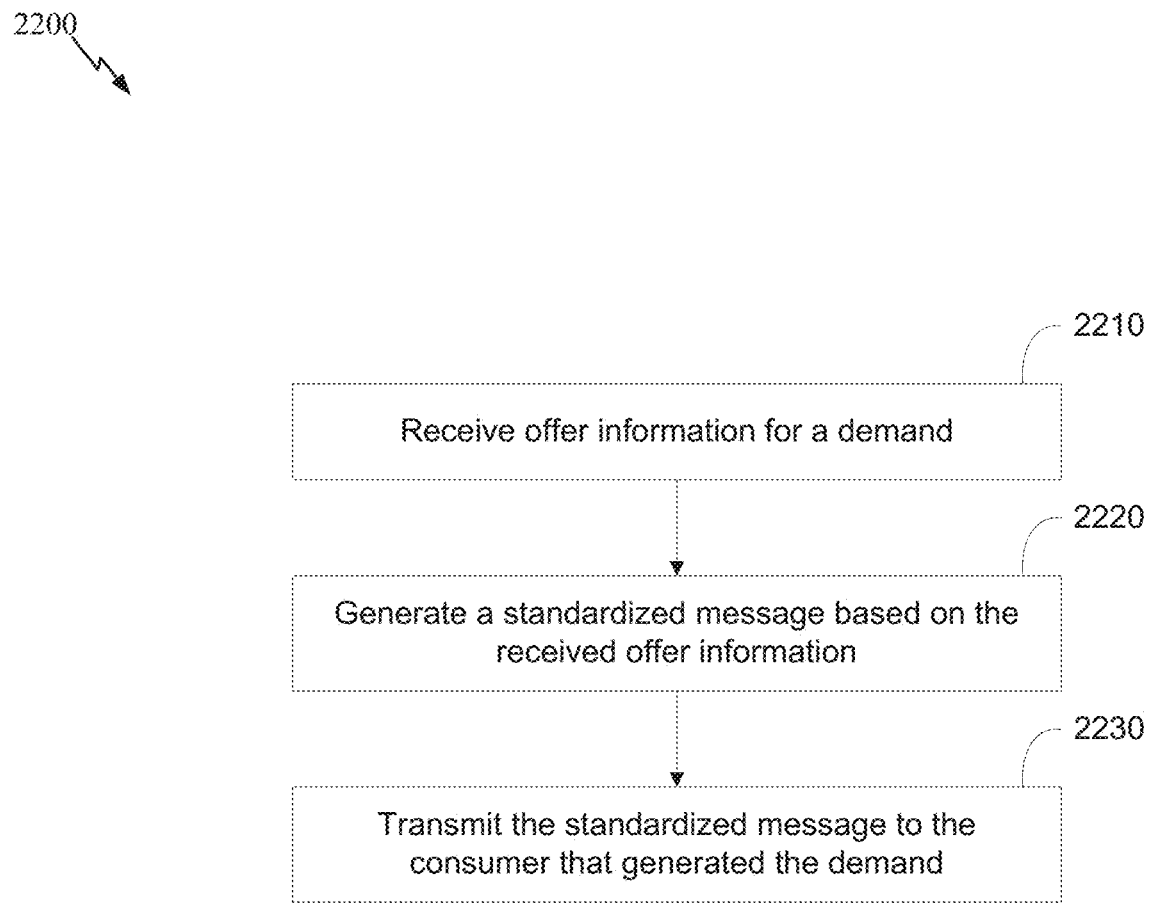
FIG. 22 illustrates an embodiment of a process for allowing a supplier to build an offer.

FIG. 22 illustrates an embodiment of a process 2200 for allowing a supplier to build an offer. In various embodiments, additional blocks may be performed, fewer blocks than shown may be performed, and/or the blocks may be performed in an order different than that shown. The process may be performed, for example, by offer builder 330 of FIG. 3.

In an embodiment, the process 2200 begins at block 2210. At block 2210, offer information is received for a demand.

In an embodiment, offer information may include an intended recipient of the offer (e.g., a consumer, a group of consumers, etc.); terms of the offer (e.g., a description of the goods and/or services being offered for sale, a purchase price for the goods and/or services, a discount on the goods and/or services, a time period during which the offer may be redeemed, disclaimers for the goods and/or services, restrictions on use of the offer, a photo of the location, goods, and/or services, etc.); and/or the like. In some embodiments, after block 2210, the process 2200 proceeds to block 2220. At block 2220, a standardized message based on the received offer information is generated. In an embodiment, the standardized message is generated by implementing an ontology, such as a supply ontology, as described herein. In some embodiments, after block 2220, the process 2200 proceeds to block 2230. At block 2230, the standardized message is transmitted to the consumer that generated the demand. In some embodiments, the process 2200 identifies multiple potential offer recipients. The process 2200 can implement one or more ranking processes, such as the ranking processes discussed above, to determine which of the potential offer recipients are to receive an offer. In some embodiments, the process 2200 ranks the potential offer recipients by relevance to enable the business to decide which potential offer recipients are to receive an offer.

Figure 23:
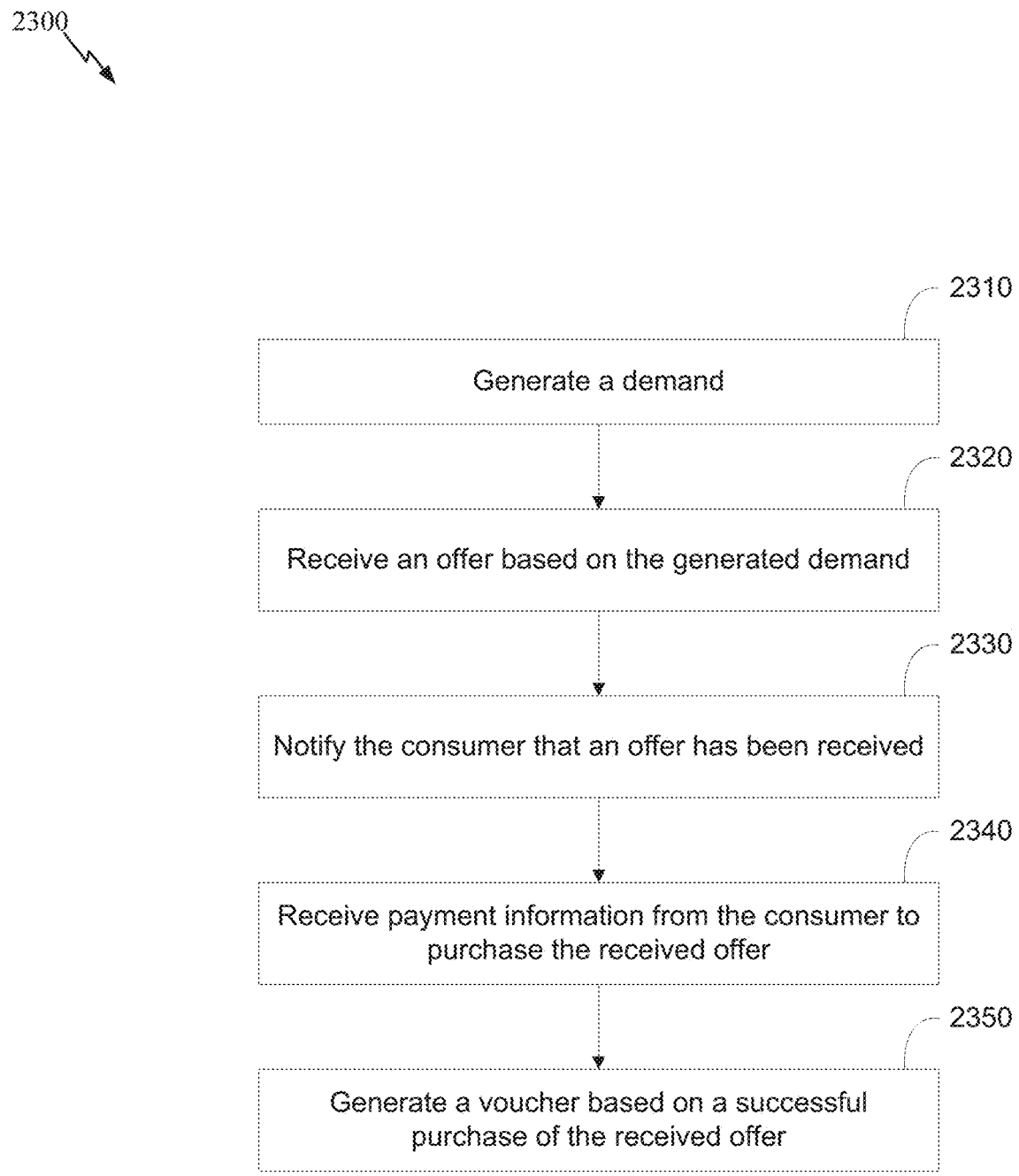
FIG. 23 illustrates an embodiment of a process for processing a demand-driven request.

FIG. 23 illustrates an embodiment of a process 2300 for processing a demand-driven request. In various embodiments, additional blocks may be performed, fewer blocks than shown may be performed, and/or the blocks may be performed in an order different than that shown. The process may be performed, for example, by server 120 of FIG. 1.

In an embodiment, the process 2300 begins at block 2310. At block 2310, a demand is generated. In an embodiment, the demand may be generated by the demand generator 320 as described herein. In some embodiments, after block 2310, the process 2300 proceeds to block 2320. At block 2320, an offer is received based on the generated demand. In an embodiment, the offer may be built by the offer builder 330 as described herein. In some embodiments, after block 2320, the process 2300 proceeds to block 2330. At block 2330, a consumer is notified that an offer has been received. In an embodiment, a notification may include a message generated in the network application, an electronic message sent to the supplier (e.g., an email, a text message, etc.), a phone call, an audible sound generated by an end user device 115 (e.g., a ring generated by the consumer's mobile device), a vibration generated by the supplier device 110, or the like. In some embodiments, after block 2330, the process 2300 proceeds to block 2340. At block 2340, payment information is received from the consumer to purchase the received offer. In some embodiments, after block 2340, the process 2300 proceeds to block 2350. At block 2350, if the purchase of the received offer is successful, a voucher is generated. In an embodiment, the voucher may include identification information (e.g., a bar code, a verification code, a unique key, and/or the like), a location that the voucher is redeemable at, a name or other identification of the purchasing party, a time the offer was purchased, an identification of the offer purchased, a time period during which the voucher is redeemable, terms and conditions of use of the voucher, and/or other like information.

In this way, a consumer may be able to view and/or purchase offers from suppliers related to goods and/or services desired by the consumer within minutes or seconds of generating a demand for the goods and/or services. Aspects of the disclosure described herein may result in the reduction of time spent by consumers on searching, navigating, and attempting to make sense of information from disparate sources. Aspects of the disclosure described herein may further allow consumers rapid access to relevant choices and lead to faster decision-making.

Furthermore, in this way, suppliers may be able to reduce resources and budget spent on advertising, to optimize choice presented to consumers, and/or to direct capture and understanding of demand.

In some implementations, the server 120 can provide functionality for receiving expressions of interest from users, which can, but need not be, transactions. Instead, these expressions of interest may include an articulated demand, a proposal to provide information, goods, and/or services, and/or a request for advice. As an example, a user might express an interest in changing his or her diet or exercising.

In response, the server 120 may aggregate the expressions of interest from the users based on the parameters or attributes of such expressions of interest. The server 120 may programmatically present the aggregated expressions of interest to one or more entities that are capable of responding to the aggregated expressions of interest. As one example, the server 120 could supply a plurality of users' desire to exercise to an author of a medical advice column or to a health professional. The author or health professional may then choose to respond to the aggregated request for help. Many other variations of expressions of interest, aggregations thereof, and responses can be provided in other embodiments.

Autonomous Commerce

In an embodiment, the server 120 described above expresses demands automatically without input or intervention from a consumer. Likewise, the server 120 generates offers for goods and/or services automatically after a demand is expressed without any input or intervention from the supplier (e.g., via the generated dashboard as described above with respect to FIG. 3). Rather, the server 120 identifies consumer patterns to generate the demand and/or receives an initial set of information from the supplier. Thus, by having the server 120 perform these functions without human interaction, consumers can have demands expressed on their behalf even when they have forgotten or do not have the time to generate the demands on their own. In addition, consumers then receive offers for goods or services more quickly. In fact, the offers generated by the server 120 may be optimized such that the consumers are more likely to purchase the offers and/or suppliers are more likely to generate additional revenue.

As a consumer expresses demands, the server 120 uses one or more factors (including, for example, the initial set of information provided by the supplier) to generate automatically the offer for goods and/or services. As an example, the demand generator 320 of the demand-driven market processor 210 on the server 120 automatically generates the demand for goods and/or services. Likewise, the offer builder 330 of the demand-driven market processor 210 on the server 120 automatically generates the offers for goods and/or services. In some embodiments, the demands and offers for goods and/or services can be generated automatically with varying degrees of input or intervention by other components of the server 120, the consumer, and/or the supplier.

As used herein, the automatic execution of commerce operations (e.g., the automatic generation of demands for goods and/or services, the automatic generation of offers for goods and/or services, etc.) is referred to as "autonomous commerce" (AC). A goal of AC may be to reduce the frictions, typically of human origin, that impact the efficiency of various marketplaces, such as retailing.

AC can be implemented by the server 120 in different manners. In one embodiment, AC is based on instructions executed by one or more processors of one or more electronic devices (e.g., referred to as intelligent agents) implemented by the server 120 (e.g., the demand generator 320). The intelligent agents are configured to carry out actions based on contextual data, internal goals, and/or external goals. For example, in the context of a demand-based system, individual users (demanders) can be "represented" by an agent that is configured to learn patterns in the respective user's behavior (e.g., the intents of the respective user). Such an agent may learn that a haircut happens with some regularity (e.g., every month, etc.) and make a demand into a marketplace for that service at an appropriate time. On the supply side, each supplier may be represented by an intelligent agent implemented by the server 120 (e.g., the offer builder 330) that analyzes the specific demand, the demander's history, the supplier's business situation, and/or the supplier's business history in order to design an offer at the nexus of demander and business goals.

In an embodiment, the server 120 helps close the demand-to-transaction loop by handling a multitude of commerce operations via the implementation of AC. For example, the server 120 can perform time and yield management for suppliers, assess the availability of relevant offers in response to consumer demands, and/or control the flow of demands and offers.

The intelligent agents implemented by the server 120 can share a common set of properties, regardless of whether the intelligent agents represent a consumer or supplier. For example, the intelligent agents can integrate information obtained from the external world (e.g., external factors). Such information includes consumer data (e.g., history of successful transactions, consumer profile information, information related to a group or cluster of consumers, etc.), demand for goods and/or services (e.g., individual or group demand, the geographic locations where demands originate, the time constraints of demands expressed, etc.), marketplace data (e.g., the volume of demand for a good or service or in a particular location, pricing information for goods and/or services, etc.), ratings and reviews of goods and/or services, behavioral data (e.g., frequency by which the consumer uses the service provided by server 120, categories of goods and/or services purchased by consumers, sequences of behavior carried out by the consumer (e.g., the consumer goes to hairdresser after eating lunch), and/or other data about the consumer that can be learned over time), and/or the like.

As another example, the intelligent agents can integrate internal data (e.g., internal factors). Such data includes the history of agent performance (e.g., demands for goods and/or services or offers of goods and/or services that have been generated in the past), the success of demands generated in the past (e.g., the number or percentage of demands that resulted in offers purchased by the consumer), the amount spent by a consumer on an offer (e.g., on average, for a particular good or service, for a set of goods or services, etc.), an average price offered by a supplier in an offer, the goods or services or type of goods or services that result in more purchased offers, redemption rate (e.g., the rate at which purchased offers are redeemed), conversion rate (e.g., the rate at which offers generated based on demands are purchased), and/or other such business data.

As another example, the intelligent agents can be configured to perform one or more tasks. In an embodiment, the intelligent agents are configured to orchestrate the sequence of operations and data flows to achieve the goals of the consumer or supplier. Goals may be explicit or implicit. For example, explicit goals include achieving a specific number of transactions and/or the like. Implicit goals include maximizing transactions and/or offers, maximizing new customers, maximizing loyalty, targeting a transaction size, optimizing revenue from new customers, optimizing the number of transactions, and/or the like. In another or further embodiment, the intelligent agents are configured to maintain performance indicators (e.g., internal data described above) in relation to the goals of the consumer or supplier. In another or further embodiment, the intelligent agents are configured to rank demands and/or offers, as described in greater detail below.

In an embodiment, the intelligent agents are configured to use one or more techniques to generate demands and/or offers. For example, such techniques include heuristics for offer construction, machine learning techniques (e.g., to adjust or update the generation of demands and/or offers based on past results), and/or pricing functions, which are described in greater detail below.

Figure 24:
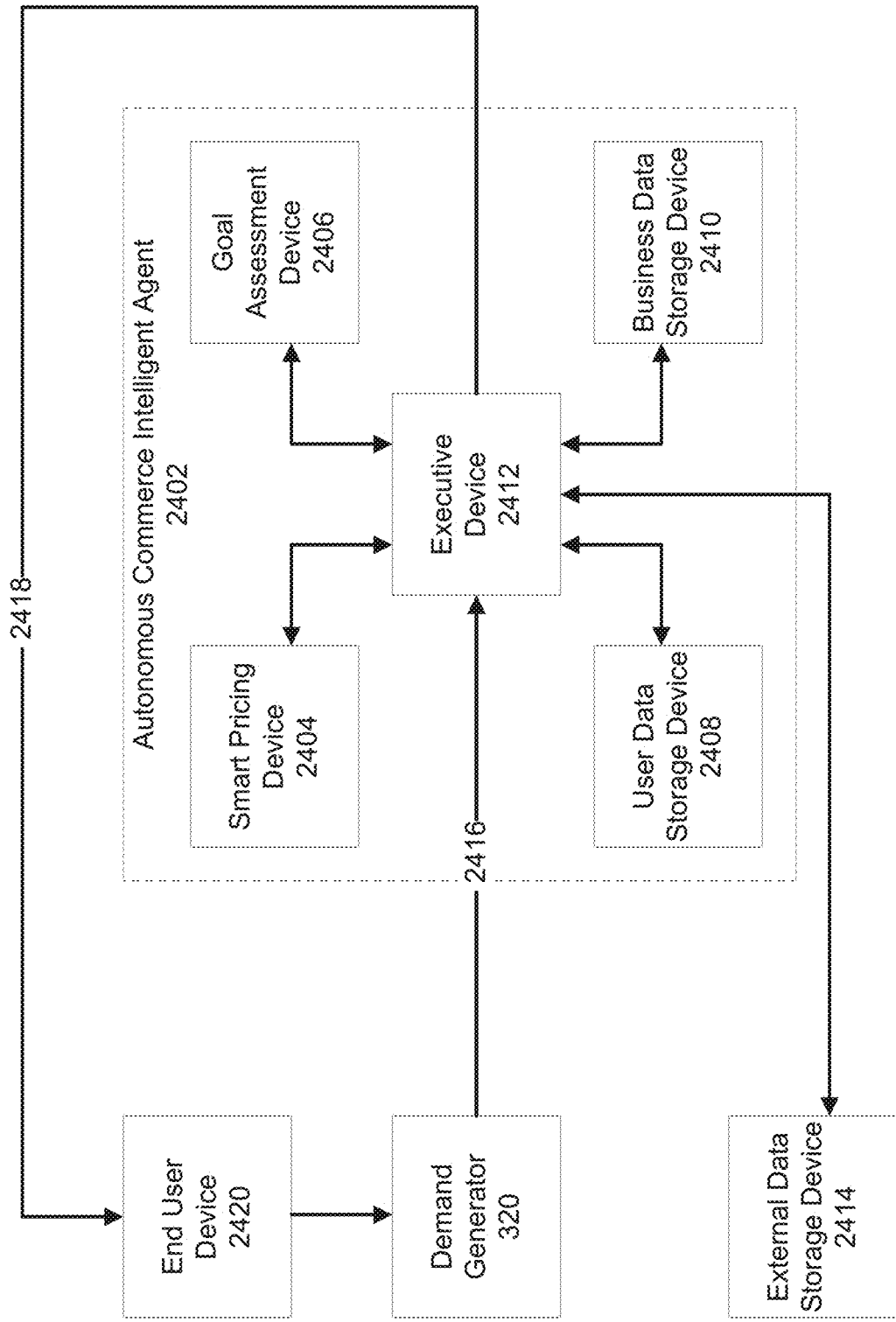
FIG. 24 illustrates an exemplary block diagram of an autonomous commerce (AC) intelligent agent.

FIG. 24 illustrates an exemplary block diagram of an autonomous commerce (AC) intelligent agent 2402. In an embodiment, the AC intelligent agent 2402 is implemented within the demand-driven market processor 210 of server 120. In an embodiment, the AC intelligent agent 2402 includes a smart pricing device 2404, a goal assessment device 2406, a user data storage device 2408, a business data storage device 2410, and/or an executive device 2412.

In an embodiment, the AC intelligent agent 2402, and specifically the smart pricing device 2404, the goal assessment device 2406, and the executive device 2412, are electronic hardware components configured to execute one or more instructions. For example, the smart pricing device 2404, the goal assessment device 2406, and the executive device 2412 can include one or more processors that are configured to execute one or more instructions to perform the tasks described below.

In an embodiment, the user data storage device 2408, the business data storage device 2410, and an external data storage device 2414 (described below) are computer-readable storage mediums that store one or more data sets in one or more locations in one or more formats. For example, the user data storage device 2408 and the business data storage device 2410 can be disk storage devices (e.g., floppy disks, hard disk drives, optical discs, etc.), flash memory, magnetic bubble memory, and/or the like.

In an embodiment, the smart pricing device 2404 is configured to generate a price for an offer of goods and/or services. The smart pricing device 2404 is described in greater detail below. In an embodiment, the goal assessment device 2406 is configured to store and provide the goals of a consumer and/or supplier to the executive device 2412. The goal assessment device 2406 can receive the goals (explicit or implicit) from a consumer or supplier via the generated dashboard.

The user data storage device 2408 and/or the business data storage device 2410 may be configured to store information provided by and/or derived from consumers and/or suppliers (e.g., external and/or internal factors). For example, the user data storage device 2408 can store data provided by or derived from consumers (e.g., such as consumer data, demand for goods and/or services, ratings and reviews, behavioral data, etc.). The business data storage device 2410 can store data provided by or derived from suppliers (e.g., demand for goods and/or services, marketplace data, ratings and reviews, behavioral data, etc.).

The executive device 2412 can be configured to receive data from the smart pricing device 2404, the goal assessment device 2406, the user data storage device 2408, the business data storage device 2410, and from an external data storage device 2414. The external data storage device 2414 can store any information obtained from the external world, as described above. The executive device 2412 can also be configured to receive a demand expression 2416 from, for example, the demand generator 320 of the demand-driven market processor 210 via information provided by end user device 2420. Based on such data, the executive device 2412 is configured to generate an offer 2418, which is then forwarded to the consumer, such as at end user device 2420.

The end user device 2420 can be similar to any of the end user devices 115 described above. For example, the end user device 2420 can be any computing device. In an embodiment, the end user device 2420 is a portable device, such as a portable electronic device like a cell phone, a smart phone, a tablet, a laptop, a personal digital assistant (PDA), a personal information manager (PIM) or the like. In another embodiment, the end user device 2420 is a stationary computing device, such as a computer, a desktop computer, a workstation, server, terminal, or the like.

Example Autonomous Commerce Use Case

As described above, the AC intelligent agent, such as the AC intelligent agent 2402, can be configured to generate automatically an offer for goods and/or services. The AC intelligent agent 2402 may use data, such as the history of previous purchases by a consumer, the number of unique users that clicked on an offer after the offer was received (e.g., how many times the offers were clicked on, viewed partially, viewed in full, etc.), and/or the number of existing offers still active for the consumer. As an example, the consumer may have made two previous purchases: a 10% off coupon for a $100 massage and a 25% off coupon for a $30 fruit tart. By taking into account such factors along with previous offers made in similar or different contexts and the rate of success of such previous offers, the AC intelligent agent 2402 can begin to tailor the offer of goods and/or services to the consumer.

In an embodiment, the AC intelligent agent 2402 analyzes the goals of the consumer before generating the offer of goods and/or services. Such goals may be explicit or implicit, as described above. The goals can be represented by functions, rather than actual numbers, such that the factors used to generate the offers are manipulated in a certain way depending on the chosen goal.

In an embodiment, the AC intelligent agent 2402 also determines and analyzes relevant existing or past offers (e.g., offers related to a similar good and/or service, offers provided in a similar geographic region, etc.). Once a set of relevant existing or past offers has been determined by the AC intelligent agent 2402, the AC intelligent agent 2402 can rank the offers. The AC intelligent agent 2402 can rank offers using any ranking process that performs rankings based upon, for example, the type of relationship between one variable and another variable. An example ranking process can be the ranking process known by the trademark INFOSTAR™, which is described above with respect to FIGS. 4 and 5A-C, where the AC intelligent agent 2402 uses the INFOSTAR™ ranking process across a number of variables. Such variables can include a measure of past performance (e.g., past performance of the supplier, past performance of other suppliers in the same or related sector, percent of offers in same group purchased by a consumer, etc.), offer history (e.g., whether a consumer already has the offer), location (e.g., distance from the consumer to the supplier), consumer properties, views (e.g., percent of offers in the same group viewed by a consumer), editorial factors (e.g., rating by consumer or moderator of this offer), demand specifics, and/or the like. As used herein, a "group" is a set of offers that are defined by equality and/or similarity between a given list of parameters or properties. A group of offers may be all offers that have the same group key. A group key may be created by applying a transformation function of choice (e.g., an identity function) to each of the properties of the offer. The ordered concatenation of the result of the transformation functions may create the group key for that offer.

The AC intelligent agent 2402 can weight such variables so that some variables affect the rankings more than other variables. In particular, such variables can be associated with a value, a weight exponent, and/or a cumulative product. For example, the measure of past performance variable can have a value of 0.25, a weight exponent of 1, and a cumulative product of 0.0625. The offer history variable can have a value of 1, a weight exponent of 1, and a cumulative product of 0.0625. The location variable can have a value of 4 miles, a weight exponent of 0.5, and a cumulative product of 0.125. The views variable can have a value of 0.8, a weight exponent of 1, and a cumulative product of 0.1. The editorial factor can have a value of 7 out of 10, a weight exponent of 1, and a cumulative product of 0.7.

Based on these variables and values, the AC intelligent agent 2402 generates an INFOSTAR™ ranking process value for an offer. For example, the INFOSTAR™ ranking process value could be based on a mathematical function (e.g., the product, division, addition, subtraction, etc.) that uses the value, the weight exponent, and/or the cumulative product of each variable. Here, the INFOSTAR™ ranking process value for this offer based on the numbers provided above may be 0.7. However, the INFOSTAR™ ranking process value can vary based on, for example, the AC intelligent agent 2402 using a goal assessment function to adjust a variable. For example, a goal assessment function could provide an exponential boost (e.g., 2, −1, 0, etc.) or adjust a distance to target (e.g., absolute different from 25% of offers being purchased).

In an embodiment, a price optimization function can be applied by the AC intelligent agent 2402 to each offer prior to ranking to determine, for example, what level of discount the offer should have. The price optimization function can be applied such that the discount increases, decreases, or stays the same. For example, a discount can decrease (e.g., the offer of goods and/or services is more expensive) when ae consumer is consistently buying at a discount that is low. When a consumer is consistently buying at a low discount, it may be useful, in a revenue maximizing goal scenario, to decrease the discount and assess what happens (which will be done automatically because new offers become part of the history data and loop back). In further embodiments, optimization functions can also be applied by the AC intelligent agent 2402 to offer expiration and redemption periods, purchase limits and/or other parameters or boundaries.

In an embodiment, the AC intelligent agent 2402 can generate one or more offers based on the above analysis and either send an offer automatically to a consumer or provide a list of suggested offers to the supplier. For example, the AC intelligent agent 2402 can determine an optimal offer for each demand and transmit such offer to the consumer. The optimal offer can be determined by ranking, using the INFOSTAR™ ranking process and any of the factors or goals discussed above, the one or more offers that have been generated. The highest ranked offer can be selected as the optimal offer. The AC intelligent agent 2402 can be configured to generate an optimal offer that has received prior authorization from the supplier (e.g., because the optimal offer is within set boundaries). As another example, the AC intelligent agent 2402 can generate a refined set of suggested offers that the supplier can select, modify, and/or transmit to the consumer. In some embodiments, if the AC intelligent agent 2402 concludes there is no adequate offer considering current data and knowledge, the AC intelligent agent 2402 can notify the supplier to take action (e.g., such as by authorizing a broader range of discounts, creating a new offer, etc.).

In some embodiments, a consumer generates a demand that can be fulfilled by two or more suppliers. An AC intelligent agent 2402 associated with each supplier can generate an offer for the respective supplier, and each of the offers can be transmitted to the consumer. The INFOSTAR™ ranking process can be used to rank the offers generated for each of the suppliers (e.g., using any of the factors or goals discussed above) such that the offers are presented to the consumer in a ranked order.

Figure 25A:
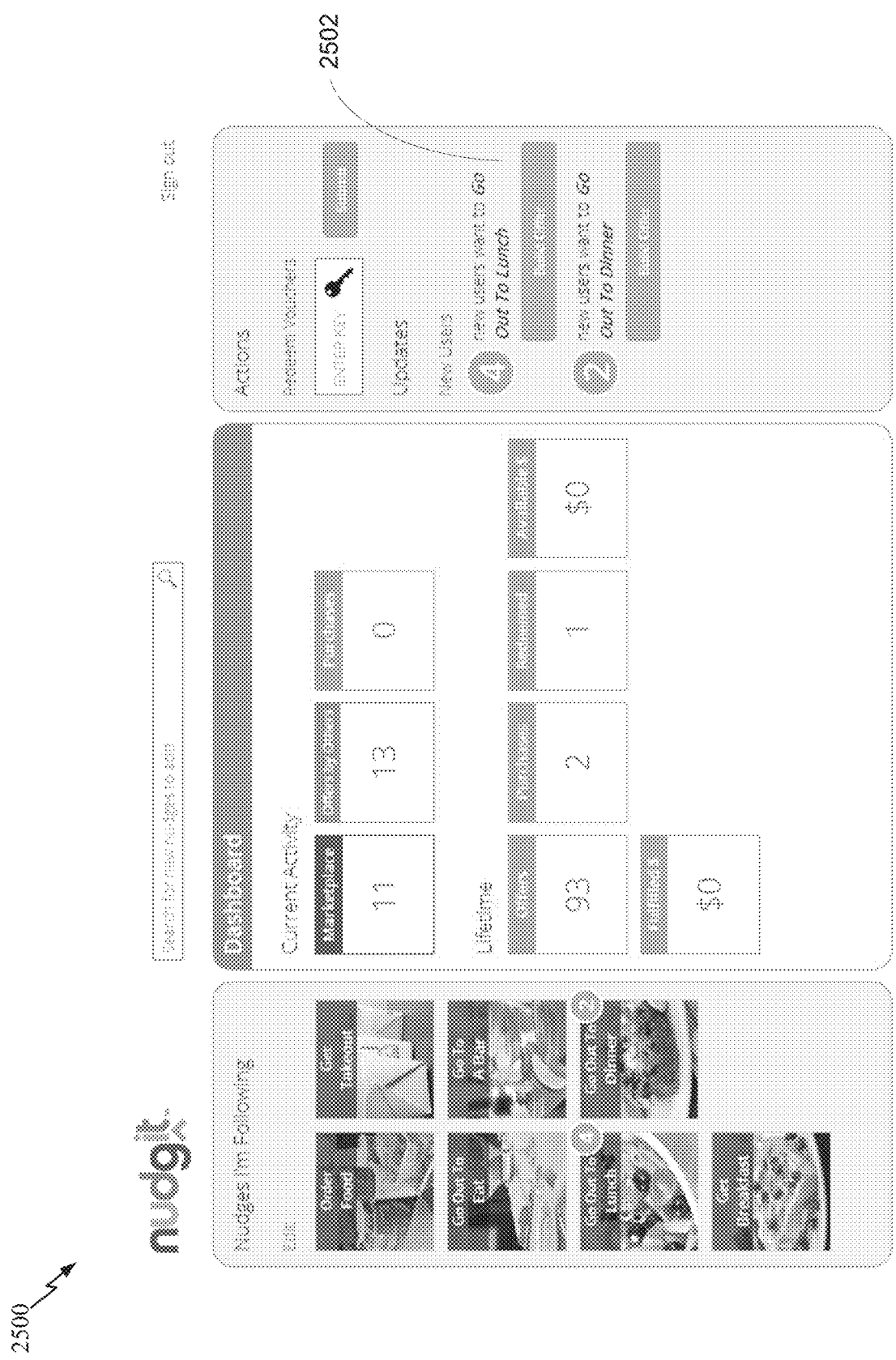
FIGS. 25A-E illustrate another dashboard viewed through a browser accessing a network application.

FIG. 25A-E illustrate another dashboard 2500 viewed through a browser accessing a network application. The dashboard 2500 can be viewed by a supplier. As illustrated in FIG. 25A, the dashboard 2500 displays an indication of new demands for goods and/or services that have been received in box 2502. For example, in box 2502, demands indicating that four new users want to go out to lunch is presented.

Figure 25B:
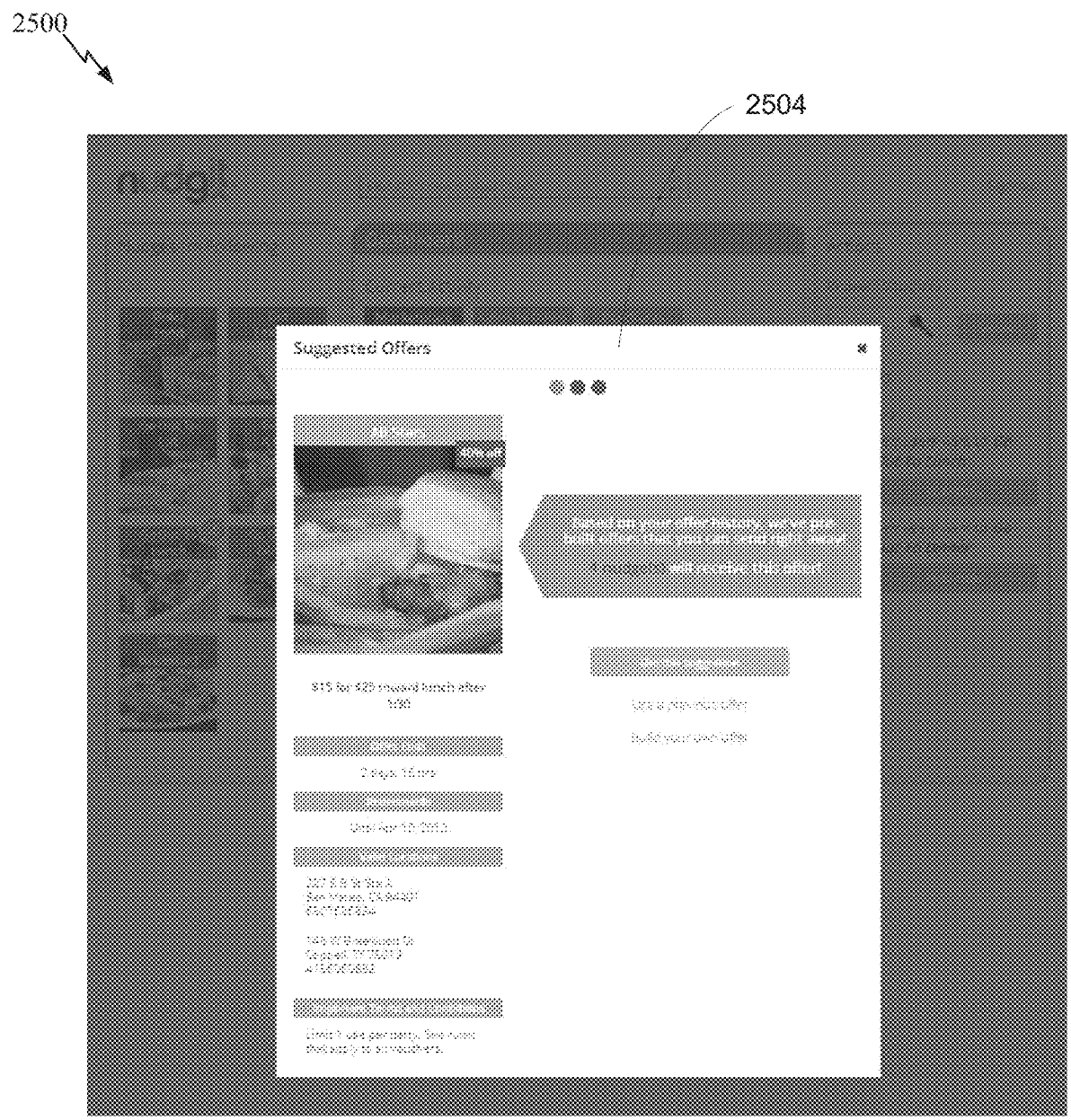

In an embodiment, upon receiving the demands for goods and/or services, the dashboard 2500 can display one or more suggested offers. The dashboard 2500 can display the one or more suggested offers immediately after a demand is expressed or a time after a demand is expressed (e.g., after a threshold number of demands related to the same good or service have been expressed). As illustrated in FIG. 25B, the dashboard 2500 displays a suggested offer in window 2504. The supplier can be presented with several options, such as accepting the suggested offer, modifying the suggested offer, or building a separate offer.

Figure 25C:
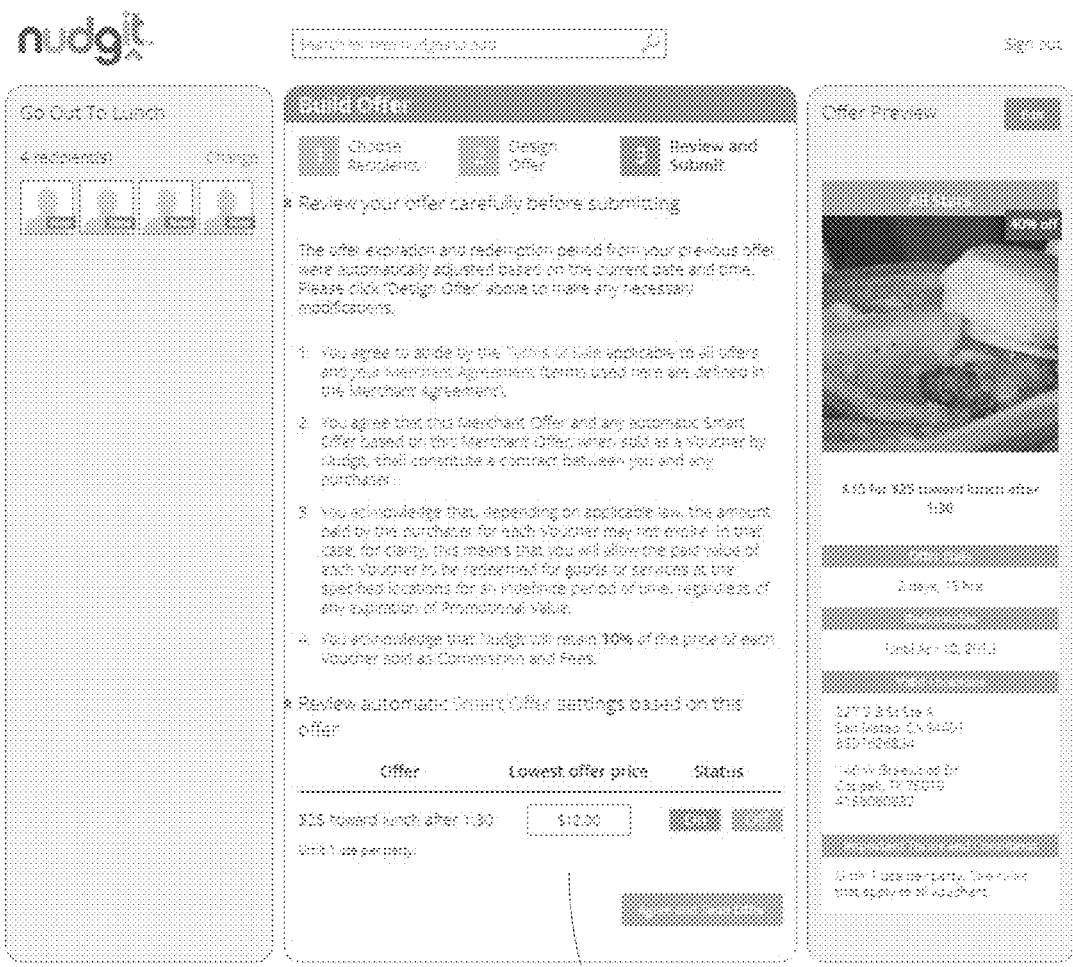

As illustrated in FIG. 25C, the dashboard 2500 can be configured to provide the supplier with an opportunity to approve and/or modify the suggested offer after the suggested offer is accepted by the supplier. For example, in box 2506, the supplier is provided an opportunity to adjust the lowest price offered in an automatically generated offer.

Figure 25D:
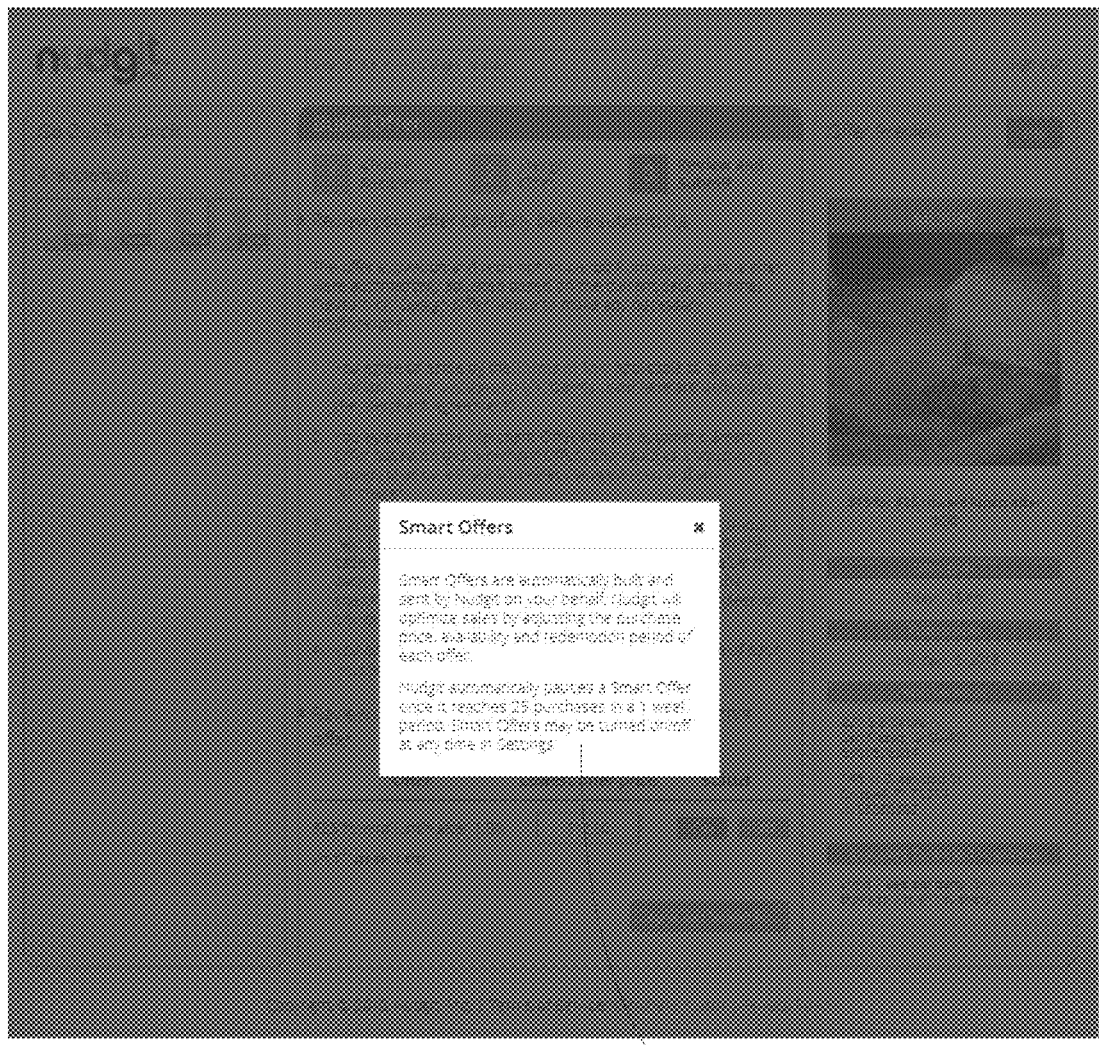

As illustrated in FIG. 25D, the dashboard 2500 can be configured to inform the supplier of the capabilities and/or security features of the AC intelligent agent 2402 in window 2508. For example, the window 2508 can include information describing how offers are optimized and how offers can be suspended or paused once a threshold number of offers have been purchased.

Figure 25E:
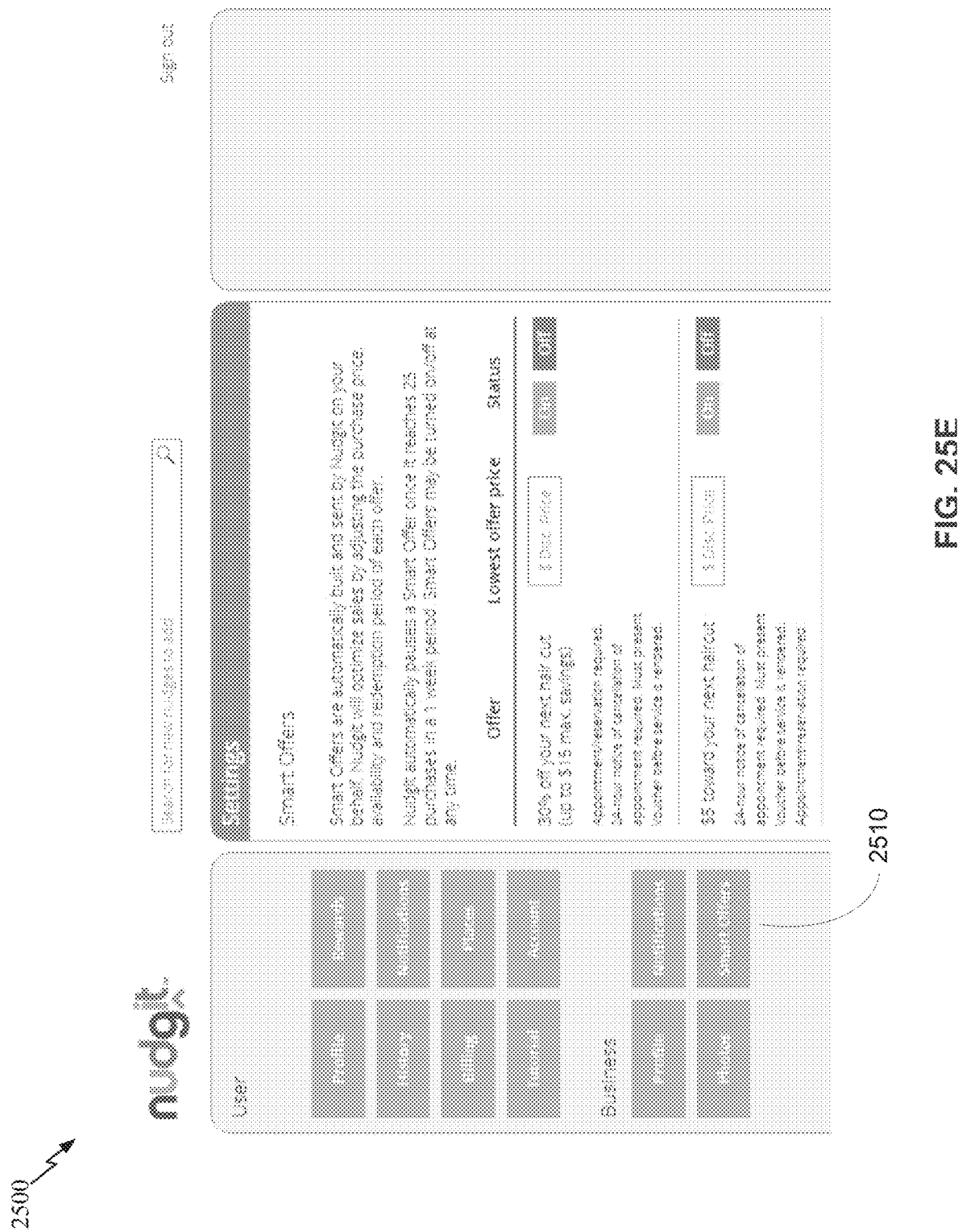

As illustrated in FIG. 25E, the dashboard 2500 can be configured to display settings for the generation of automatic offers. For example, the dashboard 2500 can include a button 2510 that allows a supplier to view automatic offer settings. Such settings can include whether a minimum price should be offered, and what the minimum price should be, for offers generated in the past.

Figure 26:
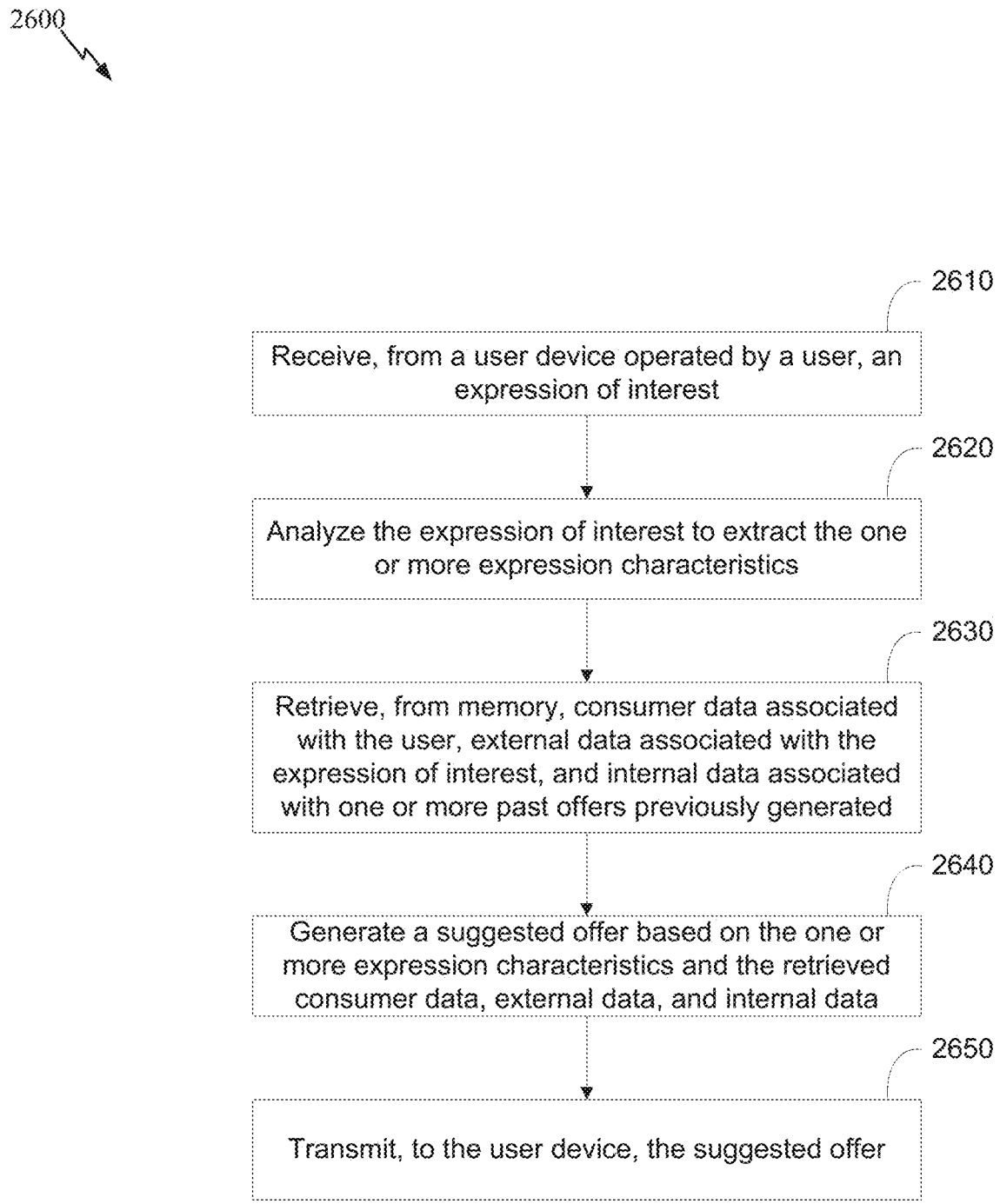
FIG. 26 illustrates an embodiment of a process for automatically generating an offer.

FIG. 26 illustrates an embodiment of a process 2600 for automatically generating an offer. In various embodiments, additional blocks may be performed, fewer blocks than shown may be performed, and/or the blocks may be performed in an order different than that shown. The process may be performed, for example, by server 120 of FIG. 1.

In an embodiment, the process 2600 begins at block 2610. At block 2610, an expression of interest is received from a user device operated by a user. In an embodiment, the expression of interest comprises an indication of a desire by the user to obtain a good or service. In a further embodiment, the expression of interest comprises one or more expression characteristics (e.g., good or service desired, time frame when the good or service is desired, etc.).

At block 2620, the expression of interest is analyze to extract the one or more expression characteristics. At block 2630, consumer data associated with the user, external data associated with the expression of interest, and internal data associated with one or more past offers previously generated is retrieved from memory. In an embodiment, consumer data comprises at least one of a history of transactions successfully finalized by the user, profile information of the user, or information related to a group of users that comprises the user. In an embodiment, external data comprises at least one of individual demand for goods or services related to the expression of interest, group demand for goods or services related to the expression of interest, one or more geographic locations where the expression of interest originates, a time constraint of the expression of interest, a volume of demand for a good or service associated with the expression in a geographic location, pricing information for a good or service associated with the expression, or a rating for a good or service associated with the expression. In an embodiment, internal data comprises at least one of past demand for a good or service related to the expression or an offer of a good or service related to the expression that has been generated in the past.

At block 2640, a suggested offer is generated based on the one or more expression characteristics and the retrieved consumer data, external data, and internal data. In an embodiment, the suggested offer provides a proposal for a good or service in response to the expression of interest. At block 2650, the suggested offer is transmitted to the user device.

Flexible Pricing

In an embodiment, the AC intelligent agent 2402 (e.g., the smart pricing device 2404) can be configured to implement a flexible pricing model. In a flexible pricing model, the AC intelligent agent 2402 can provide a guarantee to a supplier that an item will be offered for at least a minimum price. In exchange for such a service, an entity that operates the AC intelligent agent 2402 can take, as commission, some or all of the profit garnered from offering the item for a price higher than the minimum price. The flexible pricing model can be used to determine what the offer price should be. As used below, "source" refers to any business or supplier providing goods of any kind and/or services of any kind, "item" refers to any product or service, "entity" refers to any person or business, "pi-reg" refers to a regular price of an item, "pi-min" refers to a minimum price at which an item can be sold (according to the source), and "pi-act" refers to an actual price at which an item is proposed.

Figure 27:
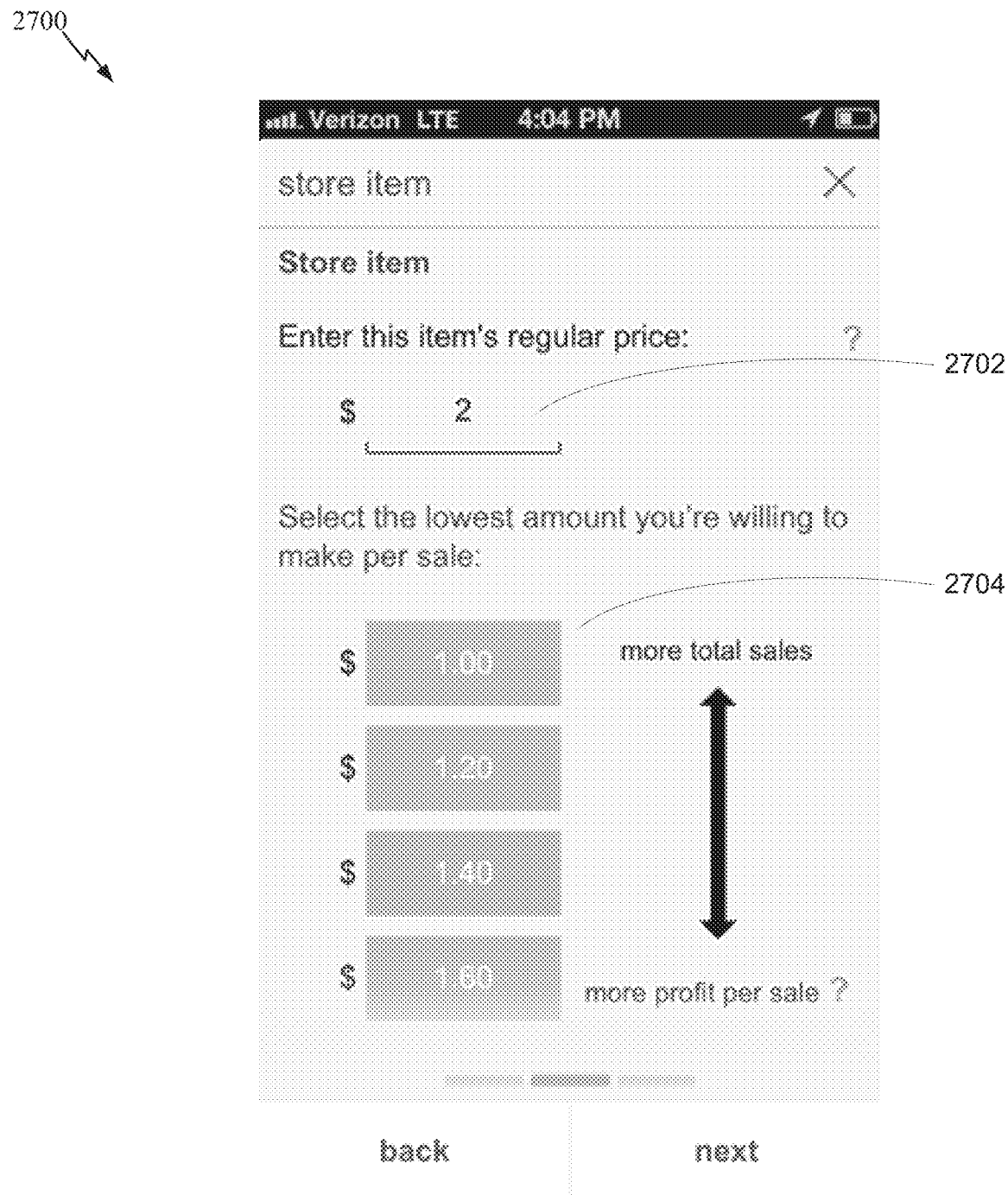
FIG. 27 illustrates another dashboard viewed through a browser accessing a network application.

The AC intelligent agent 2402 can be configured to implement the flexible pricing model by performing one or more actions. For example, the AC intelligent agent 2402 can request information from the source, such as the pi-reg and pi-min of an item. FIG. 27 illustrates another dashboard 2700 viewed through a browser accessing a network application. As illustrated in FIG. 27, the dashboard 2700 can request pi-reg in field 2702 and pi-min in field 2704. In some embodiments, the AC intelligent agent 2402 can provide a set of values that the supplier can choose from. For example, as illustrated in FIG. 27, the supplier can choose from the options of $1.00, $1.20, $1.40, and $1.60.

In some embodiments, as illustrated in FIG. 27, the AC intelligent agent 2402, via the dashboard 2700, requests a pi-reg and/or a pi-min value from the supplier. In other embodiments, not shown, the AC intelligent agent 2402 generates the pi-reg and/or the pi-min value based on any of the factors or goals discussed above.

The AC intelligent agent 2402 can then generate a pi-act based on the pi-reg and the pi-min. In some embodiments, the pi-act is a price higher than or equal to pi-min, but lower than or equal to pi-reg. Pi-act can be set based on an individual or personalized consumer/supplier basis, using additional contextual information (e.g., any of the factors or goals discussed above, including consumer data, etc.), and/or the like. For example, two or more consumers may generate a demand for the same good or service. However, the price in an offer presented to the first consumer may be different than the price in an offer presented to the second consumer. Thus, pi-act can be based on the informational advantage of the AC intelligent agent 2402 over both the consumer and the supplier. For instance, the AC intelligent agent 2402 can access and analyze more information about the consumer than is available to the supplier and, conversely, the AC intelligent agent 2402 can access and analyze more information about the supplier than is available to the consumer. By being able to access and analyze extra information (e.g., entropy) associated with the consumer and the supplier, the AC intelligent agent 2402 is capable of finding an optimized price for the consumer and supplier to transact. In this way, the AC intelligent agent 2402 can price even non-standardized items such as local services. In addition, the supplier can then get assurances that a minimum amount of revenue can be generated based on sales of an item.

The AC intelligent agent 2402 can implement one or more techniques to determine a price for an item. In an embodiment, the AC intelligent agent 2402 can set an initial price for an item that has a regular price value ("$P_{max}$") and a lower bound discount price ("$P_{min}$") based on demand for the item and a time interval that the demand is received for. For example, the initial price could be higher when the aggregate demand for the item across the time interval is higher, the initial price could be lower when the aggregate demand for the item across the time interval is lower, the initial price could be lower when the aggregate demand for the item is more certain (e.g., the time interval for the item is small), and/or the initial price could be higher when the aggregate demand for the item is less certain (e.g., the time interval for the item is large).

For a given time interval ("T"), the supplier can supply a maximum potential volume of items sold ("$I_{max}$"). As T becomes larger, the supplier may be less willing to price the item as if the $I_{max}$ is fully available. Thus, the AC intelligent agent 2402 can use an exponential decay of percent available ("$\gamma$") and the following equation to model supplier willingness to price the item as if the $I_{max}$ is fully available:

$$I_{available,T} = I_{max} * \gamma_T \tag{8}$$

For a given T, a quantity of the item can be reserved ("$I_{reserved}$") based on a preexisting demand that may convert ("$I_{potential}$") and items that have sold ("$I_{sold}$"):

$$I_{reserved,T} = I_{sold,T} + I_{potential,T} * 1/x \tag{9}$$

where x is an adjustment factor representing the likelihood of $I_{potential}$ to convert into $I_{sold}$. The initial price ("$P_0$") can then be determined based on how much of $I_{available}$ has already been taken (e.g., sold):

$$P_0 = (I_{reserved,T}/I_{available,T}) * (P_{max} - P_{min}) + P_{min} \tag{10}$$

In an embodiment, because the initial price is driven based on T, the usable period of the initial price ($T_{redeemable}$) can be isolated to T. Thus, $T_{redeemable}$ can be T for long periods and $T_{redeemable}$ can be T plus a buffer for short periods.

In an embodiment, the supplier may desire to force a consumer to understand that an item may not always be available. Accordingly, the AC intelligent agent 2402 can set expiration of an offer based on $I_{reserved,T}/I_{available,T}$ for any given offer. If $I_{reserved,T}$ is low relative to $I_{available,T}$, then the expiration can be a large portion of time through T. If $I_{reserved,T}$ is close to then the expiration may be a small portion of time through T. As an example, if a demand is expressed for a lunch service at 3:00 pm on the same day, T can be 3:00 and $I_{reserved,T}$ can low because there are few reservations at that time. Likewise, $I_{available,T}$ can be high because a lot of tables may be available. Thus, taking into account the contextual information of the requested time of service, the initial price as calculated using equation (10) may trend toward the lower bound discount price (and may be equal to the lower bound discount price). Other contextual information can be used to determine the initial price, including returning or new customer, frequency of redeeming offers for the same service, and/or the like.

In another embodiment, the AC intelligent agent 2402 can set an initial price for an item using an entropy measure that uses a target redemption date. Offers may be priced dynamically based on a target redemption rate and a target redemption entropy. The target redemption rate may be a number of desired customers per period of available redeemable time (e.g., open business hours). The target redemption entropy may be the desired amount of uncertainty related to when customers redeem an offer. For any given offer, the redeemable range of inventory and entropy may be "used up" by demands, purchases, and/or redemptions. Demands can be multiplied by the probability of conversion (e.g., the probability that a demand results in a purchase of an offer) and spread out evenly (or according to a probability distribution) across the redeemable range. Purchases can be spread out evenly (or according to a probability distribution) across the intersecting redeemable range. Redemptions may use up inventory with a quantity of one and an entropy of zero. Once the used up inventory and entropy is calculated, a ratio can be determined of the actual to the target rate. The AC intelligent agent 2402 can linearly price (or apply a function to) the offer from the lowest price at which the item can be offered to the regular price based on this ratio. Entropy ("E") may be represented using the following equation:

$$E = -p * \log(p) \tag{11}$$

The initial price may be represented using the following equation:

$$P_0 = ((K_I * (I_{reserved,T}/I_{available,T}) + K_E * (E_{reserved,T}/E_{available,T}))/(K_I + K_E)) * ((P_{max} - P_{min}) + P_{min} \tag{12}$$

where $K_I$ and $K_E$ are some factors that allow for the management of the relative importance of inventory and entropy.

For example, if an offer expires today at 3:00 pm, there may be increased certainty as compared to an offer that expires 6 months from now. In the 3:00 pm case, the probability of redemption may be 1 and the entropy may be close to 0, which tends to minimize the initial price. Conversely, if it is highly uncertain that a transaction may take place, entropy may trend toward 1 and the initial price may increase.

Figure 28:
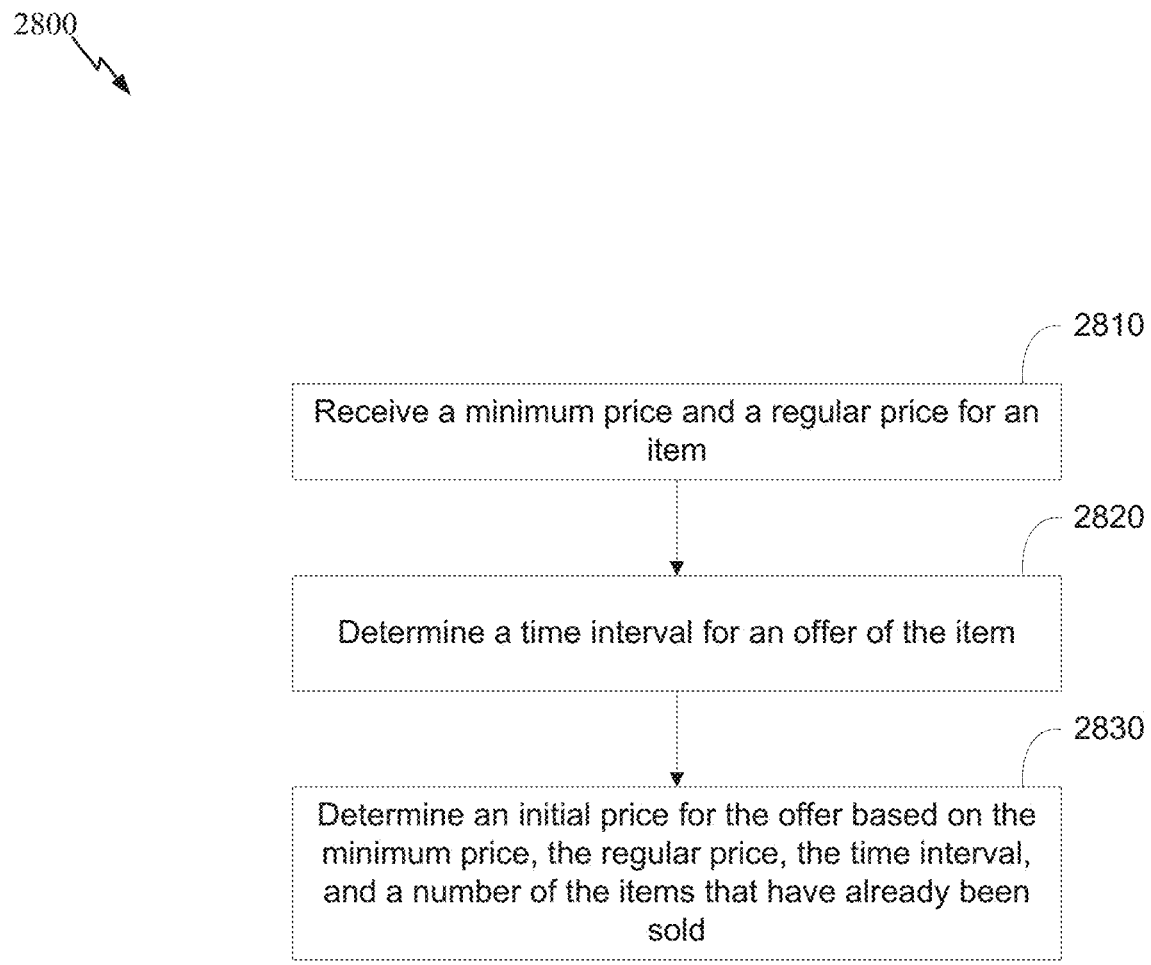
FIG. 28 illustrates an embodiment of a process for setting the price of an offer.

FIG. 28 illustrates an embodiment of a process 2800 for setting the price of an offer. In various embodiments, additional blocks may be performed, fewer blocks than shown may be performed, and/or the blocks may be performed in an order different than that shown. The process may be performed, for example, by server 120 of FIG. 1.

In an embodiment, the process 2800 begins at block 2810. At block 2810, a minimum price and regular price of an item is received. In an embodiment, the minimum price and the regular price of the item is provided by the supplier of the item. At block 2820, a time interval for an offer of the item is determined. In an embodiment, the time interval is determined based on the factors considered by the AC intelligent agent, such as the AC intelligent agent 2402, described above. At block 2830, an initial price for the offer is determined based on the minimum price, the regular price, the time interval, and a number of the items that have already been sold. In an embodiment, the initial price is calculated based on equation (10) described above.

Figure 29:
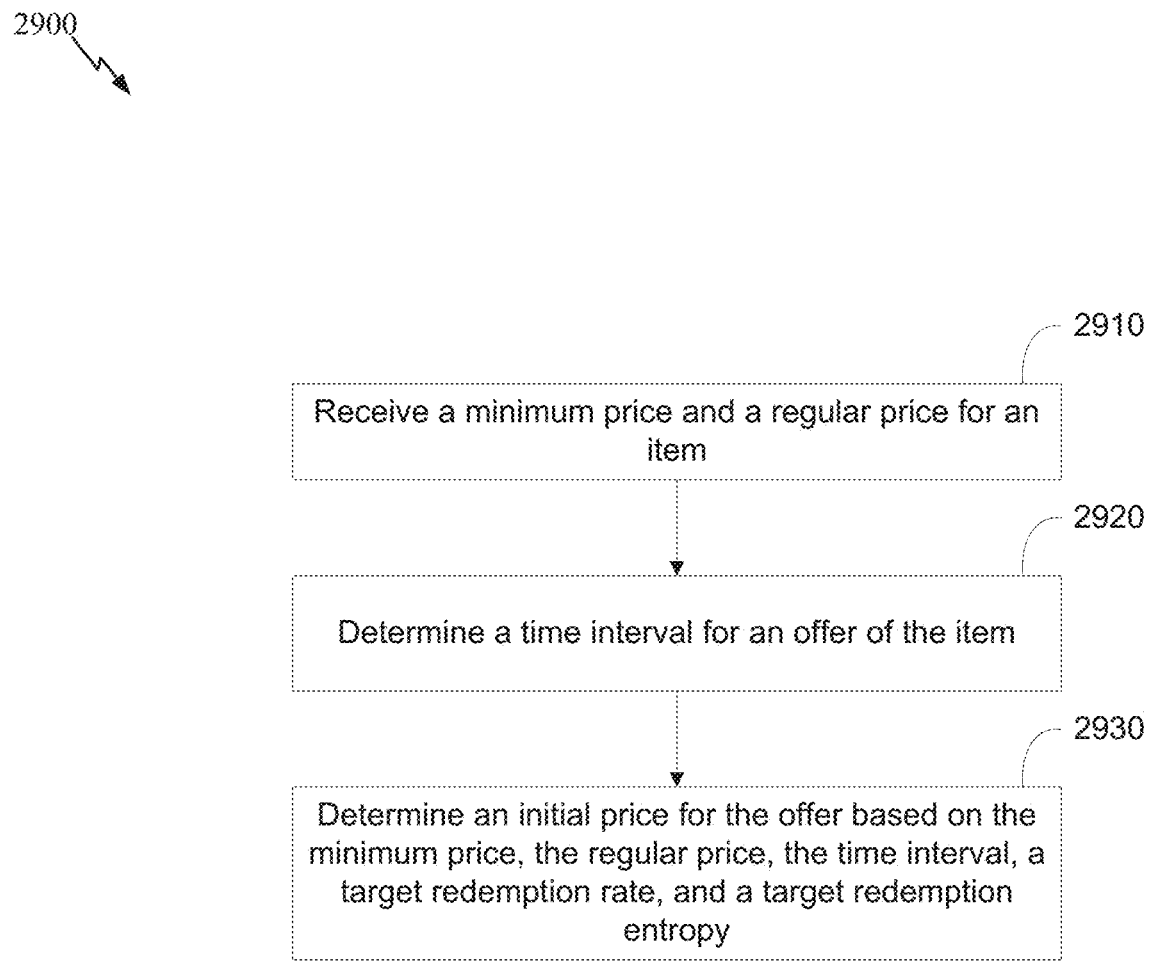
FIG. 29 illustrates another embodiment of a process for setting the price of an offer.
Figure 30D:
FIGS. 30A-R illustrate embodiments of a graphical user interface for on-demand local shopping.
Figure 30C:
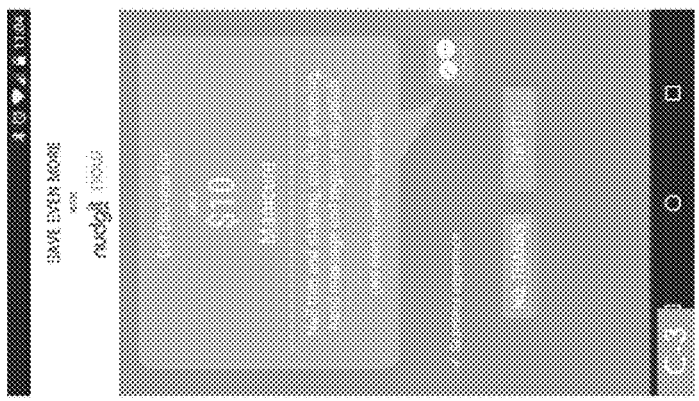
Figure 30B:
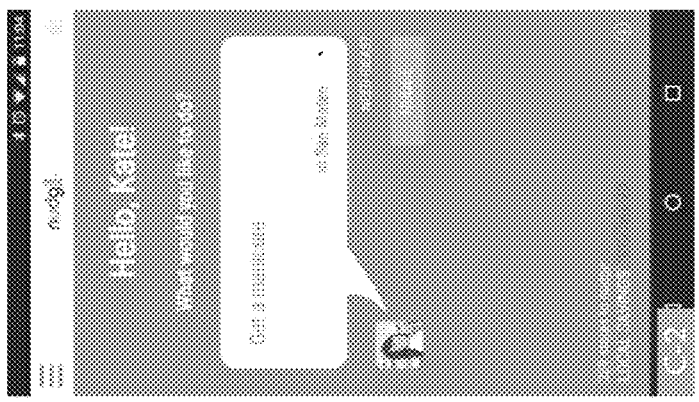
Figure 30A:
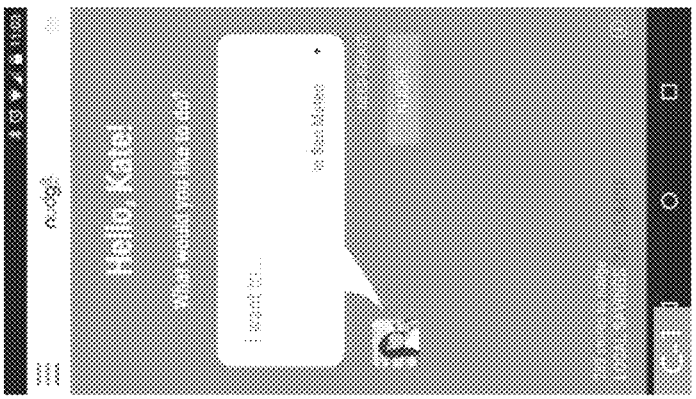
Figure 30E:
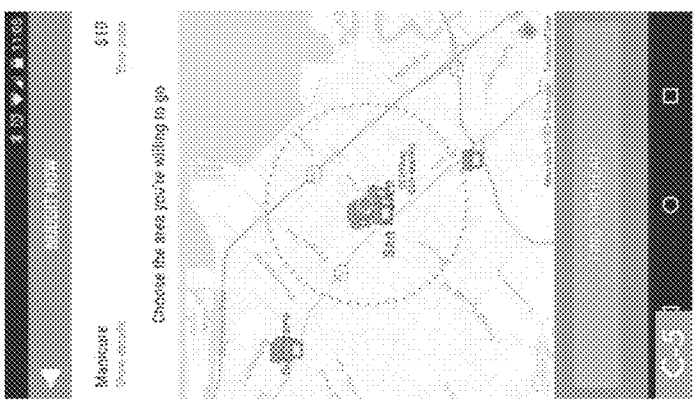
Figure 30F:
Figure 30G:
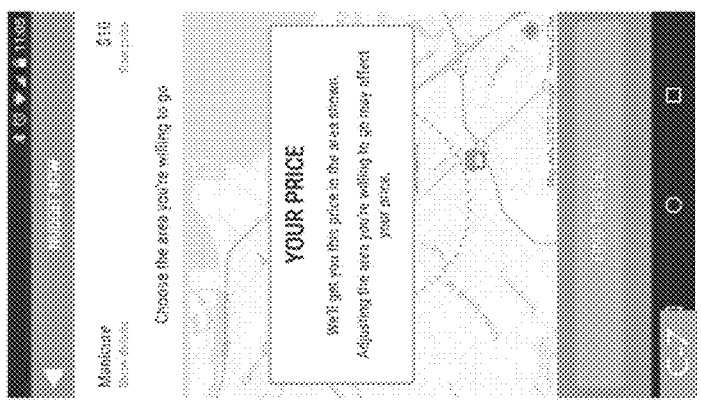
Figure 30H:
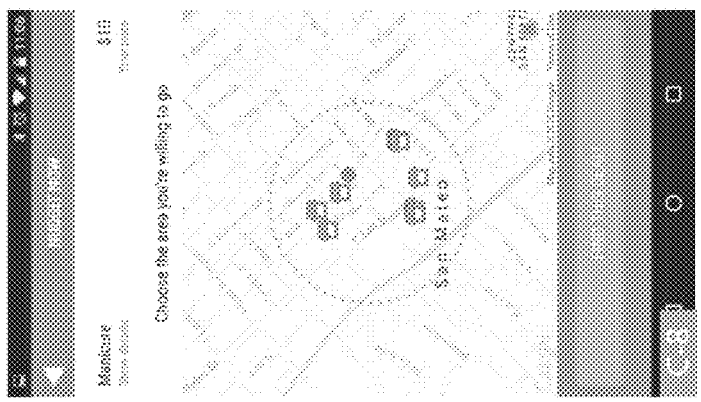
Figure 30L:
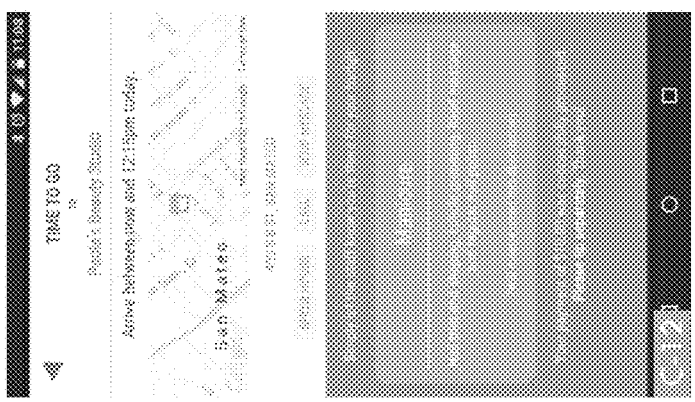
Figure 30K:
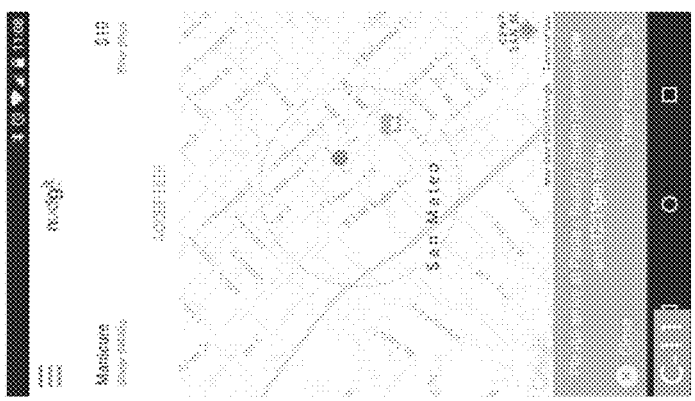
Figure 30J:
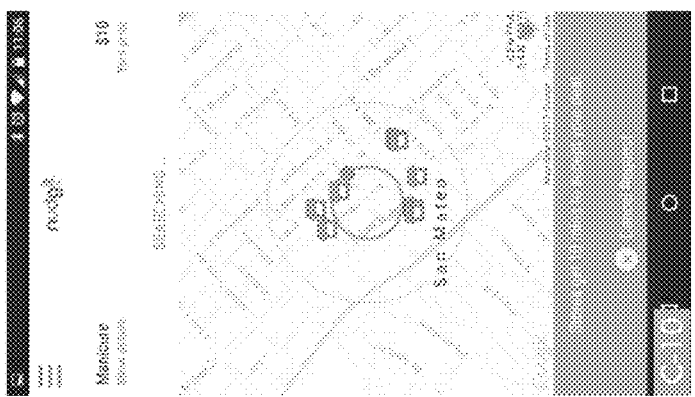
Figure 30I:
Figure 30M:
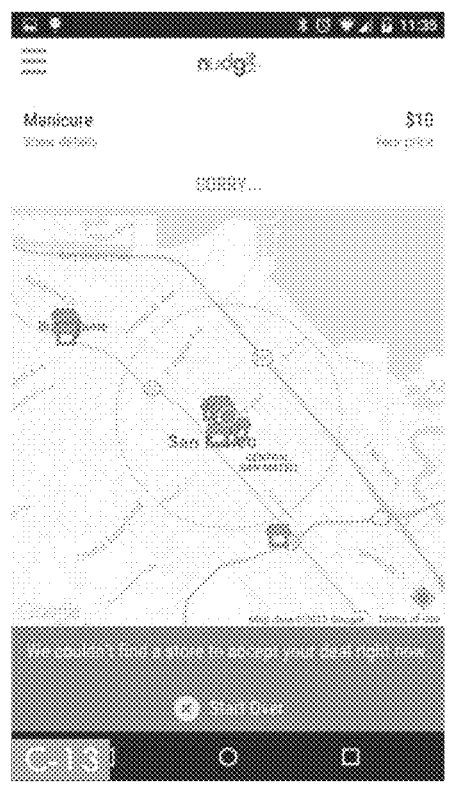
Figure 30Q:
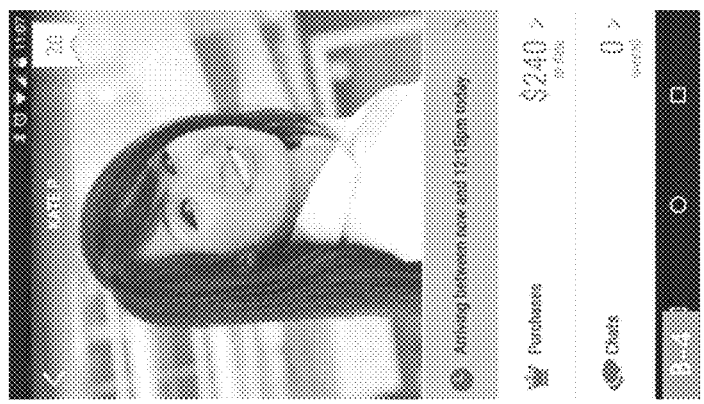
Figure 30P:
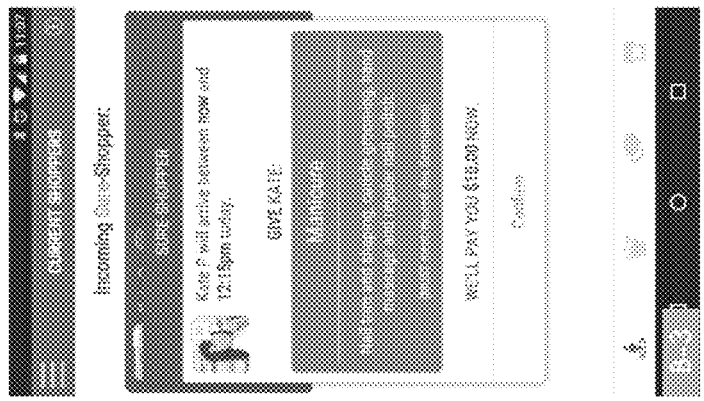
Figure 30O:
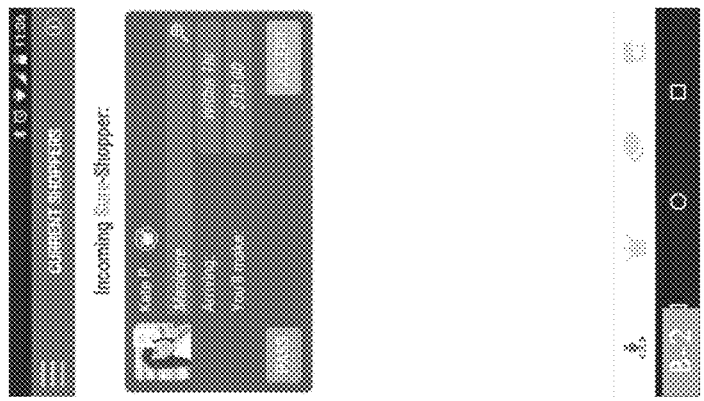
Figure 30N:
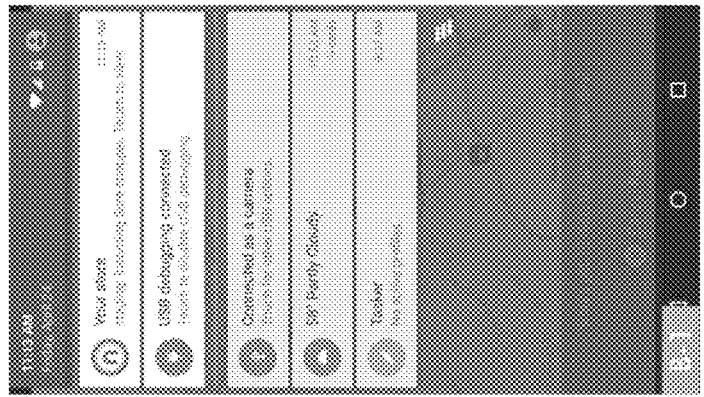
Figure 30R:
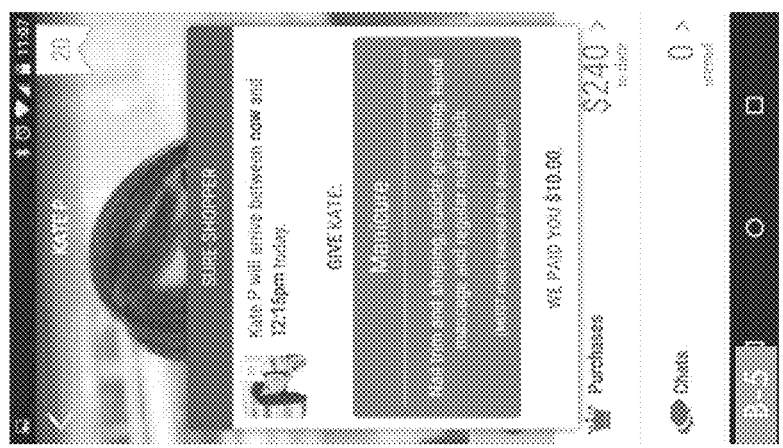

FIG. 29 illustrates another embodiment of a process 2900 for setting the price of an offer. In various embodiments, additional blocks may be performed, fewer blocks than shown may be performed, and/or the blocks may be performed in an order different than that shown. The process may be performed, for example, by server 120 of FIG. 1.

In an embodiment, the process 2900 begins at block 2910. At block 2910, a minimum price and regular price of an item is received. In an embodiment, the minimum price and the regular price of the item is provided by the supplier of the item. At block 2920, a time interval for an offer of the item is determined. In an embodiment, the time interval is determined based on the factors considered by the AC intelligent agent, such as the AC intelligent agent 2402, described above. At block 2930, an initial price for the offer is determined based on the minimum price, the regular price, the time interval, a target redemption rate, and a target redemption entropy. In an embodiment, the initial price is calculated based on equation (12) described above.

On-Demand Local Shopping

In some embodiments, a computer system enables buyers and sellers to transact on-demand. A consumer may use a mobile application to specify something they want (a "Demand") (C-2). The system detects and recognizes the Demand intent and determines minimum parameters that would satisfy the Demand (C-3). The system may also determine whether the Demand may be satisfied in a geographical area and at what cost or range of costs to the consumer (C-4 through C-7). To secure an expected cost, the consumer may provide some certainty of payment (C-9). Costs may be presented based on calculations to optimize profit or success as a transaction broker, some methods of which are more described more particularly below in the section entitled Optimizations (collectively, "Broker Optimizations"). The consumer may also or alternatively specify a desired cost or cost range.

The system presents the Demand to sellers and/or service providers ("Suppliers") (C-10 and B-2). This presentation may be through a mobile application and said application may use external notifications (B-1). The set of Suppliers to be presented the Demand may be determined from, without limitation, Supplier attributes such as goods and services, Supplier prices, location, business hours, transactional history, response history and reviews/ratings. The presentation may be a unilateral contract and may include information and terms such as potential customer, goods and/or service specification, time and sales proceeds (B-3). Suppliers may have the ability to accept and/or or pass on the contract. The Demand may be presented in time to Suppliers via a number of methods or combinations thereof, including without limitation in series, parallel, in batches and in a deterministic manner, any of which may utilize Broker Optimizations. The Demand presentation may compel competition among Suppliers. The Demand may be presented with cost information, which may be unique to each Supplier or Consumer/Supplier pair, and incorporate price spreads between Consumer cost and Supplier proceeds based on Broker Optimizations.

If accepted, said contract would obligate the accepting Supplier (B-3). A Supplier may be reviewed by the Consumer to validate that the minimum parameters to satisfy the Demand were provided.

OPTIMIZATIONS

As used herein, "price" and "proceeds" have identical qualitative meanings with the qualification that "proceeds" is intended to reflect a Supplier's observation of "price," which may be quantitatively different than a consumer's observation of "price."

Factors that may affect the presentation, disclosure or offers of price/proceeds for transactions as described herein:
  Based on price history and rate of acceptance for a given price of given type of contract, a probability of successful acceptance may be ascribed to each price point and adjusted by current participating merchants.
  Based on available inventory in the marketplace. For example, prices may be adjusted to some discount off the average or minimum price.
  Based on whether prices are advertised or uniqueness of product. Products whose prices that are not advertised may generally be priced above a "regular" price. Products that are unique (e.g., tickets for sold out game) may not be capped by some "regular" price.
  Based on the consumer rating of the business.
  Based on the time of day (peak/off peak, by activity and/or business).
  Based on current Demand level (for example, number of outstanding Demands).
  Based on the current or projected active supply level. This may be based on manual designations such as a status that the business user sets when they are actively seeking new customers as well as business hours. This may also be inferred based on recent activity implying they had time and ability to access their devices recently. This may also be based on previous times of acceptance combined with whether they recently accepted a contract combined with their capacity.
  Based on the average time to acceptance of contracts (grouped by activity, time of day, etc.).

Variations on mechanics, which may be applied in whole or in combinations thereof, of the presentation, disclosure or offers of price/proceeds for transactions as described herein:
  The price may be presented differently to different Suppliers. For example, based upon what the regular price of their goods/services are, the quality of a business's rating, shoulder hours for a specific business, etc.
  The timing and duration for which a Supplier is able to observe the price or a contract may be dependent on a number of factors including previous positive/negative consumer feedback rates, consumer preferences and past behavior, and current prices, and current market activity. As examples: (1) A Supplier that has been previously rated poorly by user, may never be able to see Demand by that user again and will only be able to see Demand by other users for a period; or (2) In the case that a user has designated a preference of quality over price, low quality Suppliers may not be able to see the Demand; or (3) In the case contracts are frequently getting accepted by a single Supplier, the system may delay availability for that Supplier to provide a chance for a more diverse response set; or (4) In the case that high number of high quality Suppliers that has viewed the contract and the consumer has preferences for higher quality, lower quality Suppliers may be restricted from accepting the contract even if they were able to do so at a prior time because the probability of high quality acceptance is high.

The consumer may designate or be given a range of prices (e.g., between $15 and $20, or up to $20), allowing: (1) the system may attempt to get as low a price as possible so the final actual cost may be lower and/or (2) A variation in quality where presumably lower quality may be acceptable at a lower price.

The proceeds available that are presented to Suppliers may be variable over time. For example, they may increase in time or are known to increase by certain amounts after specific time periods. Prices may also increase based on the number of businesses that have viewed the request. Suppliers may be incentivized to accept earlier because other businesses may accept before they do.

The consumer may designate a quality level instead of a price.

The consumer may pre-select a set of Suppliers or supplier preferences with potential pricing consequences.

There may be levels of specificity in a contract with each potentially affecting the price of the item. For example, the consumer may be given the option to specify certain aspects of a food order-type contract, such as cuisine, protein, etc. In this manner, a consumer may effectively trade higher control for less cost, and vice versa.

Prices to consumers and proceeds to Suppliers may be uniquely determined for each transaction making attempt. For example, a $10 price paid by a consumer for the satisfaction of a Demand may not be equally realized by one Supplier over another. In one scenario, the system may provide proceeds of $8 to Supplier A and $5 to Supplier B if accepted, respectively.

Terminology

All of the methods and tasks described herein may be performed and fully automated by a computer system, including a computer system configured with specific executable instructions. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. To clearly illustrate this interchangeability of hardware and software, various illustrative components, blocks, modules, and steps have been described above generally in terms of their functionality. Whether such functionality is implemented as specialized hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for presenting ranked search results on an interactive graphical user interface based on a semantic matching platform that is configured to apply an ontology, the system comprising:
   one or more computer readable storage devices configured to store a plurality of computer-executable instructions;
   a semantic matching platform;
   one or more network communication systems; and
   one or more hardware computer processors in communication with the one or more computer readable storage devices to execute the plurality of computer-executable instructions to cause the system to:
   generate and transmit, to a first user device via the one or more network communication systems, display instruction for display of an interactive graphical user interface (GUI) comprising a search query region configured to receive a search criteria;
   receive, from the first user device via the one or more network communication systems, search criteria associated with an intent of a first user;
   parse, with the semantic matching platform, the search criteria into one or more standardized classes, wherein the semantic matching platform is configured to apply an ontology to determine the one or more standardized classes;
   determine, with the semantic matching platform, an approximation of the intent of the first user based at least in part on the one or more standardized classes;
   apply, with the semantic matching platform, an abstraction process to identify at least one of: similarities, intersections, or relations between two or more possible intents, wherein the abstraction process further causes the system to connect the two or more possible intents based at least in part on each intent's respective description and each intent's relationship to one another;
   determine and rank a set of matched results by searching the one or more computer readable storage devices, wherein the searching is based at least in part on the approximation of the intent of the first user, wherein the approximation of the intent of the first user, determined with the semantic matching platform, is based at least in part on the one or more standardized classes, wherein the instructions further cause the system to rank the set of matched results based on: (1) a syntactic search process corresponding to analysis of a structure, grammar, or vocabulary of a word or phrase, and (2) a semantic search process corresponding to a meaning of words or phrases; and
   generate and transmit, to the first user device via the one or more network communication systems, updated display instruction for display of an updated interactive GUI, wherein the updated interactive GUI is configured to present at least one search result that includes a portion of the ranked set of matched results, wherein the portion of the ranked set of matched results includes one or more of highest ranked matched results that are determined to be the most relevant to the first user based at least in part on the approximation of the intent of the first user, and wherein the portion of the ranked set of matched results includes at least a portion of semantic results from the semantic search process as highest ranked results followed by at least a portion of syntactic results from the syntactic search process.

2. The system of claim 1, wherein the portion of the ranked set of matched results includes the highest ranked matched result.

3. The system of claim 1, wherein the updated interactive GUI is further configured to present the portion of the ranked set of matched results in a position of the updated interactive GUI based on the ranking of the portion of the ranked set of matched results.

4. The system of claim 3, wherein the updated interactive GUI is further configured to present the highest ranked matched result in a position on the updated interactive GUI based on the ranking of the portion of the ranked set of matched results.

5. The system of claim 1, wherein the intent of the first user includes an indication of a desire to engage in an activity.

6. The system of claim 1, wherein the search criteria are free-form and comprises one or more words.

7. The system of claim 1, wherein the classes include one or more of: a category, an agenda verb, an object, a verb interrogative, an object interrogative, a detail interrogative, or a location.

8. The system of claim 1, wherein the ranking is based at least in part on one or more of: usage of an activity, location of an activity, time of an activity, or properties with respect to the approximation of the intent.

9. The system of claim 1, wherein the intent of the first user comprises at least one or more of: a desired transaction, an articulated demand, a proposal to provide information, goods, or services, a request for advice, or a search query.

10. The system of claim 1, wherein the search results are configured to be selectable by the first user.

11. The system of claim 1, wherein the relation between two or more possible intents includes one or more of: familial relationships, sequential relationships, or necessary relationships.

12. The system of claim 1, wherein the portion of the ranked set of matched results includes a highest ranked semantic result from the semantic search process as a highest ranked result, and a highest ranked syntactic result from the syntactic search process as the second highest ranked result.

13. A method for presenting ranked search results on an interactive graphical user interface based on a semantic matching platform that is configured to apply an ontology, the method comprising:
  generating and transmitting, to a first user device via one or more network communication systems, display instruction for display of an interactive graphical user interface (GUI) comprising a search query region configured to receive a search criteria;
  receiving, from the first user device via the one or more network communication systems, search criteria associated with an intent of a first user;
  parsing, with a semantic matching platform, the search criteria into one or more standardized classes, wherein the semantic matching platform is configured to apply an ontology to determine the one or more standardized classes;
  determining, with the semantic matching platform, an approximation of the intent of the first user based at least in part on the one or more standardized classes;
  applying, with the semantic matching platform, an abstraction process to identify at least one of: similarities, intersections, or relations between two or more possible intents, wherein applying the abstraction process includes connecting the two or more possible intents based at least in part on each intent's respective description and each intent's relationship to one another;
  determining and ranking a set of matched results by searching the one or more computer readable storage devices, wherein the searching is based at least in part on the approximation of the intent of the first user, wherein the approximation of the intent of the first user, determined with the semantic matching platform, is based at least in part on the one or more standardized classes, wherein ranking the set of matched results is based on: (1) a syntactic search process corresponding to analysis of a structure, grammar, or vocabulary of a word or phrase, and (2) a semantic search process corresponding to a meaning of words or phrases; and
  generating and transmitting, to the first user device via the one or more network communication systems, updated display instruction for display of an updated interactive GUI, wherein the updated interactive GUI is configured to present at least one search result that includes a portion of the ranked set of matched results, wherein the portion of the ranked set of matched results includes one or more of highest ranked matched results that are determined to be the most relevant to the first user based at least in part on the approximation of the intent of the first user, and wherein the portion of the ranked set of matched results includes at least a portion of syntactic results from the syntactic search process as highest ranked results followed by at least a portion of semantic results from the semantic search process.

14. The method of claim 13, wherein the updated interactive GUI is further configured to present the portion of the ranked set of matched results in a position of the updated interactive GUI based on the ranking of the portion of the ranked set of matched results.

15. The method of claim 14, wherein the updated interactive GUI is further configured to present the highest ranked matched result in a position on the updated interactive GUI based on the ranking of the portion of the ranked set of matched results.

16. The method of claim 13, wherein the intent of the first user includes an indication of a desire to engage in an activity.

17. The method of claim 13, wherein the classes include one or more of: a category, an agenda verb, an object, a verb interrogative, an object interrogative, a detail interrogative, or a location.

18. The method of claim 13, wherein the ranking is based at least in part on one or more of: usage of an activity, location of an activity, time of an activity, or properties with respect to the approximation of the intent.

19. The method of claim 13, wherein the intent of the first user comprises at least one or more of: a desired transaction, an articulated demand, a proposal to provide information, goods, or services, a request for advice, or a search query.

20. The method of claim 13, wherein the portion of the ranked set of matched results includes a highest ranked syntactic result from the syntactic search process as a highest ranked result, and a highest ranked semantic result from the semantic search process as the second highest ranked result.

* * * * *